(12) United States Patent
Park

(10) Patent No.: US 10,582,430 B2
(45) Date of Patent: Mar. 3, 2020

(54) METHOD AND APPARATUS FOR APPLYING MILLIMETER WAVE-BASED MOBILE COMMUNICATION TECHNOLOGY TO UNMANNED AERIAL VEHICLE, OPERATION METHOD OF UNMANNED AERIAL VEHICLE USING THE SAME, AND COMMUNICATION METHOD USING THE SAME

(71) Applicant: ELECTRONICS AND TELECOMMUNICATIONS RESEARCH INSTITUTE, Daejeon (KR)

(72) Inventor: Woo Goo Park, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 61 days.

(21) Appl. No.: 15/679,420

(22) Filed: Aug. 17, 2017

(65) Prior Publication Data

US 2018/0152870 A1    May 31, 2018

(30) Foreign Application Priority Data

Nov. 30, 2016 (KR) .................. 10-2016-0162123

(51) Int. Cl.
*H04W 4/00* (2018.01)
*H04W 36/06* (2009.01)
(Continued)

(52) U.S. Cl.
CPC ........... *H04W 36/06* (2013.01); *B64C 39/024* (2013.01); *G05D 1/0022* (2013.01);
(Continued)

(58) Field of Classification Search
None
See application file for complete search history.

(56) References Cited

U.S. PATENT DOCUMENTS 7,187,323 B2    3/2007   Kang et al.
9,853,713 B2 *  12/2017  Jalali .................. H04B 7/18502
(Continued)

FOREIGN PATENT DOCUMENTS

KR    10-2014-0002051 A    1/2014
KR    10-2015-0095010 A    8/2015
(Continued)

OTHER PUBLICATIONS

Jinho Choi, "Beam Selection in mm-Wave Multiuser MIMO Systems Using Compressive Sensing", IEEE Transactions on Communications, vol. 63, No. 8, Aug. 2015.

*Primary Examiner* — Sithu Ko
(74) *Attorney, Agent, or Firm* — LRK Patent Law Firm

(57) ABSTRACT

An operation method of an unmanned aerial vehicle terminal. The unmanned aerial vehicle terminal generates a beam table by using first information on a plurality of beams transmitted by a first transmission point. The unmanned aerial vehicle terminal monitors whether conditions for beam switching are satisfied. The unmanned aerial vehicle terminal determines a target location based on the beam table when the conditions for the beam switching are satisfied. The unmanned aerial vehicle terminal moves to the target location. In addition, the unmanned aerial vehicle terminal updates the beam table depending on whether beam table update conditions are satisfied.

7 Claims, 40 Drawing Sheets

(51) Int. Cl.
*H04W 36/00* (2009.01)
*G05D 1/00* (2006.01)
*B64C 39/02* (2006.01)
*H04W 36/32* (2009.01)

(52) U.S. Cl.
CPC . *H04W 36/0083* (2013.01); *H04W 36/00835* (2018.08); *H04W 36/32* (2013.01)

(56) References Cited

U.S. PATENT DOCUMENTS

| | | | |
|---|---|---|---|
| 10,049,587 B2 * | 8/2018 | Kalathil | B64C 39/024 |
| 2006/0229104 A1 * | 10/2006 | de La Chapelle | H04B 7/18506 455/562.1 |
| 2010/0069070 A1 * | 3/2010 | Shi | H04W 36/32 455/436 |
| 2011/0182230 A1 | 7/2011 | Ohm et al. | |
| 2012/0056784 A1 * | 3/2012 | Xie | H01Q 1/125 342/359 |
| 2012/0166022 A1 | 6/2012 | Kwon et al. | |
| 2014/0032021 A1 | 1/2014 | Metzler et al. | |
| 2015/0327136 A1 | 11/2015 | Kim et al. | |
| 2016/0112116 A1 * | 4/2016 | Jalali | H04W 16/28 370/252 |
| 2016/0262077 A1 * | 9/2016 | Zhang | H04W 24/08 |
| 2016/0299233 A1 * | 10/2016 | Levien | G08G 5/0052 |
| 2017/0111122 A1 * | 4/2017 | Shimizu | H04W 8/005 |
| 2017/0324469 A1 * | 11/2017 | Jalali | H04B 7/18502 |
| 2017/0325221 A1 * | 11/2017 | Jalali | H04B 7/18502 |

FOREIGN PATENT DOCUMENTS

| | | |
|---|---|---|
| KR | 10-2015-0129600 A | 11/2015 |
| KR | 10-2015-0129603 A | 11/2015 |

* cited by examiner

FIG. 5

| Converted code value of reception beam arrival distance according to SNR of mTE ($p_{mRU(i,j)}^{k}$) | SNR of mTE (dBm) | Reception beam arrival distance of mTE (m) |
|---|---|---|
| 0 | -50.0 | 60 |
| 1 | -55.0 | 65 |
| 2 | -60.0 | 80 |
| 3 | -65.0 | 110 |
| 4 | -70.0 | 180 |
| 5 | -75.0 | 220 |
| 6 | -80.0 | 300 |
| 7 | -85.0 | 410 |
| 8 | -90.0 | 540 |
| 9 | -95.0 | 700 |
| 10 | -100.0 | 1,000 (max($p_{mRU}^{k}$)) |

FIG. 11

| Number of elevation beams of mRU | Average gap between elevation beams of mRU ($0 \sim \pi$) | Beam AoE (Angle of Elevation) | | | | | |
|---|---|---|---|---|---|---|---|
| | | 1st | 2nd | 3rd | 4th | ... | $M^{th}$ |
| 1 | $\pi/2$ | 0 | - | - | - | ... | - |
| 2 | $\pi/3$ | $\pi/2 - \pi/3$ | $\pi/2 - 2/3\pi$ | - | - | ... | - |
| 3 | $\pi/4$ | $\pi/2 - \pi/4$ | $\pi/2 - 2/4\pi$ | $\pi/2 - 3/4\pi$ | - | ... | - |
| 4 | $\pi/5$ | $\pi/2 - \pi/5$ | $\pi/2 - 2/5\pi$ | $\pi/2 - 3/5\pi$ | $\pi/2 - 4/5\pi$ | ... | - |
| ... | ... | ... | ... | ... | ... | ... | ... |
| M | $\pi/(M+1)$ | $\pi/2 - 1/(M+1)\pi$ | $\pi/2 - 2/(M+1)\pi$ | $\pi/2 - 3/(M+1)\pi$ | $\pi/2 - 4/(M+1)\pi$ | ... | $\pi/2 - M/(M+1)\pi$ |

FIG. 15

| Number of azimuth beams of k-th mRU | Average gap between azimuth beams of mRU (0 ~ 2π) | Beam AoA (Angle of Azimuth) | | | | | |
|---|---|---|---|---|---|---|---|
| | | 1st | 2nd | 3rd | 4th | ... | Nth |
| 1 | 0 | 0 | - | - | - | ⋮ | - |
| 2 | π | 0 | π | - | - | ⋮ | - |
| 3 | 2/3 π | 0 | 2/3 π | 4/3 π | - | ⋮ | - |
| 4 | 1/2 π | 0 | 1/2 π | π | 3/2 π | ⋮ | - |
| ... | ... | ... | ... | ... | ... | ⋯ | ... |
| N | 2/N π | 0 | 2/N π | 4/N π | 6/N π | ⋮ | 2(N-1)/N π |

FIG. 19

| Index of elevation beam of mRU | Index of azimuth beam of mRU | | | | |
|---|---|---|---|---|---|
| | 1st | 2nd | 3rd | ... | Nth |
| 1st | $(la^k_{mTE(1,1)}, lo^k_{mTE(1,1)})$ | $(la^k_{mTE(1,2)}, lo^k_{mTE(1,2)})$ | 0 | ... | $(la^k_{mTE(1,N)}, lo^k_{mTE(1,N)})$ |
| 2nd | 0 | $(la^k_{mTE(2,2)}, lo^k_{mTE(2,2)})$ | $(la^k_{mTE(2,3)}, lo^k_{mTE(2,3)})$ | ... | $(la^k_{mTE(2,N)}, lo^k_{mTE(2,N)})$ |
| 3rd | $(la^k_{mTE(3,1)}, lo^k_{mTE(3,1)})$ | 0 | ... | ... | 0 |
| ... | ... | ... | ... | ... | ... |
| Mth | $(la^k_{mTE(M,1)}, lo^k_{mTE(M,1)})$ | 0 | $(la^k_{mTE(M,3)}, lo^k_{mTE(M,3)})$ | ... | 0 |

1700

1710

1730 — State that corresponding beam is not in use by drone

1731 — Location (latitude and longitude) where corresponding beam is in use by drone

METHOD AND APPARATUS FOR APPLYING MILLIMETER WAVE-BASED MOBILE COMMUNICATION TECHNOLOGY TO UNMANNED AERIAL VEHICLE, OPERATION METHOD OF UNMANNED AERIAL VEHICLE USING THE SAME, AND COMMUNICATION METHOD USING THE SAME

CROSS-REFERENCE TO RELATED APPLICATION

This application claims priority to and the benefit of Korean Patent Application No. 10-2016-0162123, filed in the Korean Intellectual Property Office on Nov. 30, 2016, the entire contents of which are incorporated herein by reference.

BACKGROUND OF THE INVENTION

1. Field of the Invention

The present invention relates to a millimeter wave (mmWave)-based wireless network (or mobile network) system that includes an unmanned aerial vehicle (e.g., a drone).

Specifically, the present invention relates to a method for applying a mmWave-based wireless communication (or mobile communication) technology to an unmanned aerial vehicle (e.g., a drone), and an apparatus using the same.

2. Description of Related Art

In the future, large-capacity video uploads of giga-sized capacity by unmanned aerial vehicles (e.g., a drone) will be expanded from personal use to cluster uploads of giga-sized videos using Wi-Fi, Bluetooth, or long term evolution (LTE).

Due to saturation of the cellular frequency band (e.g., below 6 GHz), current wireless networks are expected to use the super-high frequency band such as a millimeter wave (mmWave) band of over 10 GHz.

A plurality of swarming drones use WiFi or Bluetooth for giga-sized video upload with a limitation in quality of service (QoS), security, and clustering and transmission capacity. In addition, it is economically unrealistic to transmit giga-sized video through swarming drones using the cellular frequency bandwidth.

Further, a range (e.g., a terminal access area) of a base station has a shape of a circular cell by LTE that is in use at present since a single- or three-sector antenna is used. However, since a minute fixed beam (e.g., formed by beamforming) is transmitted through a directional antenna in a mmWave-based wireless network system (i.e., a mmWave system), it is technically difficult to apply an LTE cellular system to an unmanned aerial vehicle (e.g., a drone) that transmits giga-sized video data.

In addition, for establishing a wireless link between the mmWave system and the unmanned aerial vehicle, the unmanned aerial vehicle requires access information with respect to a base station or a transmission beam of the base station.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a mmWave-based mobile communication system that includes an unmanned aerial vehicle (e.g., a drone) and that can improve system performance.

In addition, the present invention is to provide a method and an apparatus for efficiently performing beam search for initial access and random access when a superhigh frequency signal with strong directivity is applied to a wireless network.

Further, the present invention provides a method and an apparatus for performing beam switching and switching for handover between base stations.

Still further, the present invention provides a method for an unmanned aerial vehicle (e.g., a drone) to move to a target beam and a base station area.

According to an exemplary embodiment of the present invention, a method for operating an unmanned aerial vehicle terminal is provided. The operation method of the unmanned aerial vehicle terminal includes: generating a beam table by using first information on a plurality of beams transmitted by a first transmission point; monitoring whether conditions for beam switching are satisfied; determining a target location based on the beam table when the conditions for the beam switching are satisfied; moving to the target location; and updating the beam table depending on whether beam table update conditions are satisfied.

The updating of the beam table may include updating the beam table when the target location corresponds to a cover area of a second transmission point that is different from the first transmission point.

The generating of the beam table may include receiving the first information through a first beam that corresponds to a current location of the unmanned aerial vehicle terminal among the plurality of beams transmitted by the first transmission point.

The updating of the beam table may include maintaining the beam table without updating the beam table when a serving beam for the unmanned aerial vehicle terminal is changed to a second beam among the plurality of beams transmitted by the first transmission point from the first beam.

The updating of the beam table may include: receiving second information on a plurality of beams transmitted by a second transmission point through a second beam when a serving beam for the unmanned aerial vehicle terminal is changed from the first beam to the second beam among the plurality of beams transmitted by a second transmission point that is different from the first transmission point; and updating the beam table based on the second information.

The determining of the target location may include: determining a target beam that is not in use by another terminal among the plurality of beams transmitted by the first transmission point based on the beam table; and calculating a movement time and a first movement angle for movement to the target location based on a latitude difference and a longitude difference between the target location for the target beam and a current location of the unmanned aerial vehicle terminal.

The calculating of the movement time and the first movement angle may include: calculating a movement distance between the target location and the current location by using the latitude difference and the longitude difference; and calculating the first movement angle by using the movement distance and the longitude difference.

A movement speed of the unmanned aerial vehicle terminal may be set for the first transmission point and a second transmission point that is different from the first transmission point, respectively, or may be set as the same value for the first transmission point and the second transmission point.

The conditions for the beam switching may include at least one of a case that a serving beam for the unmanned aerial vehicle terminal is blocked, a case that reception strength for the unmanned aerial vehicle terminal to receive the serving beam is weaker than reception strength that corresponds to a maximum arrival distance of the serving beam, a case that the first transmission point abnormally operates, a case that the unmanned aerial vehicle determines that it needs to move, and a case that a movement request is input by a system operator.

The moving to the target location may include dividing an area for beam search into an upward area and a downward area with reference to a horizontal line when arriving at the target location; performing beam search with respect to the upward area; and performing beam search with respect to the downward area when the beam search with respect to the upward area has failed.

The performing of the beam search with respect to the upward area may include: dividing the upward area into an east area and a west area with reference to due north and then sequentially performing beam search with respect to the east area and beam search with respect to the west area; and when the beam search with respect to one of the east area and the west area has succeeded, dividing the area where the beam search has succeeded into a north area and a south area and then sequentially performing beam search with respect to the north area and beam search with respect to the south area.

The moving to the target location may include transmitting location information of the unmanned aerial vehicle terminal that is in use of a second beam to the first transmission point when a serving beam for the unmanned aerial vehicle terminal is changed from a first beam to the second beam among the plurality of beams transmitted by the first transmission point due to movement to the target location.

The first information may be changed by the first transmission point according to the location information.

According to another exemplary embodiment, a communication method of a transmission point that transmits a plurality of beams for communication with an unmanned aerial vehicle terminal is provided. The communication method of the transmission point includes: receiving a radio resource control (RCC) connection request message that includes location information of the unmanned aerial vehicle terminal from the unmanned aerial vehicle terminal that recognizes a first beam among the plurality of beams; storing beam use state information for the first beam among beam use state information for the plurality of beams as the location information; and transmitting an RRC connection setup message that includes information on the first beam to the unmanned aerial vehicle terminal.

The transmitting of the RRC connection setup message may include inserting information that indicates a relationship between reception strength of the first beam received by the unmanned aerial vehicle terminal and a distance to the unmanned aerial vehicle terminal from a start point of the first beam into the RRC connection setup message.

The transmitting of the RRC connection set message may include inserting location information of a neighboring transmission point that neighbors the transmission point and movement speed information for the unmanned aerial vehicle terminal to the RRC connection setup message.

The plurality of beams may correspond to M elevation beams (here, M is a natural number) and N azimuth beams (here, N is a natural number).

An angle of elevation of an M-th elevation beam among the M elevation beams having a beam gap of $\pi/(M+1)$ with reference to a perpendicular plane may be $\pi/2 - M\pi/(M+1)$.

An angle of azimuth of an N-th azimuth beam among the N azimuth beams having a beam gap of $2\pi/N$ with reference to a horizontal plane may be $(2(N-1)\pi/N$.

In addition, according to another exemplary embodiment of the present invention, an operation method of an unmanned aerial vehicle terminal is provided. The operation method of the unmanned aerial vehicle terminal includes: receiving a target location for the unmanned aerial vehicle terminal to access a first transmission point; calculating a movement time and a first movement angle for moving to the target location by using a latitude difference and a longitude difference between the target location and a current location of the unmanned aerial vehicle terminal; and moving to the target location based on the movement time and the first movement angle.

The operation method of the unmanned aerial vehicle terminal may further include, when the unmanned aerial vehicle terminal arrives at the target location, dividing an area for searching beams transmitted by the first transmission point into an upward area and a downward area with reference to a horizontal line and then performing beam search with respect to the upward area and beam search with respect to the downward area.

The operation method of the unmanned aerial vehicle terminal may further include: transmitting a radio resource control (RRC) connection request message that includes location information of the unmanned aerial vehicle terminal to the first transmission point when the unmanned aerial vehicle terminal recognizes a first beam among a plurality of beams transmitted by the first transmission point; and receiving an RRC connection setup message that includes information on the first beam from the first transmission point.

The calculating of the movement time and the first movement angle may include: calculating a movement distance between the target location and the current location by using the latitude difference and the longitude difference; calculating the first movement angle by using the movement distance and the longitude difference; and calculating the movement time by using the movement distance and a speed input for the unmanned aerial vehicle terminal.

BRIEF DESCRIPTION OF THE DRAWINGS

FIG. 5 shows reception beam arrival distance variation code values based on the reception power strength (e.g., the SNR) of the mTE according to the exemplary embodiment of the present invention.

FIG. 11 shows an average gap between elevation beams included in the mRU and an angle of elevation (AOE) of a beam according to a number of elevation beams included in an mRU of a home base station according to the exemplary embodiment of the present invention.

FIG. 15 shows an average gap between azimuth beams of the mRU and an angle of azimuth (AoA) of each azimuth beam according to the number of azimuth beams included in the base station mRU according to the exemplary embodiment of the present invention.

FIG. 19 shows elevation and azimuth beam operation states of the mRU (e.g., whether or not a drone uses the corresponding beam is displayed) according to the exemplary embodiment of the present invention.

DETAILED DESCRIPTION OF THE EMBODIMENTS

Figure 1:
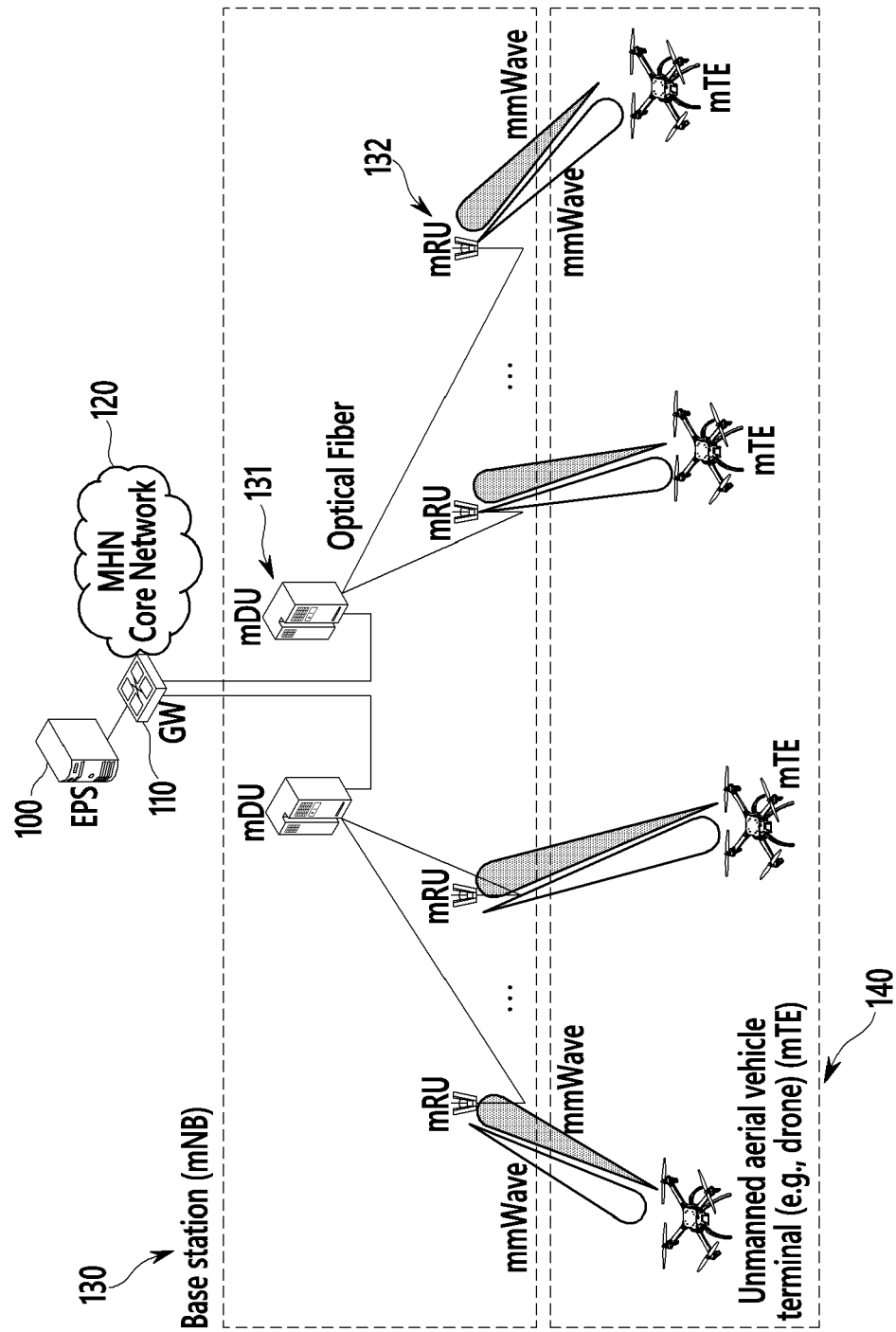
FIG. 1 shows a millimeter wave-based mobile communication system for an unmanned aerial vehicle terminal (e.g., a drone).

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, an overlapped description for the same components will be omitted.

Further, in the present specification, it is to be understood that when one component is referred to as being 'connected to' another component, it may be connected directly to the other component or connected to the other component with another component interposed therebetween. On the other hand, it is to be understood that when one component is referred to as being 'directly connected to' another component, it may be connected to the other component without another component interposed therebetween.

Terms used in the present specification are used only in order to describe specific exemplary embodiments rather than limiting the present invention.

In the present specification, singular forms are intended to include plural forms unless the context clearly indicates otherwise.

In the present specification, it will be understood that the terms 'include' and 'have' specify the presence of features, numerals, steps, operations, components, parts, or combinations thereof mentioned in the present specification, or a combination thereof, but do not preclude the presence or addition of one or more other features, numerals, steps, operations, components, parts, or combinations thereof.

In the present specification, the term 'and/or' includes a combination of a plurality of stated items or any one of the plurality of stated items. In the present specification, 'A or B' may include 'A', 'B', or 'both A and B'.

In the specification, while such terms as "first," "second,", "k-th", "l-th", etc., may be used to describe various components, such components must not be limited to the above terms. The above terms are used only to distinguish one component from another. For example, a k-th element may be called an l-th element, and similarly, the l-th element may be called the k-th element without departing from the spirit and scope of the invention.

Further, a base station (BS) may refer to an advanced base station, a high reliability base station (HR-BS), a nodeB, an evolved node B (eNodeB, eNB), an access point, a radio access station, a base transceiver station, a mobile multihop relay (MMR)-BS, a relay station serving as a base station, a high reliability relay station serving as a base station, a repeater, a macro base station, a small base station, and the like, and may also include all or some of functions of the advanced base station, the HR-BS, the nodeB, the eNodeB, the access point, the radio access station, the base transceiver station, the MMR-BS, the relay station, the high reliability relay station, the repeater, the macro base station, the small base station, and the like.

In addition, in the present specification, a vertical plane (or a perpendicular plane) implies that a beam transmitted vertically by a base station (e.g., 180 degrees) operates up and down, and a horizontal plane implies that a beam transmitted horizontally by the base station (e.g., 360 degrees) operates left and right.

Further, in the present specification, movement includes the meaning of flying movement.

Hereinafter, an ultrahigh frequency (e.g., millimeter wave (mmWave))-based wireless network technology applied between an unmanned aerial vehicle such as a drone and a wireless network system will be described. Specifically, a method for enhancing performance of a mmWave-based wireless network system that includes an unmanned aerial vehicle (e.g., a drone) will be described.

More specifically, when an ultrahigh frequency signal having high linearity is applied to a wireless network (or a mobile network), a method for effectively performing beam search for initial access and random access, a method for performing beam switching and switching for handover between base stations, and a method for forming a wireless network for movement of an unmanned aerial vehicle to a target beam or a base station area will be described.

FIG. 1 shows a mmWave-based mobile communication system for an unmanned aerial vehicle (e.g., a drone).

As shown in FIG. 1, a mmWave-based mobile communication system (hereinafter referred to as a mmWave system) includes an evolved packet system (EPS) 100, a gateway (GW) 110, a mobile hotspot network (MHN) 120, a base station (hereinafter referred to as mNB) 130, and moving terminal equipment (mTE) 140. The mTE 140 may include a drone.

The GW 110 serves a control plane function, and performs a control function with respect to the mTE 140 (e.g., session management and mobility management of the mTE 140). In addition, the GW 110 serves a signal access function with an mDU control plane, and performs allocation and release of a bearer of the EPS 110 and handover support. Further, the GW 110 serves a user plane function, and provides a function for setting a tunnel path between the mDU and the GW 110, and a transport layer protocol function.

The mNB 130 includes at least one mobile digital unit (mDU) 131 and at least one mobile radio unit (mRU) 132. In the specification, the terms "base station mNB", "base station", and "mNB" indicate both an mDU and an mRU. The mRU 132 may be a transmission point.

The mDU 131 is connected with the GW 110 by wire and also with the mRU 132 by wire.

Specifically, the mDU 131 provides a user plane (e.g., packet data convergence protocol (PDCP), a radio link control (RLC), a media access control (MAC), and a physical (PHY)) and control plane (e.g., a radio resource control (RRC)).

The mRU 142 provides a high-speed mobile packet service to a wirelessly connected mTE 140.

The mTE 140 is a terminal system, and provides a high-speed mobile packet service by being matched with the mNB 130 through a radio interface function. Specifically, the mTE 140 may include a global positioning system (GPS), an altimeter, and a vehicle that flies in vertical and horizontal directions.

Figure 2:
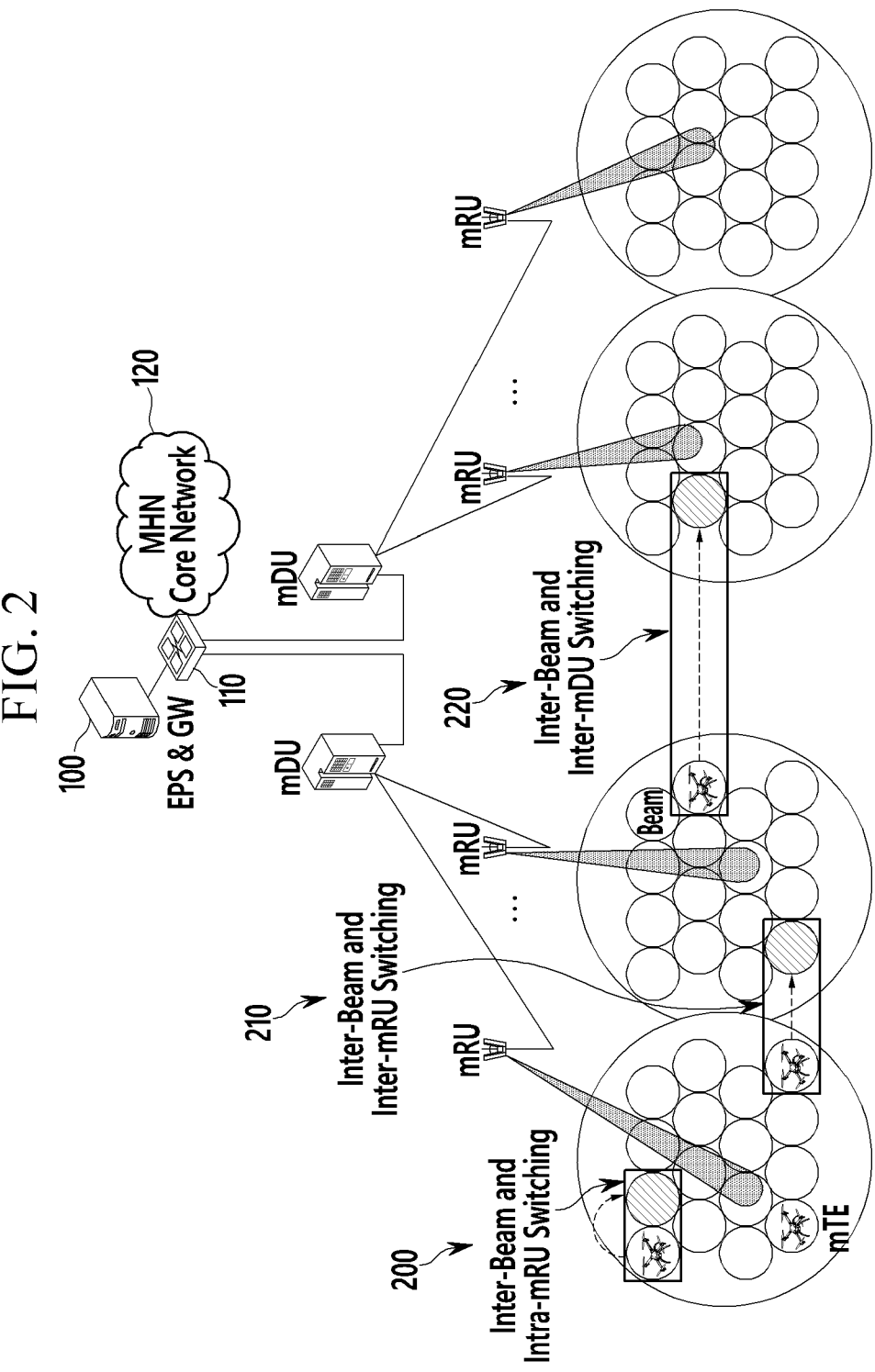
FIG. 2 shows inter-beam switching in the same mDU (mobile digital unit) and the same mRU (mobile radio unit), beam switching between different mRUs included in the same mDU, and beam switching between different mDUs in a mmWave-based mobile communication system using direction-fixed multi-beams.

FIG. 2 shows inter-beam switching in the same mDU (mobile digital unit) and the same mRU (mobile radio unit), beam switching between different mRUs included in the same mDU, and beam switching between different mDUs in a mmWave-based mobile communication system using direction-fixed multi-beams.

As shown in FIG. 2, the mmWave system may be a mobile communication system that uses multi-beams having a fixed direction.

When the mTE 140 performs inter-beam and intra-mRU switching 200 from a source beam to a target beam, the source beam and the target beam are different from each other and are included in the same mDU 131 and the same mRU 132 in inter beam and intra-mRU switching 200.

Alternatively, when the mTE 140 performs the inter-beam and inter-mRU switching to the target beam from the source beam, the source beam and the target beam are included in the same mDU 131 but are included in different mRUs 132 in inter-beam and inter-mRU switching 210.

Alternatively, when the mTE 140 performs inter-beam and inter-mDU switching 220 from the source beam to the target beam, the source beam and the target beam are included in different mDUs 131 in inter-beam and inter-mDU switching 220.

Figure 3:
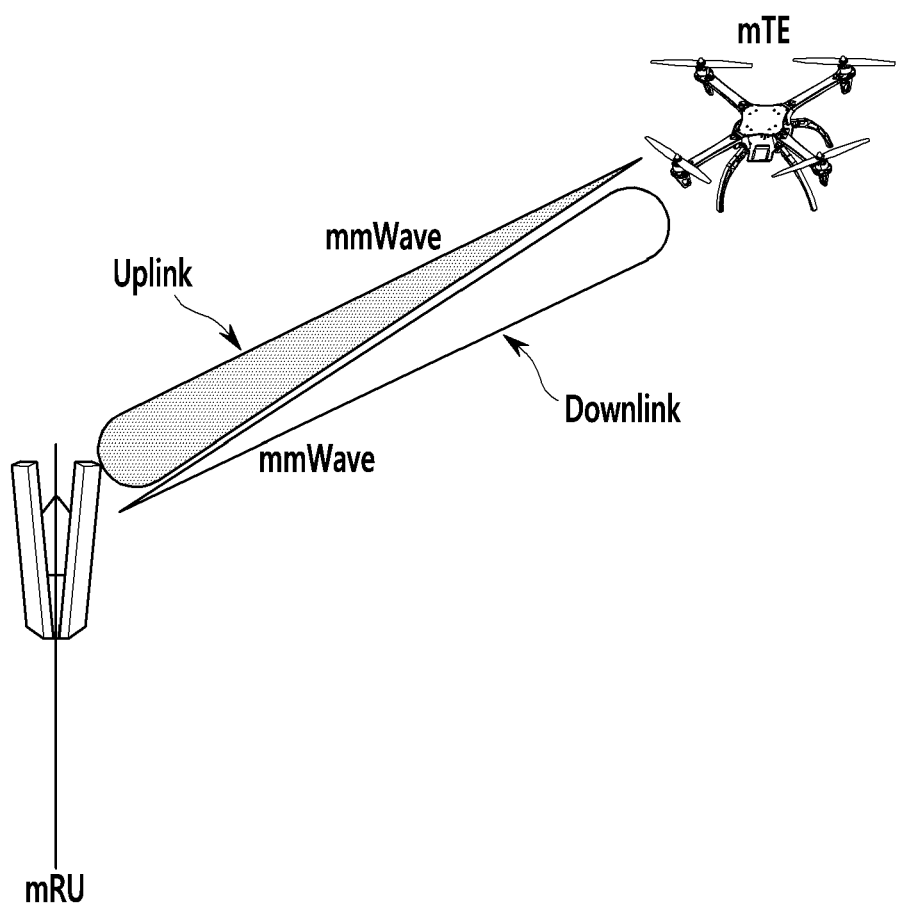
FIG. 3 shows a concept of the mTE and mmWave-based mobile backhaul downlink and uplink.

FIG. 3 shows a concept of the mTE and mmWave-based mobile backhaul downlink and uplink.

As shown in FIG. 3, in the mmWave system, a downlink and an uplink between the mTE 140 and the mRU 132 may use a mmWave-based access link.

Hereinafter, a method for optimizing beam search for initial access and random access, a method for optimizing beam switching and switching for a handover between the base stations, and a method for optimizing movement to the target beam or the base station area will be described. In this specification, the initial access may imply access that the mTE 143 initially performs, and a target location for the initial access may be input to the mTE 140 by a user.

Figure 4:
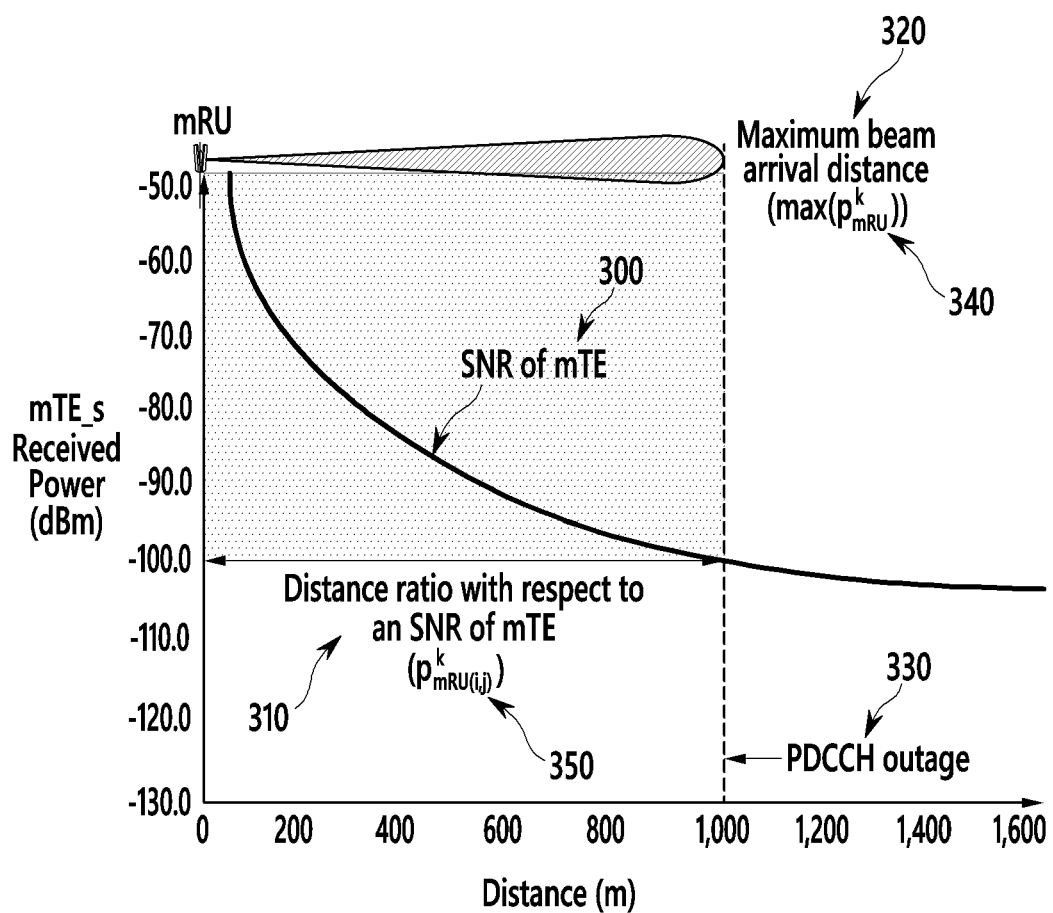
FIG. 4 shows reception power strength (e.g., a signal-to-noise ratio (SNR)) of the unmanned aerial vehicle terminal mTE according to distance with respect to output of a beam transmitted from an mRU of the base station.

FIG. 4 shows reception power strength (e.g., a signal-to-noise ratio (SNR)) of the unmanned aerial vehicle terminal mTE according to distance with respect to output of a beam transmitted from an mRU of the base station. In the present specification, the case that reception power strength is an SNR will be described as an example. However, this is only an example.

As shown in FIG. 4, the mmWave system converts the output of the beam transmitted from the mRU 132 of the base station to the reception power strength (e.g., the SNR) 300 of the mTE 140 and converts the reception power strength (e.g., the SNR) of the mTE 140 to a distance value $p_{mRU(i,j)}^{k}$ 310 for use; That is, $p_{mRU(i,j)}^{k}$ 310 denotes a distance ratio with respect to reception power strength (e.g., an SNR) of the mTE 140.

A maximum beam arrival distance $\max(p_{mRU}^{k})$ 320 is determined with reference to a point at which no more data can be transmitted because the reception power of the mTE 140 with respect to the transmission beam of the mRU 132 is too low (e.g., physical downlink control channel (PDCCH) outage 330). Here, k 340 denotes an index of a k-th mRU 132, and i and j 350 denote elevation and azimuth beam indexes of the mRU 132, received by the mTE 140. A choice according to the beam search of the mTE 140 is carried out according to channel estimation.

FIG. 5 shows reception beam arrival distance variation code values based on the reception power strength (e.g., the SNR) of the mTE according to the exemplary embodiment of the present invention.

Specifically, code values 400 that indicate reception beam arrival distances converted from the reception power strength (e.g., the SNR) of the mTE 140 are exemplarily shown in FIG. 5. The mmWave system uses an output of a beam transmitted from the base station mRU 132 by converting the output to reception power strength (e.g., an SNR) 410 of the mTE 140 and a reception beam arrival distance 420 of the mTE 140.

When the mTE 140 is included in the k-th mRU 132 among a plurality of mRUs 132 in the mDU a maximum reception beam arrival distance 421 is $\max(p_{mRU}^{k})$ as exemplarily shown in FIG. 4. Hie ratio of the reception beam arrival distance 420 of the mTE 140 may be changed depending on an actual measurement value.

The code value 400 indicates a relationship between reception strength of a beam (i.e., a beam of the mRU 132) received by the mTE 140 and a distance from the start point of the beam to the mTE 140. Specifically, when a beam (i,j) transmitted from the k-th mRU 132 reaches the mTE 140 (i.e., is received by the mTE 140), the code value 400 indicates a distance from the start portion of the corresponding beam (i,j) to the mTE 140. For example, when the code value 400 is 0, a reception beam arrival distance of the mTE 140 with respect to the beam (i,j) transmitted from the k-th mRU 132 is 60 m. In this case, the reception power strength (e.g., the SNR) of the mTE 140 with respect to the beam (i,j) transmitted from the k-th mRU 132 is −50.0 dBm.

Figure 6:
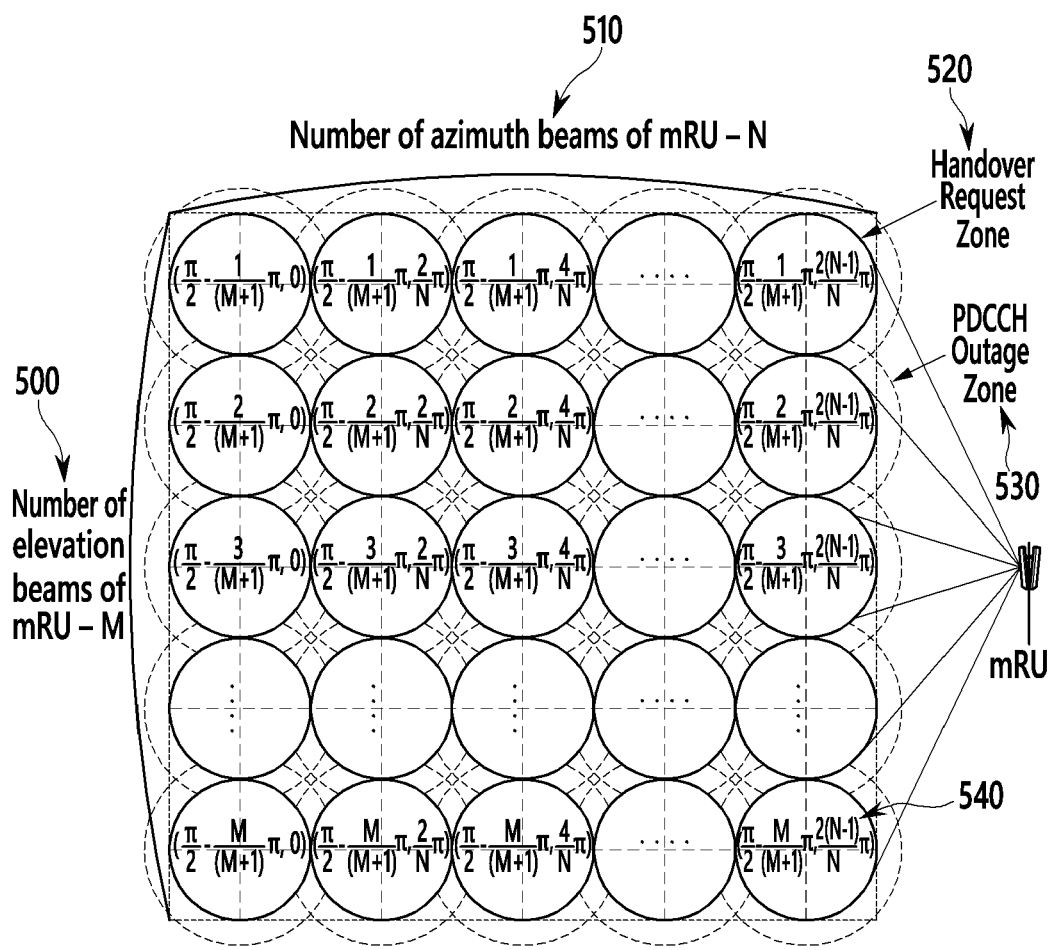
FIG. 6 shows a number M of elevation beams and a number N of azimuth beams included in the mRU of the base station according to the exemplary embodiment of the present invention.

FIG. 6 shows a number M of elevation beams and a number N of azimuth beams included in the mRU of the base station according to the exemplary embodiment of the present invention.

The MRU 132 includes multiple antennas. M elevation beams 500 and N azimuth beams 510 may be generated by the multiple antennas as exemplarily shown in FIG. 6.

Each beam has a receiving area according to transmission power strength of the mRU 132, and is divided by a handover request zone 520. When the mTE 140 deviates from the handover request zone 520, the reception power strength (e.g., the SNR) of the mTE 140 is weakened, thereby generating DeletedTextsRLF) that causes communication disconnection. This implies that the mTE 140 enters a state (e.g., PDCCH outage zone) 530 in which data cannot be transmitted/received any longer.

In such a case, the mTE 140 selects another beam or a new beam in the base station (e.g., another mRU or an mRU in the other mRU) through the beam switching (e.g., 200, 210, and 220).

Each beam has unique location information (e.g., an angle of elevation, an angle of azimuth, and the like) depending on M and N. For example, when the number of elevation beams and the number of azimuth beams are M and N, the location information may be represented as $$\left(\frac{\pi}{2} - \frac{M}{M+1}\pi, \frac{2(N-1)}{N}\pi\right)$$

540. That is, $$\left(\frac{\pi}{2} - \frac{m}{M+1}\pi, \frac{2(n-1)}{N}\pi\right)$$

(however, 1≤m≤M, 1≤n≤N).

Figure 7:
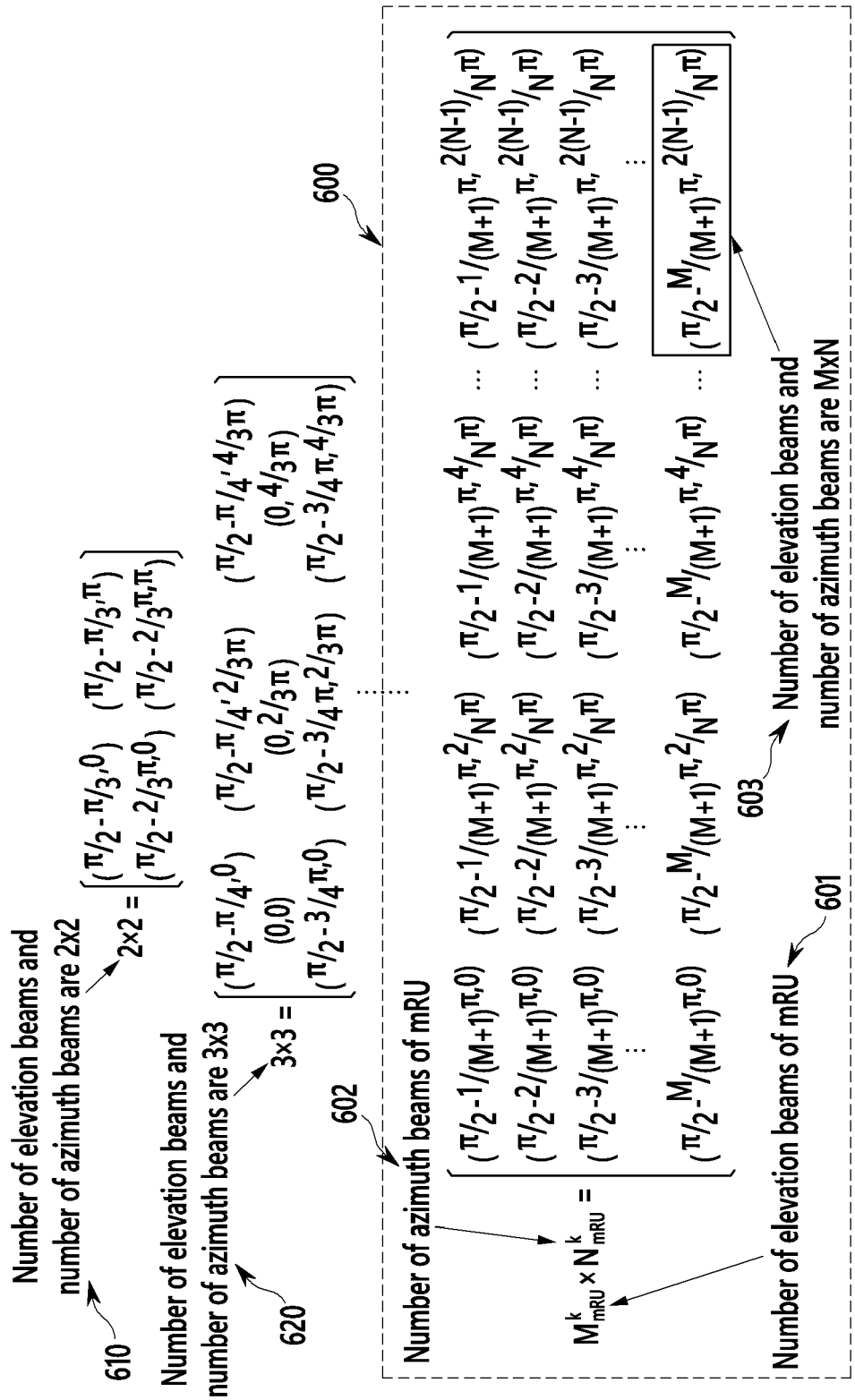
FIG. 7 shows a beam information matrix of each mRU according to the number M of elevation beams and the number N of azimuth beams included in the mRU of the base station.

Meanwhile, M elevation beams and N azimuth beams included in the mRU 132 may be represented as $M_{mRU}^{k} \times N_{mRU}^{k}$, which is a matrix format 600 as exemplarily shown in FIG. 7.

FIG. 7 shows a beam information matrix of each mRU according to the number M of elevation beams and the number N of azimuth beams included in the mRU of the base station.

As exemplarily illustrated in FIG. 1, the beam information matrix of each mRU 132 may be represented as $M_{mRU}^k \times N_{mRU}^k$, which is the matrix format 130.

In FIG. 7, a case 610 that the number of elevation beams and the number of azimuth beams are 2×2, a case 620 in which the number of elevation beams and the number of azimuth beams are 3×3, and a case 600 in which the number of elevation beams and the number of azimuth beams are M×N are illustrated.

$M_{mRU}^k$ denotes a number 601 of elevation beams included in the k-th mRU 132, and $N_{mRU}^k$ denotes a number 602 of azimuth beams included in the k-th mRU 132. Particularly, location information of an M-th elevation beam and location information an N-th azimuth beam are $$\left( \frac{\pi}{2} - \frac{m}{M+1}\pi, \frac{2(n-1)}{N}\pi \right)$$

603.

Figure 8:
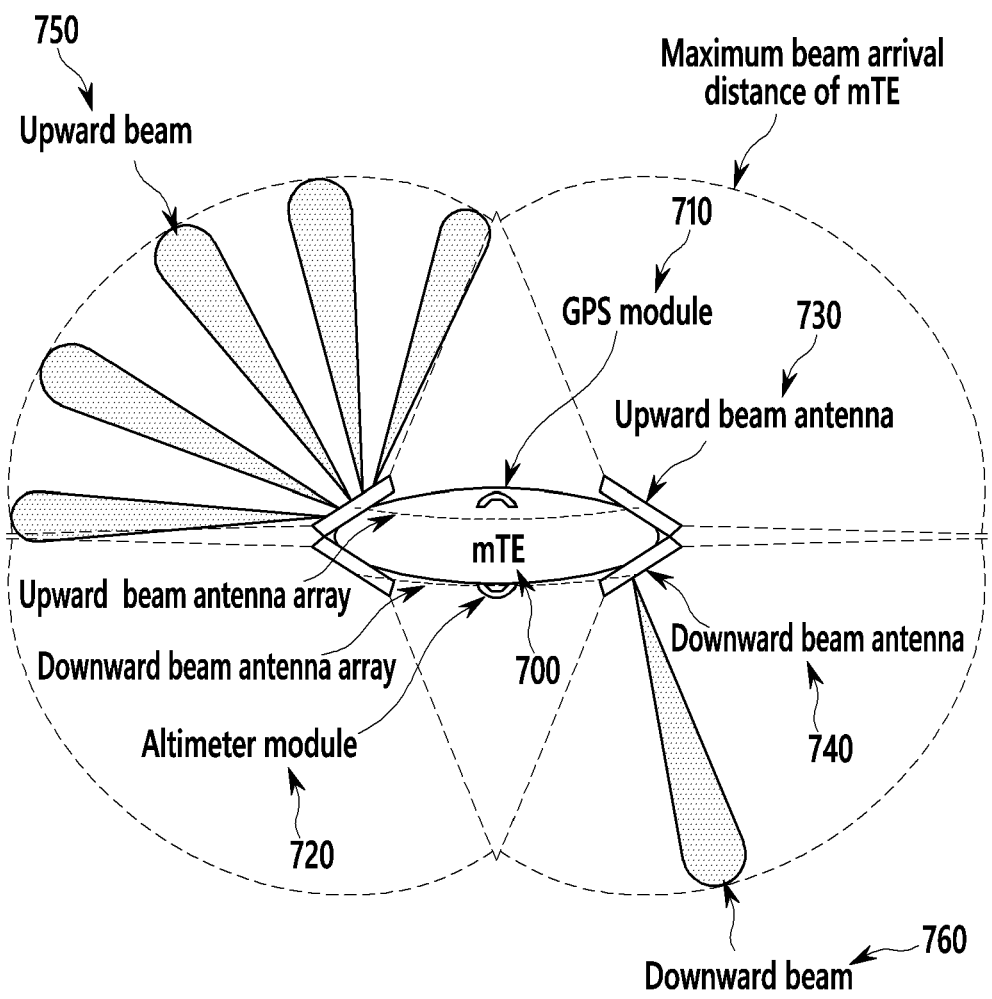
FIG. 8 shows a mmWave-based mTE applied to an unmanned aerial vehicle (e.g., a drone), as a terminal of a mobile network according to an exemplary embodiment of the present invention.

FIG. 8 shows a mmWave-based mTE applied to an unmanned aerial vehicle (e.g., a drone), as a terminal of a mobile network according to an exemplary embodiment of the present invention.

An mTE 700 is an unmanned aerial vehicle (e.g., a drone). Specifically, the mTE 700 includes an upward beam antenna array that transmits and receives upward beams from above the outside of the mTE 700 and a downward beam antenna array that transmits and receives downward beams from below the outside of the mTE 700. The mTE 700 shown in FIG. 1 corresponds to the above-described mTE 140.

As shown in FIG. 8, the mTE 700 includes a GPS module 710 and an altimeter 720. Further, the mTE 700 includes an upward beam antenna 730 (or an antenna array) that transmits and receives an upward beam from above the periphery of the unmanned aerial vehicle terminal (e.g., a drone) and a downward beam antenna 740 (or an antenna array) that transmits and receives a downward beam from below the periphery of the unmanned aerial vehicle terminal.

That is, FIG. 8 exemplary illustrates that the mTE 700 that accesses the base station 130 through a mmWave-based radio link is applied to an unmanned aerial vehicle (e.g., a drone) as a terminal of a wireless network. In such a case, the mTE 700 may search for a beam of the base station 130 and access the searched beam through an upward beam antenna array that transmits and receives upward beams 750 from above the outside of the mTE 700 and a downward beam antenna array that transmits and receives downward beams 760 from below the outside of the mTE 700. The upward beam 750 and the downward beam 760 respectively have maximum beam arrival distances.

The mTE 700 may use spatial information such as coordinates (e.g., latitude and longitude), elevation (e.g., height), and the like through the GPS module 710 and the altimeter 720.

Figure 9:
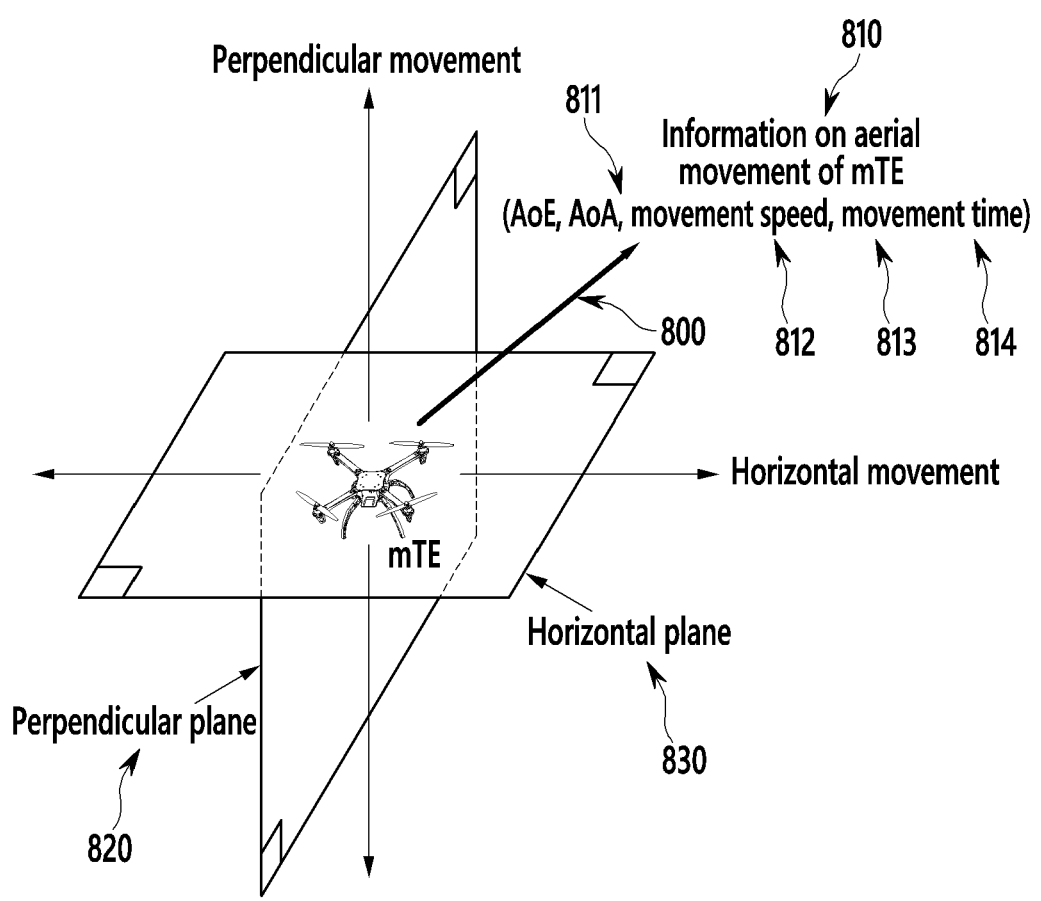
FIG. 9 shows a method for aerial movement of an mTE according to an exemplary embodiment of the present invention.

FIG. 9 shows a method for aerial movement of an mTE according to an exemplary embodiment of the present invention.

As exemplarily shown in FIG. 9, the mTE 140 can perform aerial movement 800. Specifically, a movement direction and a movement distance are set for the mTE 140 to move to target coordinates.

The movement direction is determined based on aerial movement information 810 of the mTE 140. That is, the movement direction is determined by an angle of elevation (AoE) 811 and an angle of azimuth (AoA) 812.

The movement distance is determined based on a movement speed 813 and a movement time 814 of the mTE 140, which are given from a system.

The movement direction may be represented by the AoE that indicates an upward or downward degree on a perpendicular plane 820, and the AoA that indicates an angle formed by a central line on due north and a flight route of the mTE 140 on a horizontal plane 830. The AoE will be described in detail with reference to FIG. 10, and the AoA will be described in detail with reference to FIG. 13.

Figure 10:
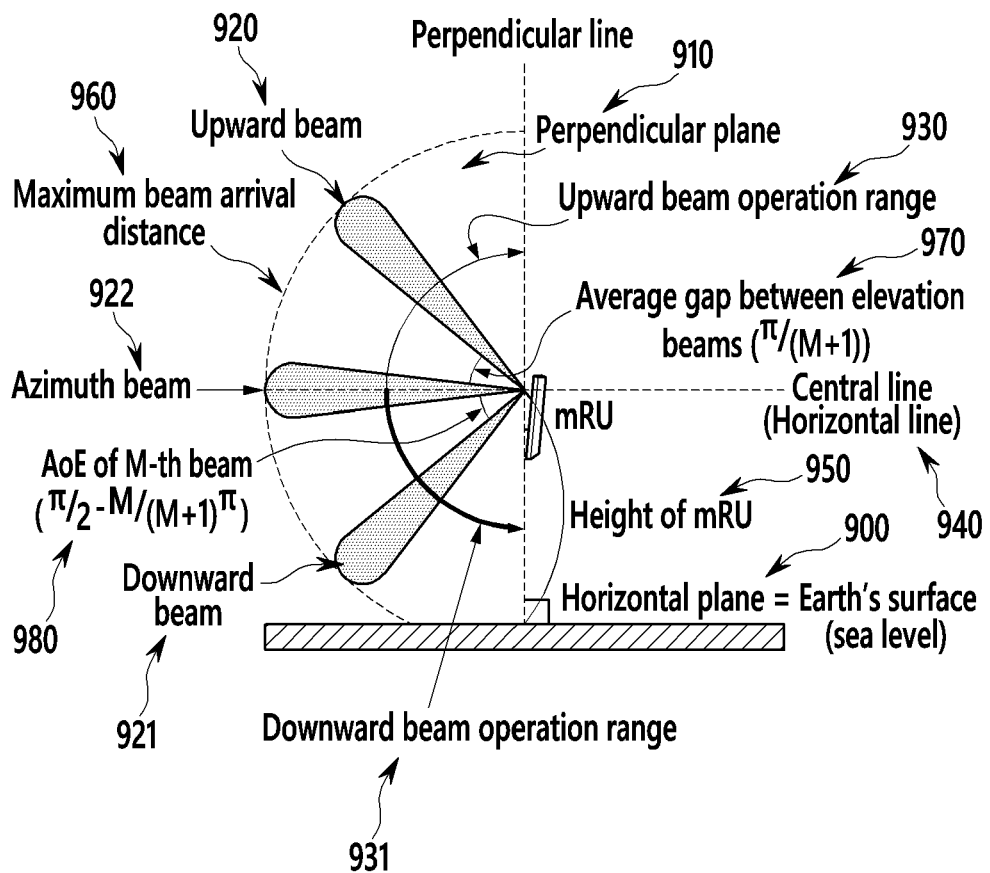
FIG. 10 shows the magnitude of an upward angle or a downward angle of a beam on a perpendicular plane that exists perpendicularly to a horizontal plane (e.g., the earth's surface).

FIG. 10 shows the magnitude of an upward angle or a downward angle of a beam on a perpendicular plane 910 that is perpendicular to a horizontal plane 900 (e.g., the earth's surface).

A method for forming elevation beams included in an mRU 132 and a method for searching beams by the mTE 140 will now be described.

As exemplarily illustrated in FIG. 10, the mTE 140 determines upward and downward altitudes with reference to the mRU 132 based on an upward angle of an upward beam 920 or a downward angle of a downward beam 921 on the perpendicular plane 910. Here, the perpendicular plane 910 is perpendicular to the horizontal plane (e.g., the earth's surface).

Thus, an operation range 930 of the upward beam 920 becomes 0 to $\pi/2$ in a vertical line (e.g., upward) from a central line (e.g., a horizontal line) 940 that is parallel with the horizontal plane 900. In addition, an operation range 931 of the downward beam 921 becomes 0 to $\pi/2$ in a vertical line (e.g., downward) from the central line 940 that is parallel with the horizontal plane 900.

When the mRU 132 having a predetermined height 950 transmits or receives at least one beam in directions of the upward direction, the downward direction, and a horizontal direction on the perpendicular plane 910, as shown in FIG. 4, a maximum arrival distance 960 of the upward beam 920, the downward beam 921, or the azimuth beam 922 corresponds to transmission power of the mRU 132 and reception power of the mTE 140.

An average gap 970 between elevation beams is $\pi/(M+1)$. When the number of elevation beams is M, an AoE 980 of an M-th beam is $\pi/2 - M\pi/(M+1)$.

FIG. 11 shows an average gap between elevation beams included in the mRU and a beam AoE according to the number of elevation beams included in an mRU of a home base station according to the exemplary embodiment of the present invention. In the present specification, the home base station implies a base station that the mTE 140 currently accesses, and a neighboring base station implies a neighboring base station that neighbors the home base station.

As shown in FIG. 11, an mRU 132 determines an average gap 1010 between elevation beams and an AoE 1020 of each elevation beam according to a number 1000 of elevation beams included in the mRU 132.

For example, in a case 1001 in which a number of elevation beams included in a k-th mRU 132 is M, an average gap between the elevation beams included in the k-th mRU 132 is $\pi/(M+1)$ 1011. In addition, among the M elevation beams included in the k-th mRU 132, an AoE of the first elevation beam is $\pi/2 - \pi/(M+1)$ 1021, an AoE of the second elevation beam is $\pi/2 - 2\pi/(M+1)$ 1022, an AoE of the third elevation beam is $\pi/2 - 3\pi/(M+1)$ 1023, and an AoE of the last elevation beam is $\pi/2 - M\pi/(M+1)$ 1024.

Figure 12:
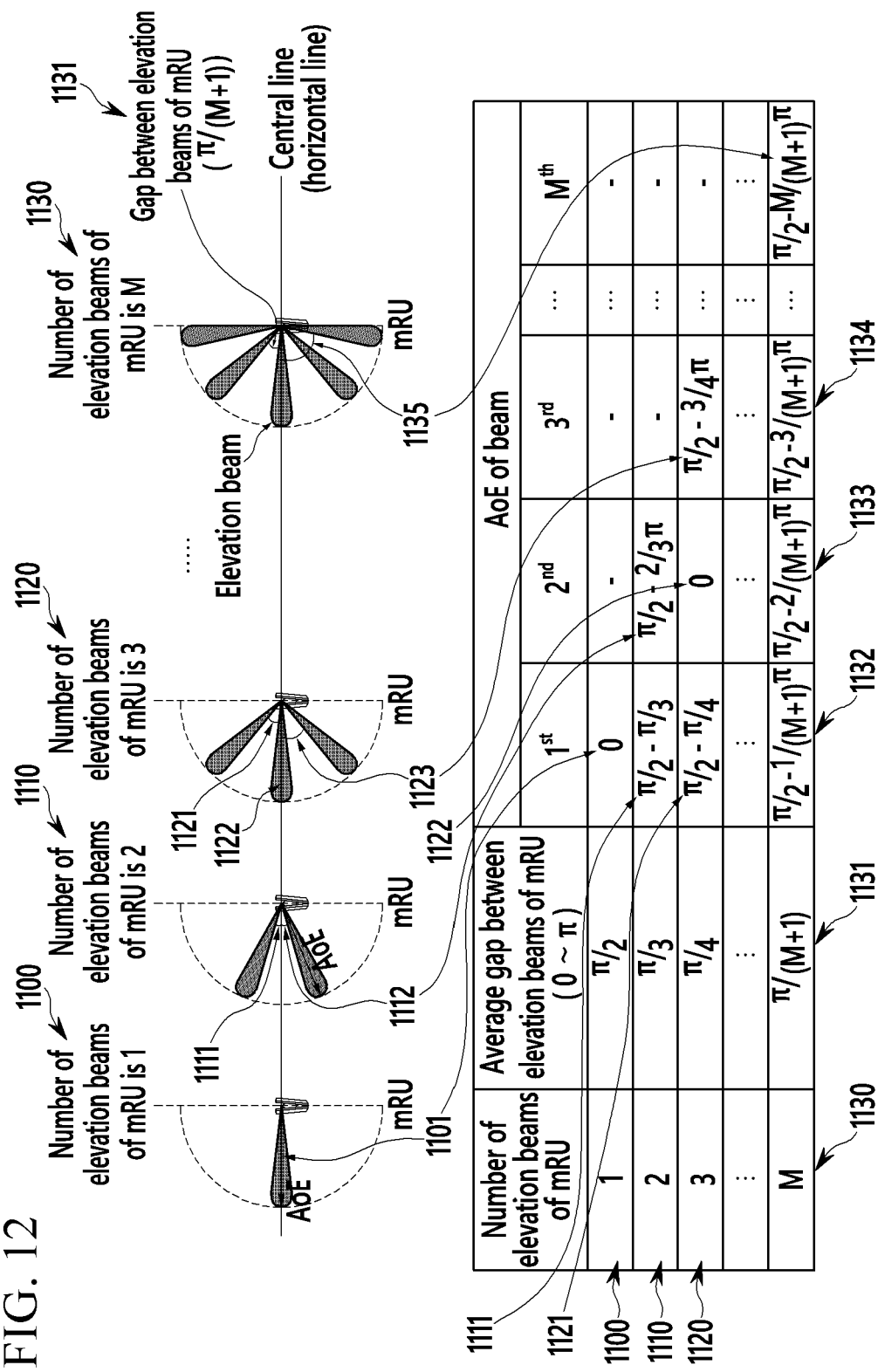
FIG. 12 shows a configuration of each beam and AoEs of beams in a case that the number of elevation beams of the mRU is increased according to the exemplary embodiment of the present invention.

FIG. 12 shows a configuration of each beam and AoEs of beams in a case that the number of elevation beams of the mRU is increased according to the exemplary embodiment of the present invention.

As shown in FIG. 12, a configuration related to elevation beams of the mRU 132 can be further specified according to the number of beams. That is, FIG. 12 illustrates a configuration of each elevation beam and a configuration of an AoE of the elevation beam in a case that the number of elevation beams included in the mRU 132 is increased.

The configurations may be represented as a variation value of an AoE according to the number of elevation beams. For example, when the number of elevation beams included in the mRU 132 is 1 (refer to reference numeral 1100), an AoE of the first elevation beam is 0 (refer to reference numeral 1101).

As another example, when the number of elevation beams is 2 (refer to reference numeral 1110), an AoE of the first elevation beam is $\pi/2-\pi/3$ (refer to reference numeral 1111 and an AoE of the second elevation beam is $\pi/2-2\pi/3$ (refer to reference numeral 1112).

An another example, when the number of elevation beams is 3 (refer to reference numeral 1120), an AoE of the first elevation beams is $\pi/2-\pi/4$, i.e., reference numeral 1121, an AoE of the second elevation beam is 0, i.e., reference numeral 1122, and an AoE of the third elevation beam is $\pi/2-3\pi/4$ i.e., reference numeral 1123.

As another example, when the number of elevation beams is 3 (refer to reference numeral 1130), an average gap between elevation beams is $\pi/(M+1)$ (refer to reference numeral 1131), an AoE of the first elevation beam is $\pi/2-\pi/(M+1)$ (refer to reference numeral 1132), an AoE of the second elevation beam is $\pi/2-2\pi/(M+1)$ (refer to reference numeral 1133), an AoE of the third elevation beam is $\pi/2-3\pi/(M+1)$ (refer to reference numeral 1134), and an AoE of an M-th elevation beam is $\pi/2-M\pi/(M+1)$ (refer to reference numeral 1135).

Figure 13:
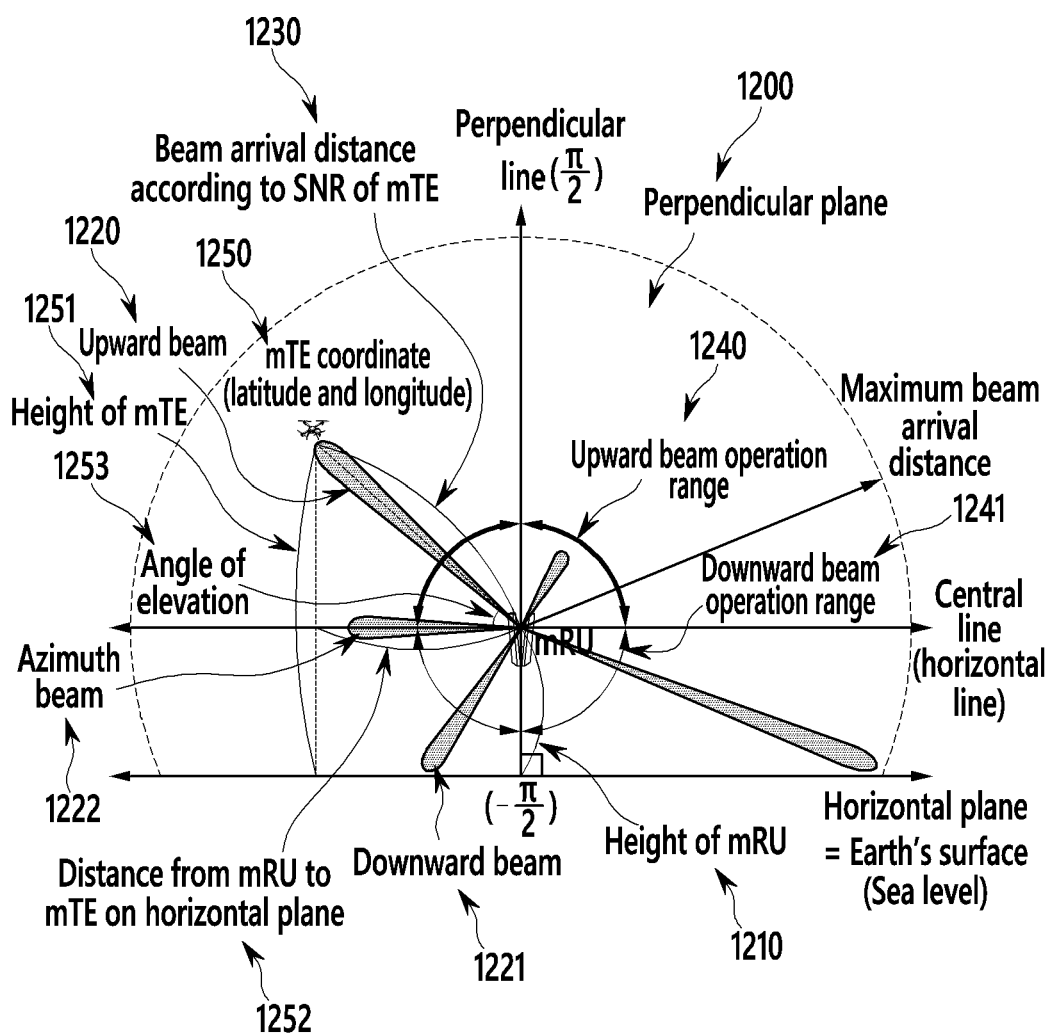
FIG. 13 shows an upward or downward configuration of a beam with respect to the mTE on the perpendicular plane according to the exemplary embodiment of the present invention.

FIG. 13 shows an upward or downward configuration of a beam with respect to the mTE on the perpendicular plane according to the exemplary embodiment of the present invention.

As shown in FIG. 13, elevation beams included in the mRU 132 form upward beams and downward beams with respect to the mTE 140 on a perpendicular plane 1200.

The home base station mRU 132 having a predetermined height 1210 transmits and receives at least one of an upward beam 1220, a downward beam 1221, and an azimuth beam 1222 on the perpendicular plane 1200. A maximum arrival distance of the upward beam 1220, the downward beam 1221, or the azimuth beam 1222 corresponds to transmission power of the mRU 132 and reception power strength (e.g., an SNR) of the mTE 140.

A reception beam arrival distance 1230 of the mTE 140 is shorter than or equal to the maximum arrival distance depending on the reception power strength (e.g., the SNR) of the mTE 140.

An operation range 1240 of the upward beam 1220 is greater than or equal to 0, and smaller than $\pi/2$.

An operation range 1241 of the downward beam 1221 is greater than or equal to $-\pi/2$, and smaller than 0.

Location-related shape information of the mTE 140 (e.g., location information of the mTE 140 in a three-dimensional space) may be represented by location coordinates (e.g., a latitude, a longitude) 1250 of the mTE 140, a height 1251 of the mTE 140, a reception beam arrival distance 1230 of the mTE 140, a distance 1252 from the mRU 132 to the mTE 140 on a horizontal plane (e.g., the earth's surface), an AoE 1253 on the perpendicular plane 1200 that perpendicularly exists with respect to the horizontal plane (e.g., the earth's surface), and the like. The location-related shape information of the mTE 140 may be used for calculating a distance, a speed, and a directional angle for the mTE 140 for moving to a target location.

Figure 14:
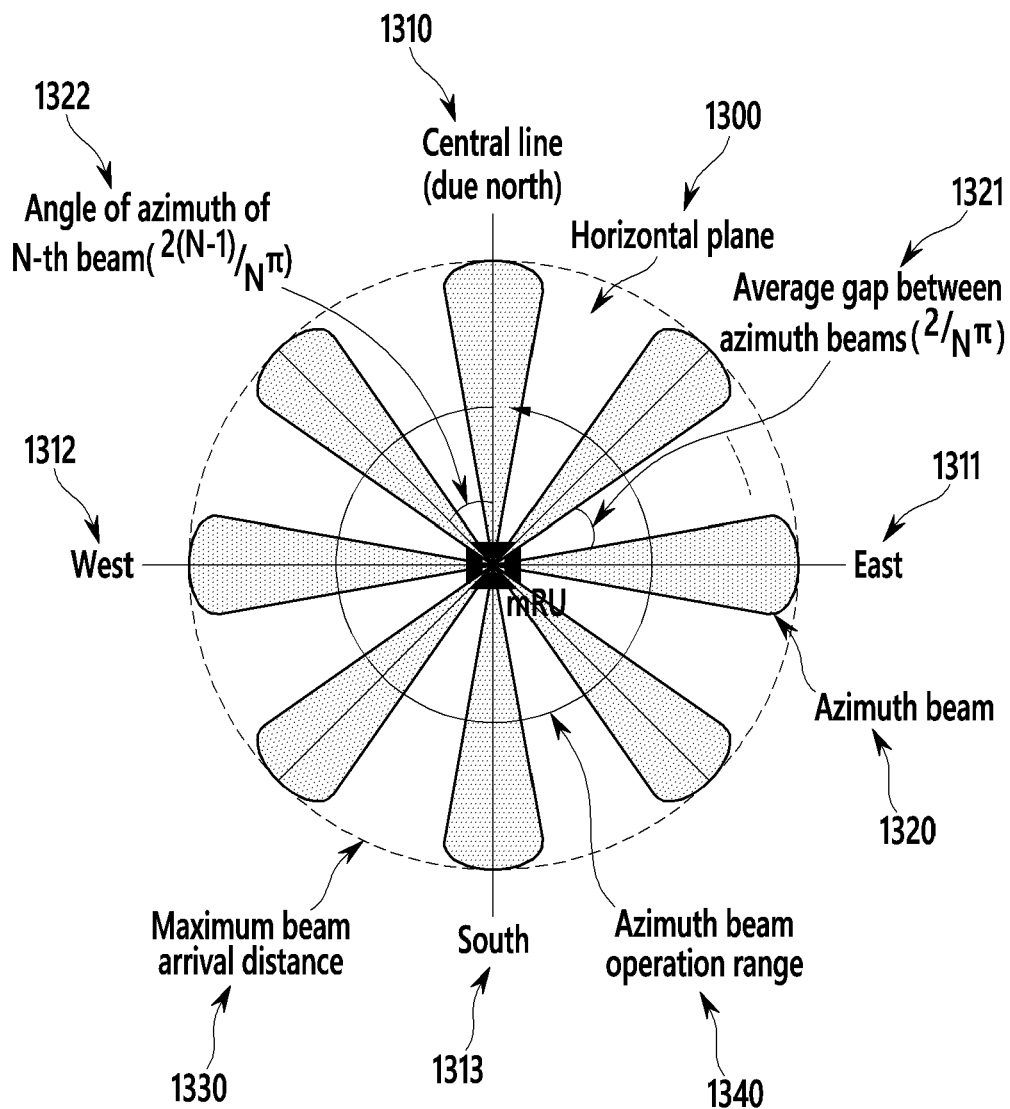
FIG. 14 shows a degree of inclination (e.g., an angle of azimuth) of the beam in four directions with reference to due north on the horizontal plane (e.g., the earth's surface) according to the exemplary embodiment of the present invention.

FIG. 14 shows a degree of inclination of the beam in four directions with reference to due north on the horizontal plane (e.g., the earth's surface) according to the exemplary embodiment of the present invention.

A method for forming azimuth beams included in the mRU 132 and a method for the mTE 140 to perform beam search will now be described.

As shown in FIG. 14, the mRU 132 determines an average gap between azimuth beams 1320 and an AoA 1322 of all beams (in a case that a maximum number of beams is N) according to the number of azimuth beams 1320 included in the mRU 132. Specifically, an average gap 1321 between the azimuth beams 1320 and the AoA 1322 of the all beam (in a case that the maximum number of beams is N) are determined based on a degree of indication of a beam to the east 1311, west 1312, south 1313, and north 1310 with reference to the central line (e.g., due north) 1310 on the horizontal plane (e.g., the earth's surface) 1300.

That is, the base station mRU 132 transmits and receives at least one beam in four directions 1311, 1312, 1313, and 1310 on the horizontal plane 1300.

A maximum beam arrival distance 1330 of the azimuth beam 1320 corresponds to transmission power of the mRU 132 and reception power of the mTE 140.

The average gap 1321 between azimuth beams 1320 is $2\pi/N$.

When the number of azimuth beams 1320 is N, the AoA 1322 of the N-th azimuth beam 1320 is $(2(N-1)\pi)/N$.

An operation range 1340 of the azimuth beam 1320 is greater than or equal to 0 and smaller than $2\pi$.

The configuration of the azimuth beam 1320 of the mRU 132 shown in FIG. 14 can be further specified according to a number 1400 of the azimuth beams 1320 as shown in FIG. 15.

FIG. 15 shows an average gap between azimuth beams of the mRU and an AoA of each azimuth beam according to the number of azimuth beams included in the base station mRU according to the exemplary embodiment of the present invention.

Specifically, an average gap 1410 between azimuth beams of the mRU 132 and an AoA 1420 of each azimuth beam according to the number 1400 of the azimuth beams included in the mRU 132 are exemplarily illustrated in FIG. 15.

For example, when the number of azimuth beams included in a k-th mRU 132 is N (refer to reference numeral 1401), an average gap between azimuth beams included in the mRU 132 is $2\pi/N$ (refer to reference numeral 1411), and among the N azimuth beams, an AoA of the first azimuth beam is 0 (refer to reference numeral 1421), an AoA of the second azimuth beam is $2\pi/N$ (refer to reference numeral 1422), an AoA of the third azimuth beam is $4\pi/N$ is (refer to reference numeral 1423), and an AoA of the N-th azimuth beam is $(2(N-1)\pi)/N$ (refer to reference numeral 1424).

Figure 16:
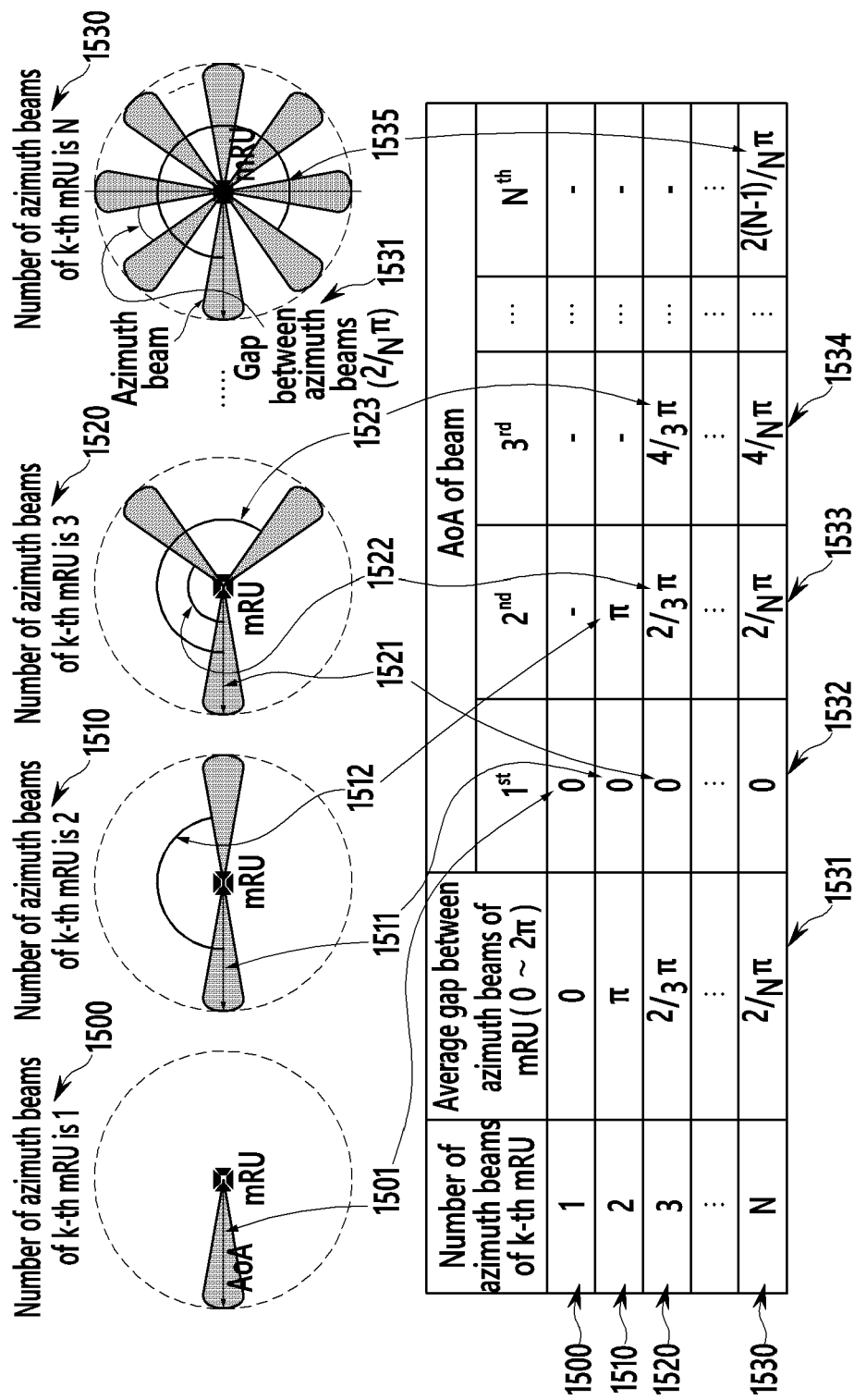
FIG. 16 shows a configuration of each azimuth beam and AoAs of beams in a case that the number of azimuth beams included in the mRU is increased according to the exemplary embodiment of the present invention.

FIG. 16 shows a configuration of each azimuth beam and AoAs of beams in a case that the number of azimuth beams included in the mRU is increased according to the exemplary embodiment of the present invention.

A configuration of the azimuth beams included in the mRU 132 shown in FIG. is as shown in FIG. 16. Specifically, FIG. 16 exemplarily shows a configuration of each azimuth beam and an AoA of each azimuth beam in the case that the number of azimuth beams included in the mRU 132 is increased.

Such a configuration can be represented by a variation value of an AoA according to the number of azimuth beams.

For example, when the number of azimuth beams included in the mRU 132 is 1 (refer to reference numeral 1500), an AoA of the first azimuth beam is 0 (refer to reference numeral 1501).

As another example, when the number of azimuth beams included in the mRU 132 is 2 (refer to reference numeral 1510), an AoA of the first azimuth beam is 0 (refer to reference numeral 1511) and an AoA of the second azimuth beam is k (refer to reference numeral 1512).

As another example, when the number of azimuth beams included in the mRU 132 is 3 (refer to reference numeral 1520), an AoA of the first azimuth beam is 0 (refer to reference numeral 1521), an AOA of the second azimuth beam is $2\pi/3$ (refer to reference numeral 1522), and an AoA of the third azimuth beam is $4\pi/3$ (refer to reference numeral 1523).

As still another example, when the number of azimuth beams included in the mRU is N (refer to reference numeral 1530), an average gap between the azimuth beams is $2\pi/N$ (refer to reference numeral 1531). Among the N azimuth beams, an AoA of the first azimuth beam is 0 (refer to reference numeral 1532), an AoA of the second azimuth beam is $2\pi/N$ (refer to reference numeral 1533), an AoA of the third azimuth beam is $4\pi/N$ (refer to reference numeral 1534), and an AoA of the N-th azimuth beam is $2(N-1)\pi/N$ (refer to reference numeral 1535).

Figure 17:
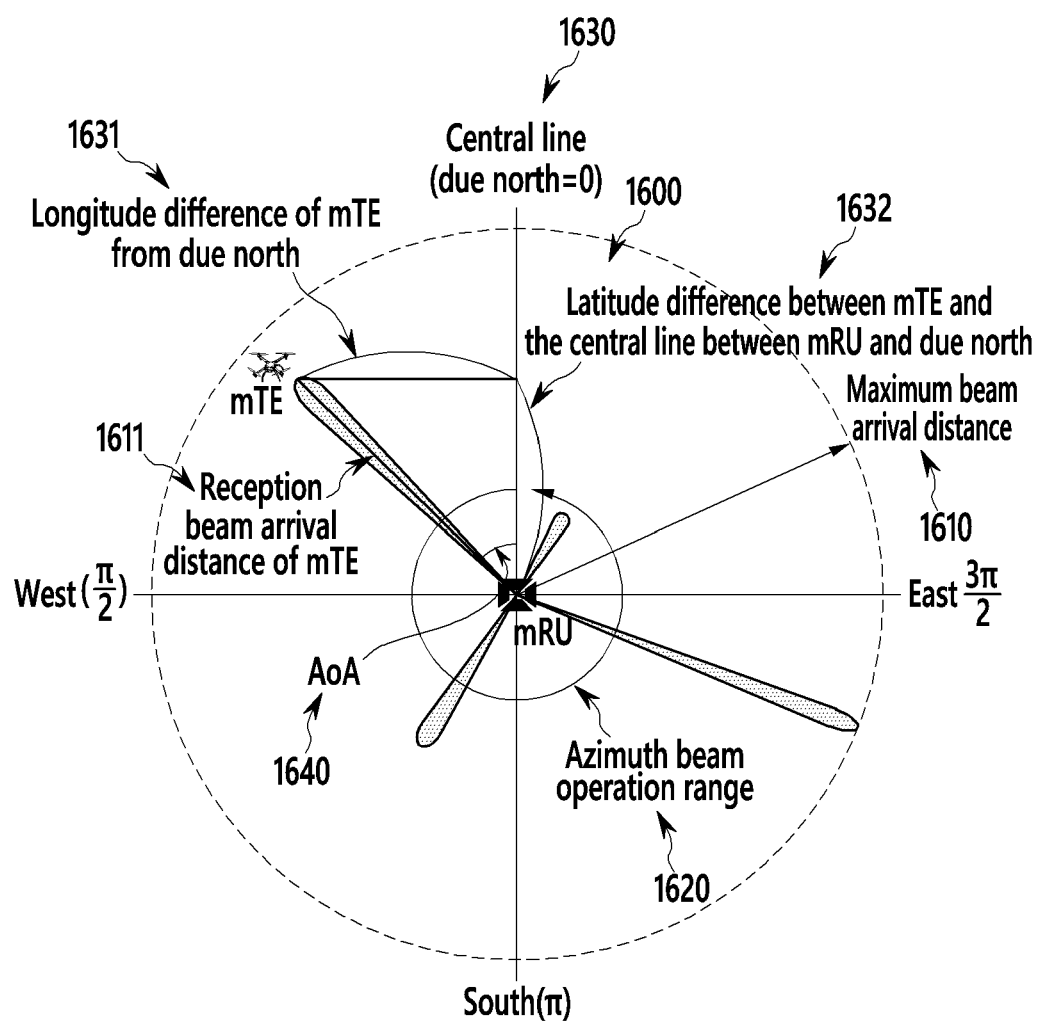
FIG. 17 shows an operation configuration and a concept of beams with respect to the mTE on a horizontal plane according to the exemplary embodiment of the present invention.

FIG. 17 shows an operation configuration and a concept of beams with respect to the mTE on a horizontal plane according to the exemplary embodiment of the present invention.

Specifically, FIG. 17 illustrates a configuration, an operation, and a concept of the azimuth beams with respect to the mTE 140 on a horizontal plane 1600.

The home base station mRU 132 having a predetermined height transmits and receives at least one azimuth beam on the horizontal plane 1600.

A maximum beam arrival distance 1610 of the azimuth beam corresponds to transmission power of the mRU 132 and reception power of the mTE 140.

A reception beam arrival distance 1611 of the mTE 140 is equal to or shorter than the maximum beam arrival distance 1610 of the azimuth beam depending on the reception power of the mTE 140.

An operation range 1620 of the azimuth beam is equal to or greater than 0 and smaller than $2\pi$.

A location of the mTE 140 may be represented by a longitude difference 1631 between the mTE 140 and the mRU 132 (i.e., a longitude difference between the mTE 140 and due north 1630) and a latitude difference 1632 from the central line between the mRU 132 and the due north to the mRU 132 to the mTE 140.

An AoA 1640 is represented by an angle that is inclined to a counterclockwise direction with reference to due north.

Figure 18:
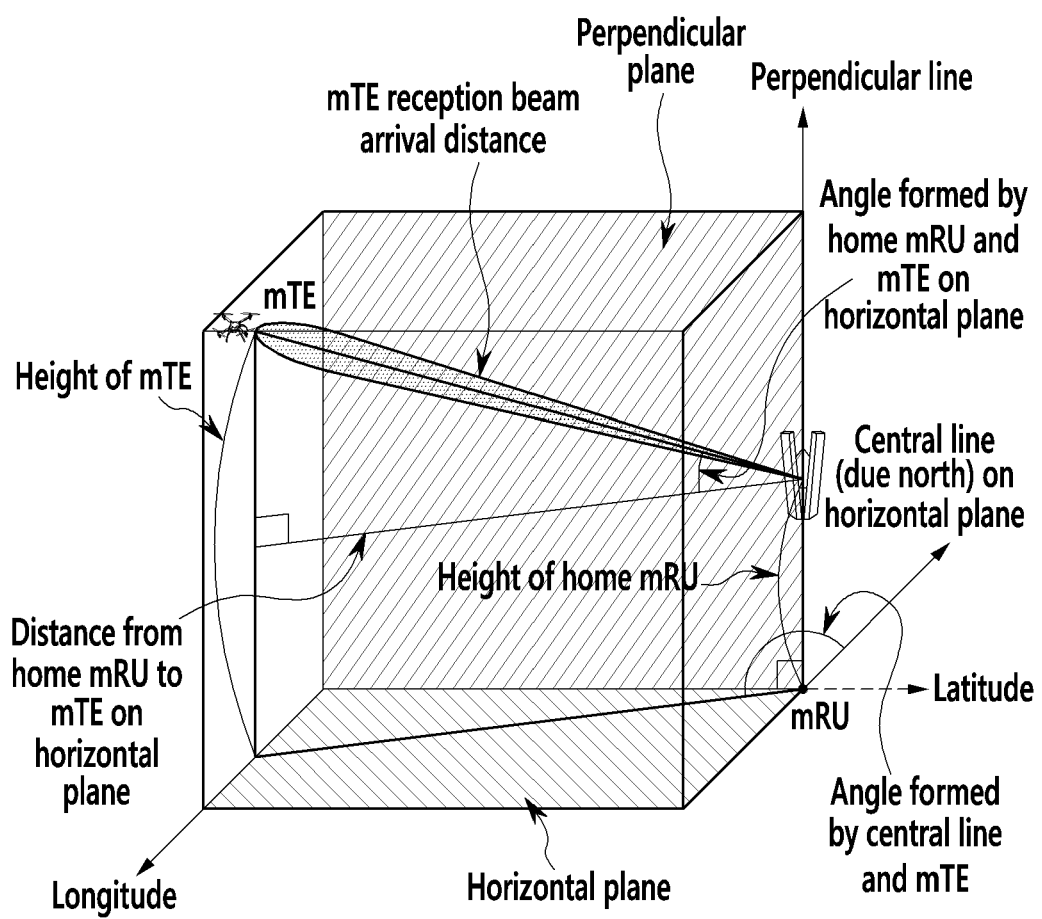
FIG. 18 shows a configuration between the mRU and the mTE and a beam operation state in a 3D space according to the exemplary embodiment of the present invention.

FIG. 18 shows a configuration between the mRU and the mTE and a beam operation state in a 3D space according to the exemplary embodiment of the present invention.

Specifically, in FIG. 18, the spatial information between the mRU 132 and the mTE 140 shown in FIG. 13 and the spatial information between the mRU 132 and the mTE 140 shown in FIG. 14 are illustrated together in the 3D space.

The mTE 140 accesses a beam transmitted from the mRU 132. In the 3D space, a configuration between the mTE 140 and the mRU 132 and a beam configuration between the mRU 132 and the mTE 140 are as shown in FIG. 18.

FIG. 19 shows elevation and azimuth beam operation states of the mRU (e.g., whether or not a drone uses the corresponding beam is displayed) according to the exemplary embodiment of the present invention. Specifically, in FIG. 19, operation states of elevation and azimuth beams included in the mRU 132 are represented as coordinate values according to an index of each beam.

A method for the mTE 140 to search a transmission beam of the mRU 132 will now be described.

The base station and the mTE 140 continuously attempt a handover for a new base station while being stopped or moving to thereby maintain radio link quality due to mmWave-based mobile communication. In this case, the base station and the mTE 140 continuously perform cell search for the handover.

The cell search is performed through a synchronization channel. The synchronization channel is transmitted through a downlink.

For efficiency and speed in the cell search of the mTE 140, the mRU 132 of the base station displays an operation state (i.e., whether or the mTR 140 uses the corresponding beam) of elevation and azimuth beams included in the mRU 132 by using coordinates according to an elevation beam index 1700 and an azimuth beam index 1710, FIG. 19 illustrates a beam operation state table. The mTE 140 may receive information for the beam operation state table through a beam that corresponds to a current location of the mTE 140 among a plurality of beams transmitted by the mRU 132, and may generate (or update) the beam operation state table using the received information.

In the present specification, beams (i,j) (here, $1 \leq i \leq M$, $1 \leq j \leq N$) correspond to an i-th elevation beam among M elevation beams included in the mRU 132 and a j-th azimuth beam among N azimuth beams included in the mRU 132.

Specifically, when the beams (i,j) are not used by the mTE 140, an operation state of the beams (i,j) is stored as 0 (refer to reference numeral 1730). In addition, when the beams (i,j) are used by the mTE 140, ah operation state of the beams (i,j) is stored as location coordinates (e.g., a latitude and a longitude) of the mTE 140 (refer to reference numeral 1731). For example, the operation state of the beams (i,j) may be stored as a location (e.g., altitude and longitude) where the beams (i,j) are used by the mTE 140. In FIG. 19, $(la_{mTE(i,j)}^{k}, lo_{mTE(i,j)}^{k})$ denote a latitude and a longitude of the corresponding mTE 140 in a case that the beams (i,j) among beams included in a k-th mRU 132 used by the mTE 140.

Figure 20:
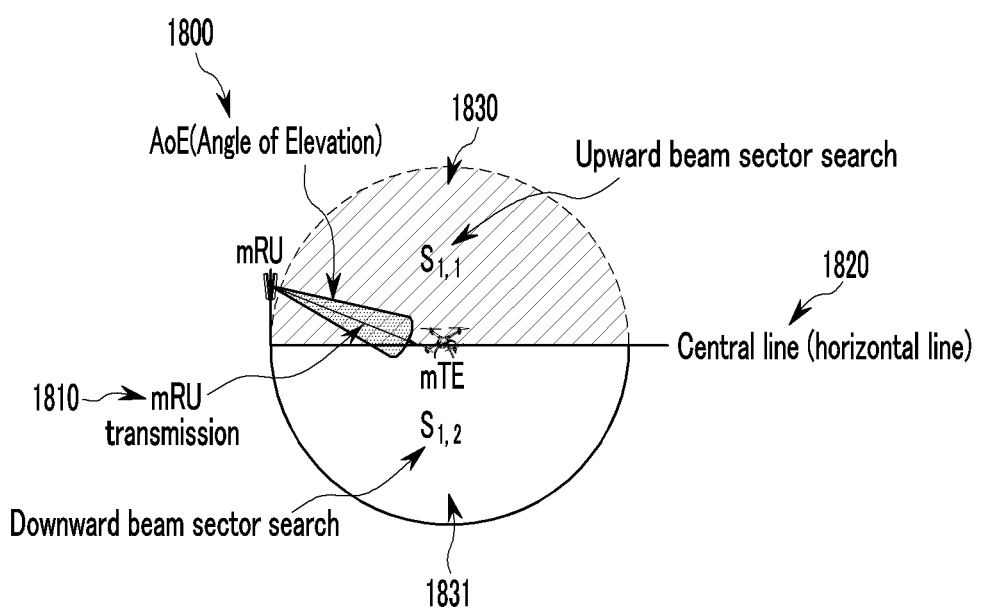
FIG. 20 shows a method for the mTE to search transmission beams of the mRU with respect to a perpendicular direction according to the exemplary embodiment of the present invention.

FIG. 20 shows a method for the mTE to search transmission beams of the mRU with respect to a perpendicular direction according to the exemplary embodiment of the present invention.

As shown in FIG. 20, the mTE 140 performs beam training for searching an upward direction 1830 and a downward direction 1831 with reference to an earth's surface line 1820, which is a central line, to thereby search a transmission beam 1810 having an AoE 1800 among transmission beams included in the mRU 132.

That is, the mTE 140 divides (i.e., inter-sectors) an area (beam sector) for the beam search into an upward area (e.g., an upward beam sector ($S_{1,1}$)) and a downward area (e.g., a downward beam sector ($S_{1,2}$)) with reference to the earth's surface line 1820 and performs beam search with respect to each of the beam sectors ($S_{1,1}$ and $S_{1,2}$).

Figure 21:
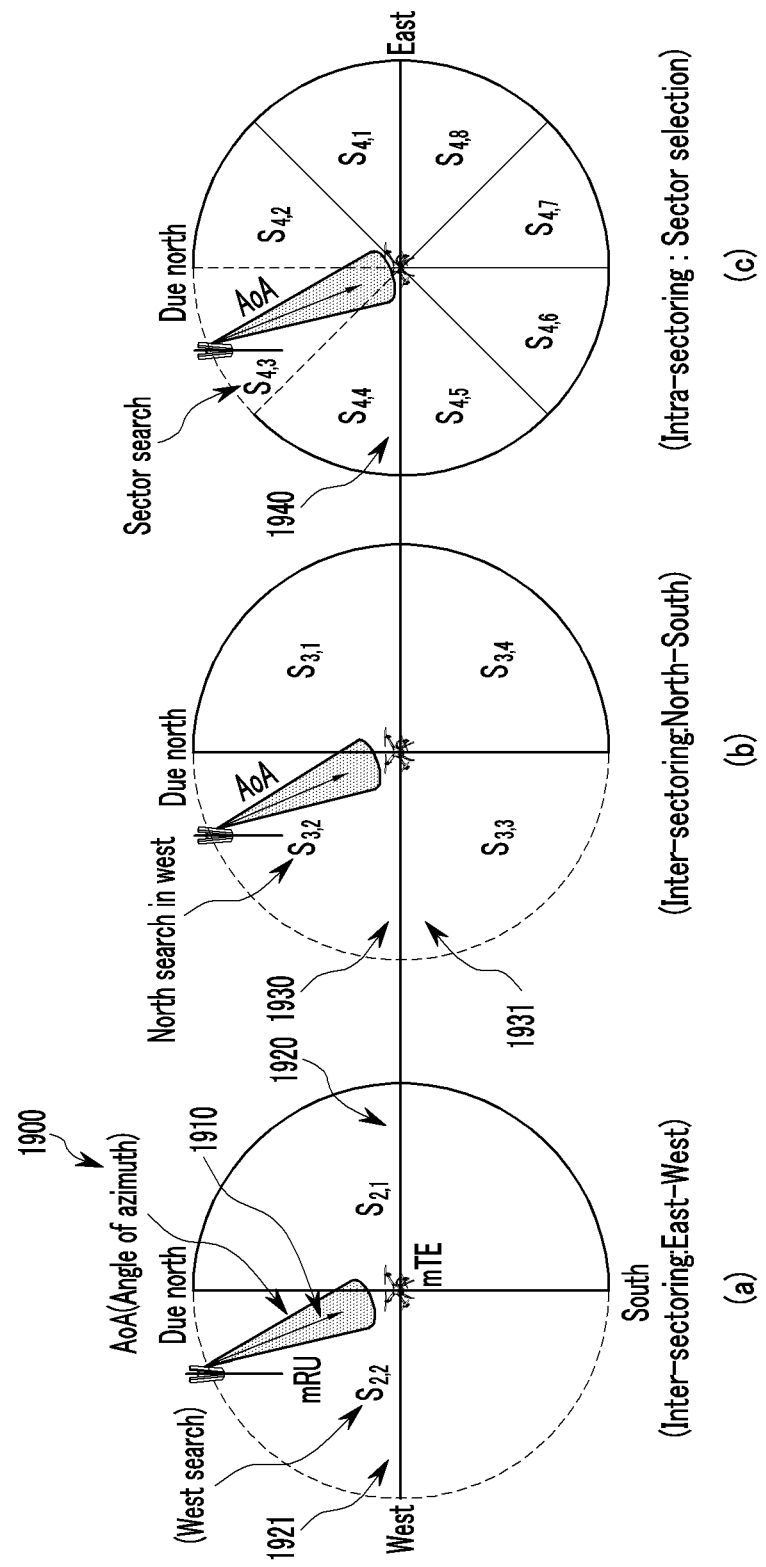
FIG. 21 shows a method for the mTE to perform beam search with respect to transmission beams included in the mRU in a horizontal direction according to the exemplary embodiment of the present invention.

FIG. 21 shows a method for the mTE to perform beam search with respect to transmission beams included in the mRU in a horizontal direction according to the exemplary embodiment of the present invention.

As shown in FIG. 21, the mTE 140 performs beam training to search a direction of a beam with reference to east, west, south, and north directions on the horizontal plane so as to search a transmission beam 1910 having an AoA 1900 among transmission beams included in the mRU 132.

Specifically, as shown in (a) of FIG. 21, the mTE 140 divides (i.e., inter-sectors) a beam sector into an east beam sector ($S_{2,1}$) 1920 and a west beam sector ($S_{2,2}$) 1921 with reference to due north, and performs beam search with respect to each of the beam sectors ($S_{2,1}$ and $S_{2,2}$).

Next, as shown in (b) of FIG. 21, when one of the east beam sector ($S_{2,1}$) and the west beam sector ($S_{2,2}$) is selected, the mTE 140 divides (i.e., inter-sectors) the selected beam sector into north beam sectors ($S_{3,1}$ to $S_{3,2}$) 1930 and south beam sectors ($S_{3,3}$ to $S_{3,4}$) 1931 and performs beam search with respect to each of the beam sectors ($S_{3,1}$ to $S_{3,2}$ and $S_{3,3}$ to $S_{3,4}$). For example, when the west beam sector ($S_{2,2}$) is selected, the mTE 140 divides the west beam sector ($S_{2,2}$) into a north beam sector ($S_{3,2}$) and a south beam sector ($S_{3,3}$) and performs beam search with respect to the respective beam sectors ($S_{3,2}$ and $S_{3,3}$).

Next, as shown in (c) of FIG. 21, when one of the north beam sectors $S_{3,1}$ to $S_{3,2}$ and the south beam sectors $S_{3,3}$ to $S_{3,4}$ is selected, the mTE 140 divides (e.g., intra-sectors) the selected sector (one quadrant) into half (i.e., $S_{4,1}$ to $S_{4,2}$, $S_{4,3}$ to $S_{4,4}$, $S_{4,5}$ to $S_{4,6}$, $S_{4,7}$ to $S_{4,8}$) (refer to reference numeral 1940) and performs a beam search with respect to the divided beam sectors. For example when the north beam sector ($S_{3,2}$) is selected from among the north beam sector ($S_{3,2}$) and the south beam sector ($S_{3,3}$), the mTE 140 divides the selected north beam sector ($S_{3,2}$) into half ($S_{4,3}$ to $S_{4,4}$) and performs a beam search with respect to the divided beam sectors ($S_{4,3}$ to $S_{4,4}$). In (c) of FIG. 21, a case that the beam sector ($S_{4,3}$) is selected from among the beam sectors ($S_{4,3}$, $S_{4,4}$) through the beam search is shown. Meanwhile, the intra-sectoring with respect to one quadrant (e.g., 1940) may be increased depending on transmission power strength (or, reception power strength of the mTE 140) of the mRU 132 and a width of a beam output from a radio frequency (RF). For example, one quadrant may be divided into two or more beam sectors.

Figure 22:
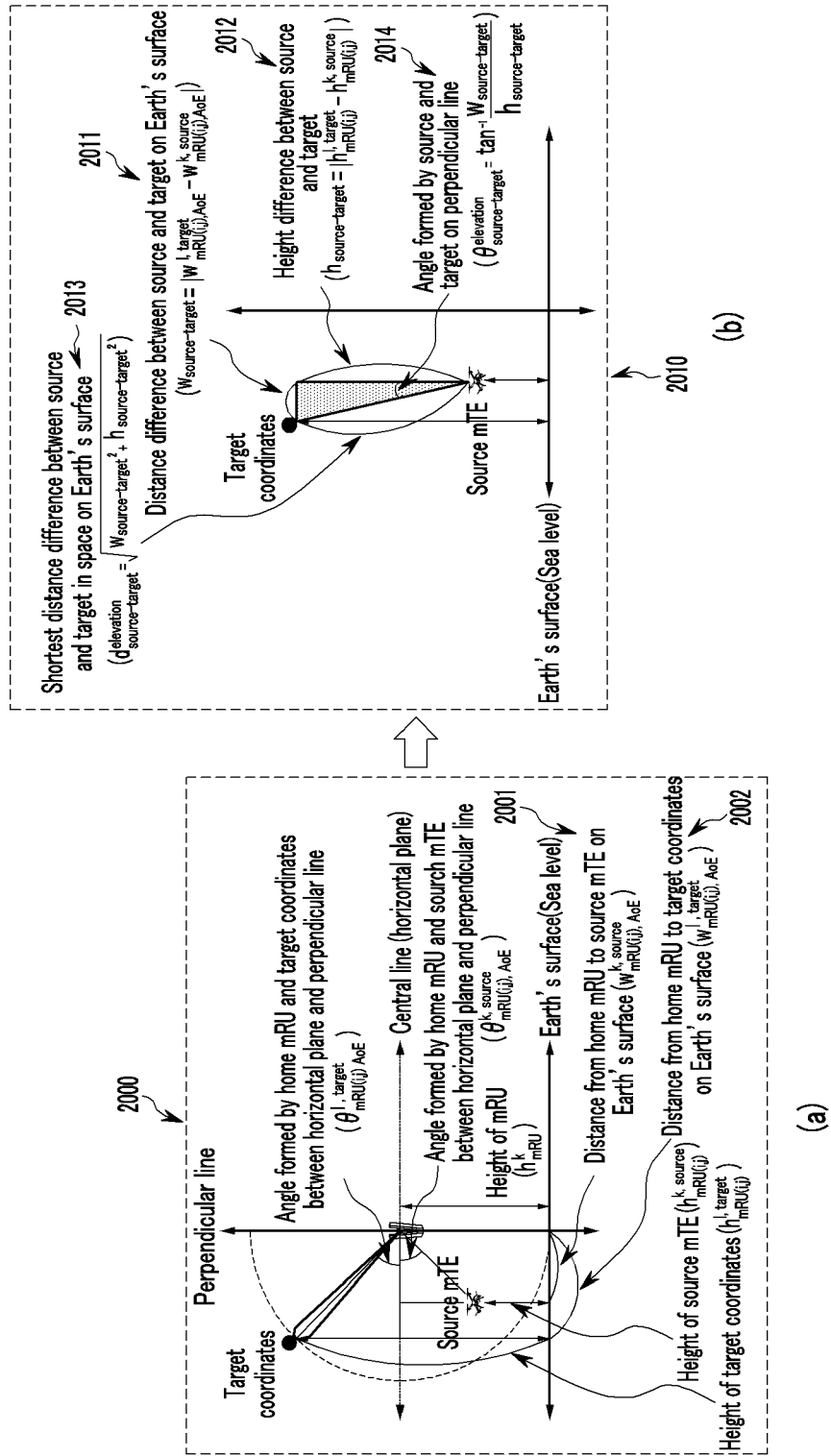
FIG. 22 shows a method for calculating a distance and an angle difference between a source mTE included in a k-th mRU and a target location included in an l-th mRU on a perpendicular plane according to the exemplary embodiment of the present invention.

FIG. 22 shows a method for calculating a distance and an angle difference between a source mTE included in a k-th mRU and a target location included in an l-th mRU on a perpendicular plane according to the exemplary embodiment of the present invention.

Specifically, FIG. 22 illustrates a configuration of the source mTE 140 included in the k-th mRU 132 and the target location (i.e., target coordinates) included in the l-th mRU 132 when the k-th mRU 132 is viewed from the front, and a method for calculating a distance and an angle difference between the source mTE 140 and the target location on the perpendicular plane.

The beam sectoring and the beam search processes are sequentially performed in the order of the east search and west search, the north search and south search, and the quadrant search for the upward beam search. In addition, the beam sectoring and the beam search processes are sequentially performed in the order of the east search and the west search, the north search and the south search, and the quadrant search for the downward beam search.

A method for forming location information between the source mTE 140 and the target location with respect to mRU 132 will now be described.

As shown in FIG. 22, a height, a distance, and a directional angle on a perpendicular plane for the mRU 132, the source mTE 140, and the target location are set, and a height difference, a distance difference, and an angle between the source mTE 140 and the target location are set and calculated accordingly. For example, the distance difference and the angle (e.g., an AoA) can be calculated according to a method exemplarily illustrated in FIG. 38, which will be described later. As another example, a height difference (e.g., an AoE), a distance difference, and an angle (e.g., an AoA) can be calculated according to a method shown in FIG. 39, which will be described later.

In (a) of FIG. 22, a case 2000 of setting heights, distances, and directional angles of the source mTE 140 and the target location in a view from a front with reference to the home base station mRU 132 is illustrated.

In (b) of FIG. 22, a method 2010 for calculating a height difference on a perpendicular plane, a distance difference on a perpendicular plane, and angles on a perpendicular plane between the source mTE 140 and the target location is illustrated.

When the source mTE 140 and the target location are included in the same mRU 132, k and l are equal to each other.

Specifically, in (a) of FIG. 22, the source mTE 140 calculates (refer to reference numeral 2001) a distance $w_{mRU(i,j),AOE}^{k,source}$ from the mRU 132 to the source mTE 140 on the earth's surface through a home mRU 132 having a height $h_{mRU}^k$ from the earth's surface and an angle $\theta_{mRU(i,j),AOE}^{k,source}$ and a height $h_{mRU(i,j)}^{k,source}$ formed by the home mRU 132 and the source mTF 140 between the horizontal plane and the perpendicular line. In addition, the source mTE 140 calculates (refer to reference numeral 2002) a distance $w_{mRU(i,j),AOE}^{l,target}$ the home mRU 132 to the target location on the earth's surface through the angle $\theta_{mRU(i,j),AOE}^{l,target}$ and the height $h_{mRU(i,j)}^{l,target}$ formed by the mRU 132 and the target location between the horizontal plane and the perpendicular line.

In (b) of FIG. 22, the source mTE 140 calculates a distance difference $w_{source-target}=|w_{mRU(i,j),AOE}^{l,target}-w_{mRU(i,j),AOE}^{k,source}|$ 2011 and a height difference $h_{source-target}=|h_{mRU(i,j)}^{l,target}-h_{mRU(i,j)}^{k,source}|$ 2012 between the source mTE 140 and the target location by using the distance $w_{mRU(i,j),AOE}^{k,source}$ the home mRU 132 to the source mTE 140 and the distance $w_{mRU(i,j),AOE}^{l,target}$ between the home mRU 132 to the target location on the earth's surface. In addition, the source mTE 140 calculates a shortest distance difference $d_{source-target}^{elevation}=\sqrt{w_{source-target}^2+h_{source-target}^2}$ between the source mTE 140 and the target location in a space on the earth's surface (refer to reference numeral 2013) and calculates an angle $$\theta_{source-target}^{elevation} = \tan^{-1}\frac{w_{source-target}}{h_{source-target}}$$

formed by the source mTE 140 and the target location on the perpendicular line (refer to reference numeral 2014) by using the distance difference $w_{source-target}=|w_{mRU(i,j),AOE}^{l,target}-w_{mRU(i,j),AOE}^{k,source}|$ and the height difference $h_{source-target}=|h_{mRU(i,j)}^{l,target}-h_{mRU(i,j)}^{k,source}|$.

Figure 23:
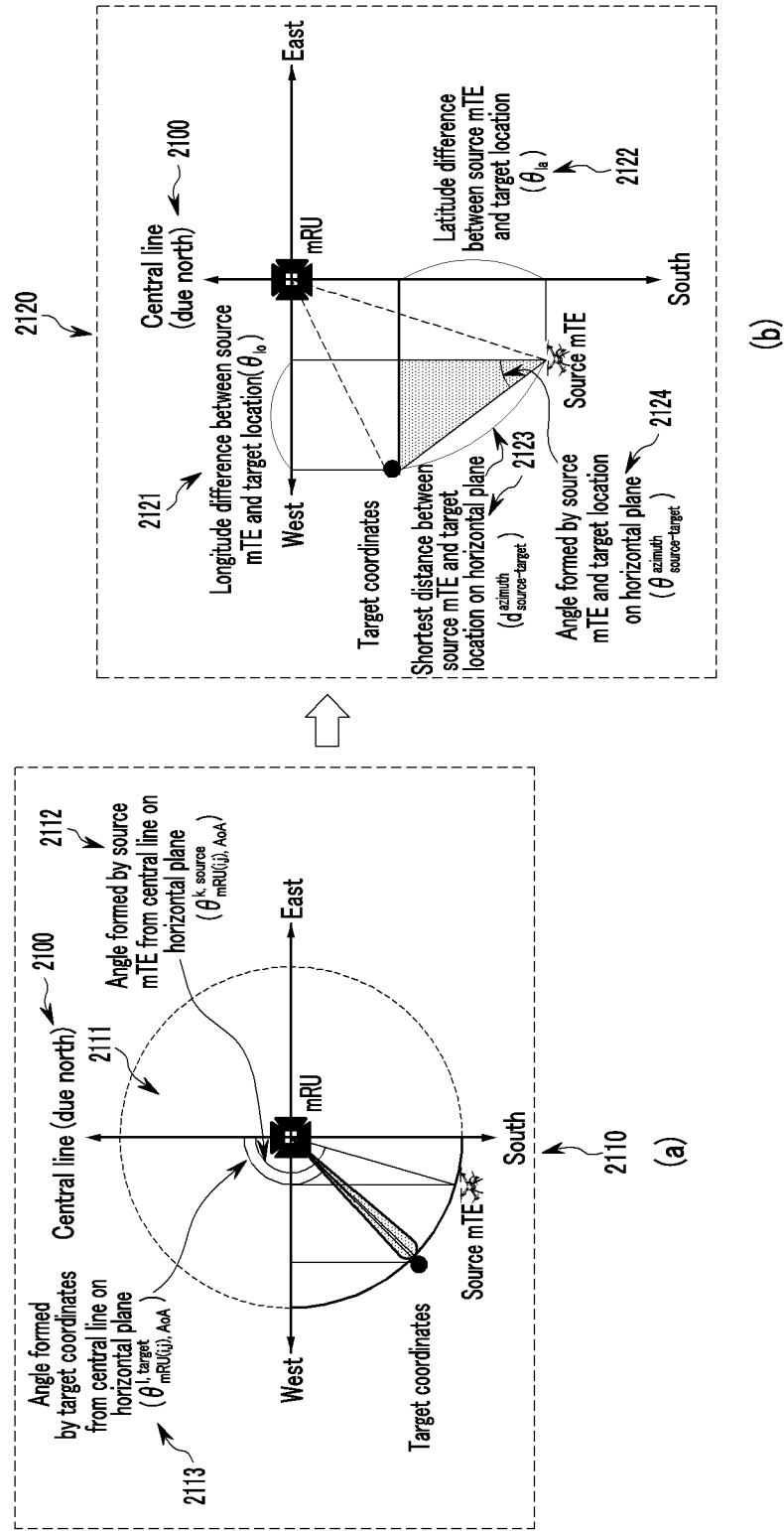
FIG. 23 shows a method for calculating a latitude difference, a longitude difference, a shortest distance, and an angle difference on the horizontal plane between the source mTE and the target location according to the exemplary embodiment of the present invention.

FIG. 23 shows a method for calculating a latitude difference, a longitude difference, a shortest distance, and an angle difference on the horizontal plane between the source mTE and the target location according to the exemplary embodiment of the present invention.

Specifically, FIG. 23 illustrates a configuration of the source mTE 140 and the target location (i.e., target coordinates) viewed from the top with reference to the home mRU 132, and a method for calculating a latitude difference, a longitude difference, a shortest distance, and an angle difference between the source mTE 140 and the target location on the horizontal plane.

As shown in FIG. 23, an angle formed by the source mTE 140 and the target location with respect to the mRU 132, the source mTE 140, and the target location with reference to a central line (e.g., due north) 2100 on the horizontal plane are set, and a latitude difference, a longitude difference, and an angle between the source mTE 140 and the target location are calculated accordingly.

In (a) of FIG. 23, in a view from the top with reference to the mRU 132, a case 2110 of forming the source mTE 140 and the target location is illustrated.

In (b) of FIG. 23, a method 2120 for calculating a latitude difference, a longitude difference, a shortest distance, and an angle difference on the horizontal plane between the source mTE 140 and the target location is illustrated.

Specifically, in (a) of FIG. 23, the source mTE 140 calculates an angle $\theta_{mRU(i,j),AOA}^{k,source}$ by the source mTE 140 with reference to the central line (e.g., due north) on a horizontal plane 2111 (refer to reference numeral 2112), and calculates an angle $\theta_{mRU(i,j),AOA}^{l,target}$ by the target location from the central line on the horizontal plane 2111 (refer to reference number 2113).

In addition, in (b) of FIG. 23, the source mTE 140 calculates a longitude difference $\theta_{lo}$ between the source mTE 140 and the target location (refer to reference numeral 2121), and calculates an altitude difference $\theta_{la}$ between the source mTE 140 and the target location (refer to reference numeral 2122) by using the angles $\theta_{mRU(i,j),AOA}^{k,source}$ and $\theta_{mRU(i,j),AOE}^{l,target}$ respectively formed by the source mTE 140, and the target location on the horizontal plane 2111. Further, the source mTE 140 calculates a shortest distance $d_{source-target}^{azimuth}$ between the source mTE 140 and the target location on the horizontal plane 2111 (refer to reference numeral 2123), and calculates an angle $\theta_{source-target}^{azimuth}$ between the source mTE 140 and the target location on the horizontal plane 2111 (refer to reference numeral 2124.

Figure 24:
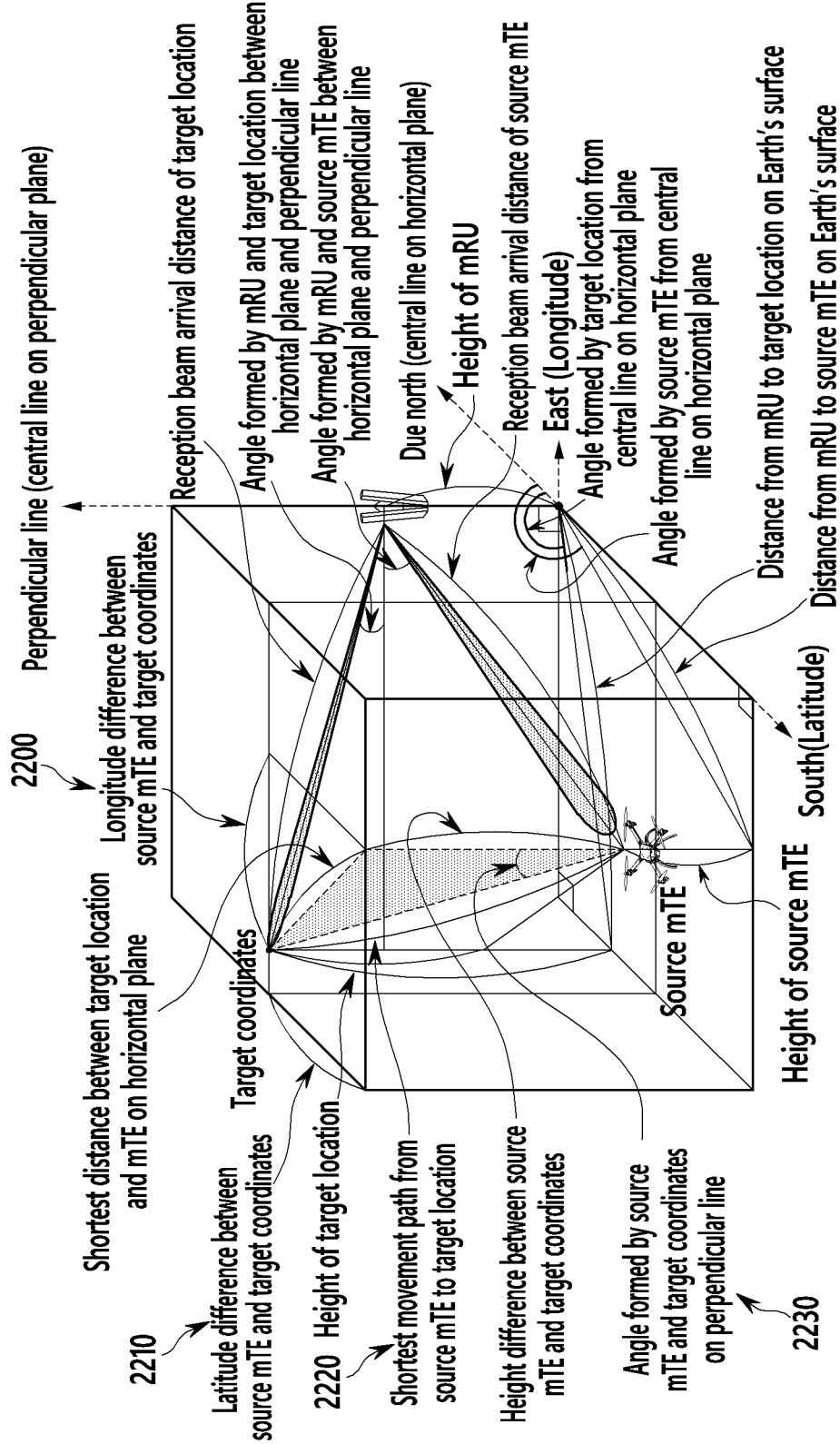
FIG. 24 shows a method for calculating a longitude difference, a latitude difference, a shortest distance, and an angle difference on the horizontal plane between the source mTE and the target location according to the exemplary embodiment of the present invention.

FIG. 24 shows a method for calculating a latitude difference, a longitude difference, a shortest distance, and an angle difference on the horizontal plane between the source mTE and the target location according to the exemplary embodiment of the present invention.

Specifically, in FIG. 24, a configuration of a source mTE 140 and a target location (i.e., a target coordinate), a spatial longitude difference, a latitude difference, a shortest distance, and an angle difference between the source mTE 140 and the target location in a case that the source mTE 140 and the target location are projected to a 3D space with reference to a home mRU 132 are exemplarily illustrated.

The setting and calculating methods with respect to the elevation beams and the azimuth beams, described with reference to FIG. 22 and FIG. 23, can be applied to the 3D space shown in FIG. 24. That is, when the home mRU 132, the source mTE 140, and the target location are projected to the 3D space, the source mTE 140 and the target location are formed as shown in FIG. 24, and a longitude difference 2200 between the source mTE 140 and the target location, a latitude difference 2210 between the source mTE 140 and the target location, a shortest distance 2220 between the source mTE 140 and the target location, and an angle difference 2230 between the source mTE 140 and the target location in the 3D space can be calculated by using such a configuration of the source mTE 140 and the target location.

Figure 25:
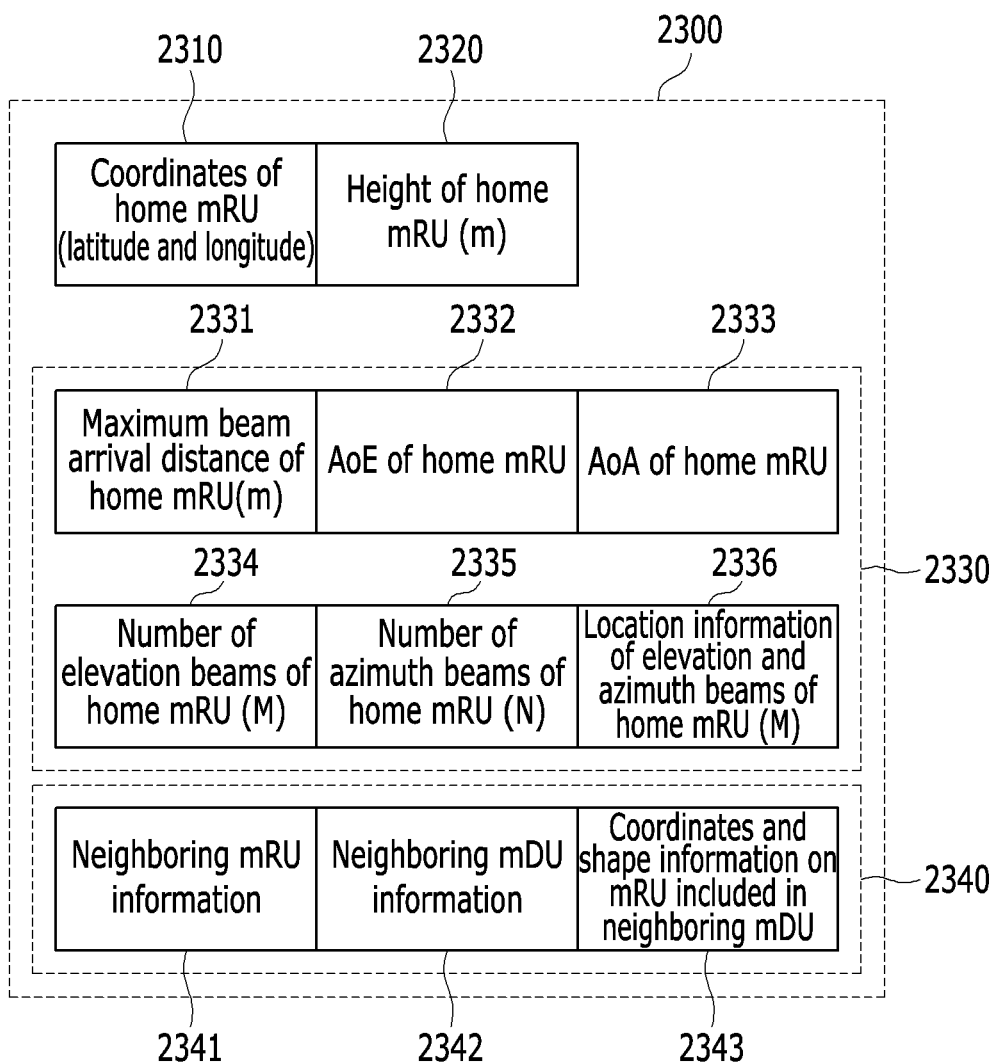
FIG. 25 shows mRU coordinates of a home base station and a neighboring base station and beam shape information generated at an initial access stage according to the exemplary embodiment of the present invention.

FIG. 25 shows mRU coordinates of a home base station and a neighboring base station and beam shape information generated at an initial access stage according to the exemplary embodiment of the present invention.

Specifically, in FIG. 25, information (e.g., mRU coordinates of the home base station and the neighboring base station and beam shape information) formed for cell search of the mTE 140 at initial access of the mRU 132 of the home base station are illustrated.

Beams of the mRU 132 and the mTE 140 and shape information related to the neighboring base station will be described.

As shown in FIG. 25, regarding the beam search, information 2300 related to the home base station and the neighboring base station is stored in the mTE 140. The information 2300 is information for initial access of the mTE 140. The information 2300 may be generated by mRUs 132 included in the home base station and transmitted to the mTE 140. In FIG. 25, an mRU that the mTE 140 accesses among the mRUs 132 included in the home base station is referred to as a home mRU 132.

Specifically, the information 2300 includes pieces of information 2310, 2320, and 2330 generated by the home mRU 132 for cell search of the mTE 140. For example, the information 2300 includes coordinates 2310 (e.g., a latitude and a longitude) of the home mRU 132, a height 2320 of the home mRU 132, and beam shape information 2330.

The beam shape information 2330 includes a beam maximum arrival distance 2331 of the home mRU 132, a beam AoE 2332 of the home mRU 132, a beam AoA 2333 of the home mRU 132, a number of elevation beams M 2334 of the home mRU 132, a number of azimuth beams N 2335 of the home mRU 132, and location information 2336 of the elevation beam and the azimuth beam of the home mRU 132.

In addition, the information 2300 includes beam shape information 2340 of a neighboring mRU 132. Specifically, the beam shape information 2340 includes information 2341 (e.g., location coordinates of a neighboring mRU 132) with respect to a neighboring mRU 132 that neighbors the home mRU 132, information 2342 with respect to at least one neighboring mDU 131, and information 2343 with respect to an mRU 132 that is included in the neighboring mDU 131 (e.g., location coordinates and shape information of the mRU 132 included in the neighboring mDU 131). The neighboring mRU information 2341 is included in information related to a neighboring cell in a system information block (SIB) transmitted through a physical downlink shared channel (PDSCH).

Figure 26:
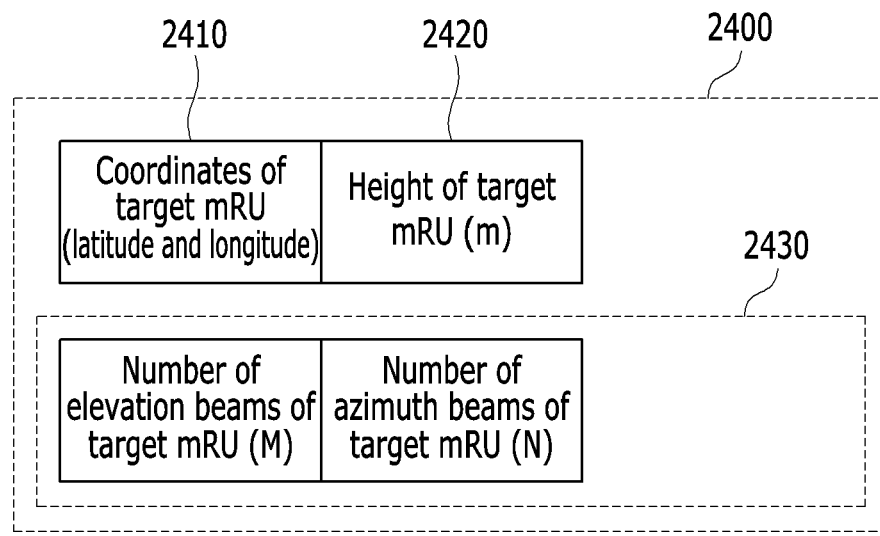
FIG. 26 shows shape information of a target mRU input to the mTE at the initial access according to the exemplary embodiment of the present invention.

FIG. 26 shows shape information of a target mRU input to the mTE at the initial access according to the exemplary embodiment of the present invention. In the present specification, the home mRU 132 implies an mRU 132 where a source mTE 140 is included, but since no home mRU 140 where the mTE 140 is included exists at the initial access stage, the term target mRU 132 may be used instead of the term home mRU 132.

As shown in FIG. 26, related to the beam search, the information 2400 on the target mRU 132 is stored in the mTE 140. For example, when an mRU 132 exists in an area where the mTE 140 is located at the initial access stage, the mTE 140 may search beams from the corresponding area. However, if not, the information on the target mRU 132 may be input by a user.

Specifically, the information 2400 includes coordinates 2410 of the target mRU 132, a height 2420 of the target mRU 132, and beam shape information 2430, provided to the mTE 140 for initial access of the mTE 140.

The beam shape information 2430 includes a number M of elevation beams and a number N of azimuth beams included in the target mRU 132.

Figure 27:
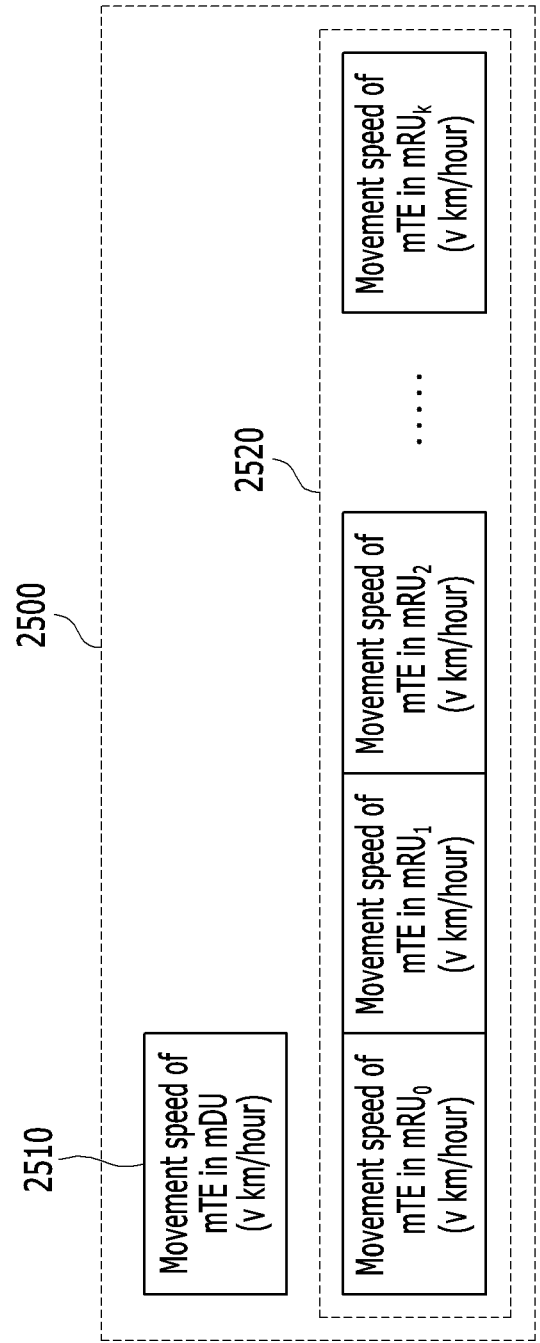
FIG. 27 shows information for regulating (or limiting) movement speed of the mTE according to the exemplary embodiment of the present invention.

FIG. 27 shows information for regulating (or limiting) movement speed of the mTE according to the exemplary embodiment of the present invention.

When location coordinates (e.g., a distance, an AoE, or an AoA) of a target beam (or the mTE 140 or the mRU 132) is confirmed by the source mTE 140, speed regulation information 2500 for regulating (or limiting) a movement speed v (km/h) of the mTE 140 is used by the source mTE 140 as shown in FIG. 27.

The speed regulation information 2500 may be applied as the same value to all mTEs 140 that exist in the base station mDU 131 (refer to reference numeral 2510). That is, the speed regulation information 2500 includes speed regulation information 2510 for all the mTEs 140 existing in the mDU 131. When the speed regulation information 2510 is used, all the mTEs 140 existing in the base station mDU 131 have a single movement speed.

Alternatively, the speed regulation information 2500 may be individually applied to each mRU 132 (refer to reference numeral 2520). That is, the speed regulation information 2500 includes the speed regulation information 2520 for mTEs 140 in the mRU 132 for each mRU 132. Specifically, the speed regulation information 2500 may include speed regulation information for an mTE 140 existing in an $mRU_0$ 132, speed regulation information for an mTE 140 existing in an $mRU_1$ 132, speed regulation information for an mTE 140 existing in $mRU_2$ 132, and speed regulation information for an mTE 140 existing in an $mRU_k$ 132. When the speed regulation information 2520 is used, the mTE 140 has individual movement speed for each mRU 132.

The speed regulation information 2500 is system shape information, and is stored by a system manager when a radio resource is initialized and a radio resource is set by an RRC. For example, the speed regulation information 2500 may be stored as an RRC resource for a base station by the system manager. The speed regulation information 2500 can be changed. For example, the base station can transmit information for changing the speed value v to the mTE 140.

In addition, when the speed regulation information 2500 is used, the movement speed v km/h is converted to v m/s.

Figure 28:
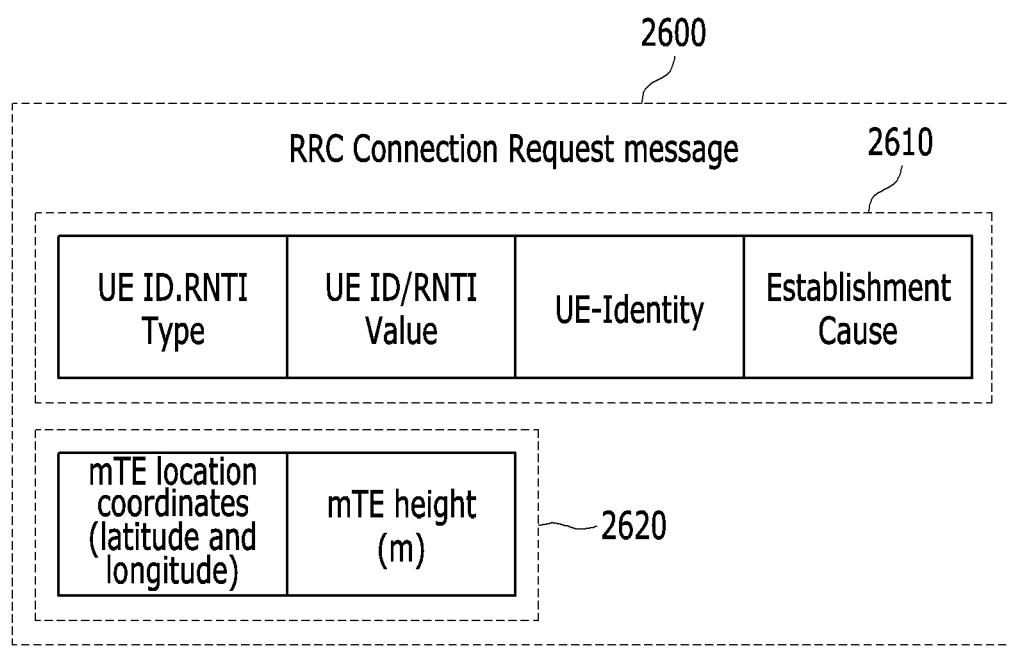
FIG. 28 shows an RRC connection request message that is transmitted to an mRU in random access, and includes location coordinates and an altitude value of an mTE according to the exemplary embodiment of the present invention.

FIG. 28 shows an RRC connection request message that is transmitted to an mRU in random access and includes location coordinates and an altitude value of an mTE according to the exemplary embodiment of the present invention.

The RRC connection request message shown in FIG. 28 is a message transmitted after the location coordinates and the altitude value of the mTE 140 are added to an existing message.

As shown in FIG. 28, regarding the beam search, the mTE 140 and the base station use information related to the mTE 140.

Specifically, an RRC connection request message 2600 is transmitted to the mRU 132 in random access. The RRC connection request message 2600 additionally includes location coordinates (e.g., a latitude and a longitude) of the mTE 140 and altitude information (e.g., a height) 2620 of the mTE 140 in an existing message 2610.

The existing message 2610 includes an ID of an mTE 140 that corresponds to user equipment (UE) and a type of a radio network temporary identifier (RNTI), values of the ID and the RNTI of the mTE 140, an identity of the mTE 140, and an establishment cause.

Figure 29:
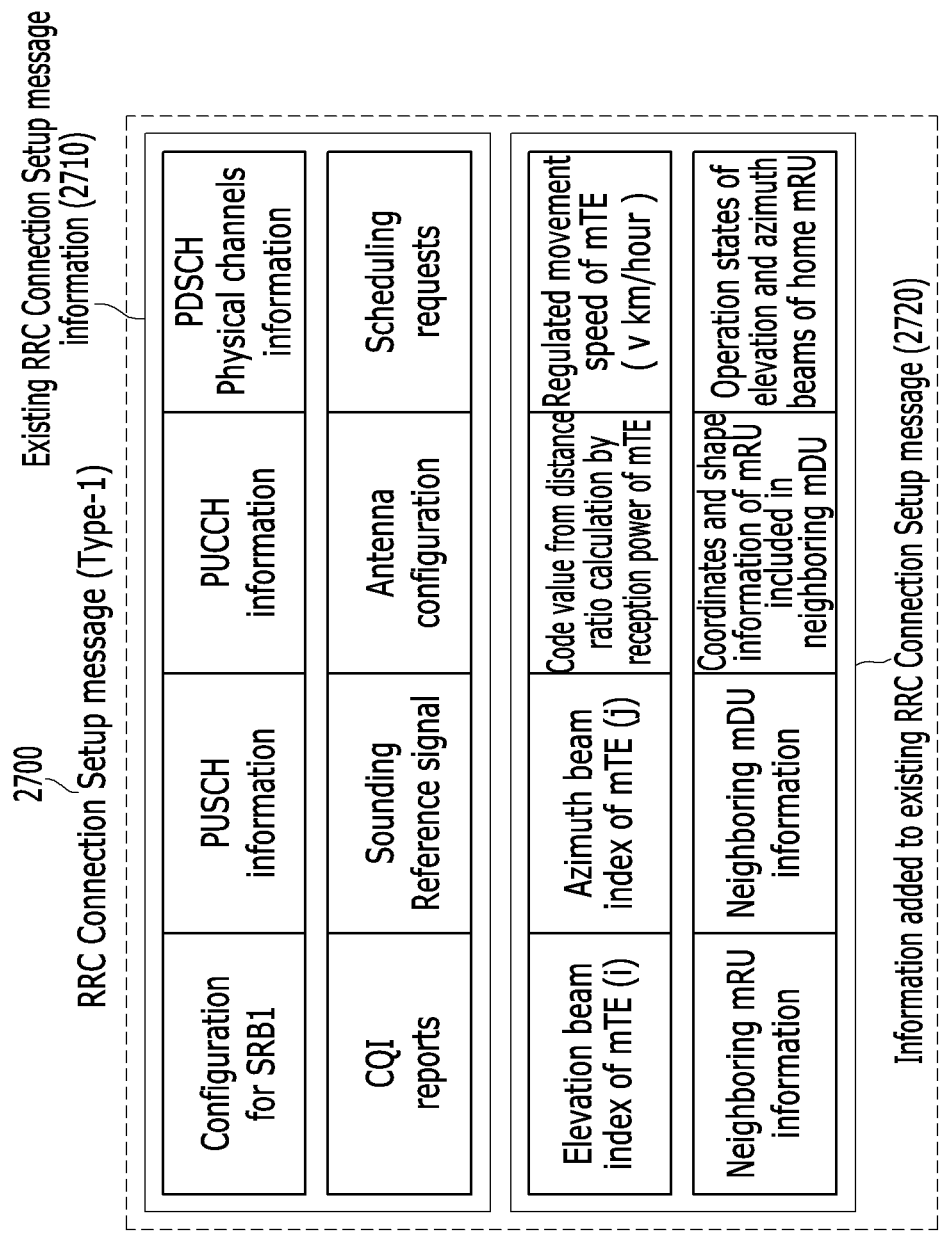
FIG. 29 shows an RRC connection setup message of Type 1, transmitted to the mTE in random access according to the exemplary embodiment of the present invention.

FIG. 29 shows an RRC connection setup message of Type 1, transmitted to the mTE in random access according to the exemplary embodiment of the present invention.

As shown in FIG. 29, regarding the beam search, the mTE 140 and the base station use an RCC connection setup message 2700 of Type-1. The RRC connection setup message 2700 further includes additional information 2720 in an existing message 2710.

Specifically, the RRC connection setup message 2700 is transmitted to the mTE 140 when a random access process is performed after performing the first access (initial access).

The existing message 2710 includes a configuration for a signaling radio bearer 1 (SRB1), physical uplink shared channel (PUSCH) information, physical uplink control channel (PUCCH) information, physical downlink shared channel (PSDCH) information, a channel quality indicator (CQI) report, a sounding reference signal, an antenna configuration, a scheduling request, and the like.

The additional information 2720 may include an elevation beam index i and an azimuth beam index j of a beam (i.e., a beam of the mTE 140) used by the mTE 140, a distance ratio calculation code value (e.g., 400 of FIG. 5) based on reception power of the mTE 140, a regulated movement speed (e.g., 2500 of FIG. 27) of the mTE 140, information on a neighboring mRU (e.g., 2341 of FIG. 25), information on a neighboring mDU 131 (e.g., 2342 of FIG. 25), information on an mRU 132 included in the neighboring mDU 131 (e.g., 2343 of FIG. 25), and an elevation and azimuth beam operation state (e.g., FIG. 19) of a home mRU 132.

The RRC connection setup message of Type-1 may be used for the first access (i.e., initial access) of the mTE 140.

Figure 30:
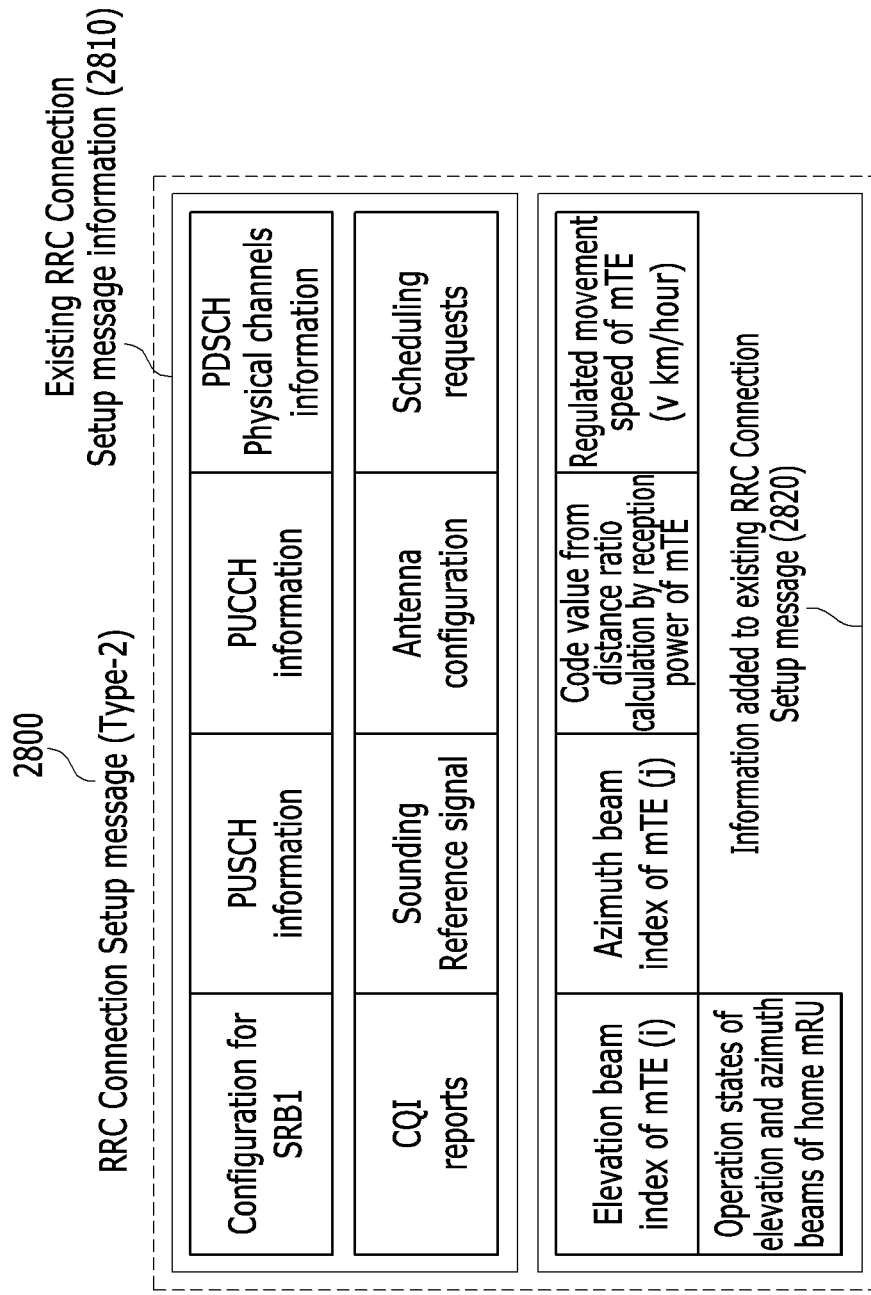
FIG. 30 shows an RRC connection setup message of Type-2, transmitted to the mTE in random access according to the exemplary embodiment of the present invention.

FIG. 30 shows an RRC connection setup message of Type-2, transmitted to the mTE in random access according to the exemplary embodiment of the present invention.

As shown in FIG. 30, regarding the beam search, the mTE 140 and the base station use an RRC connection setup message of Type-2 (refer to reference numeral 2800).

The RRC connection setup message 2800 further includes additional information 2820.

Specifically, the RRC connection setup message 2800 is transmitted to the mTE 140 when a random access process is performed according to a beam switching process (e.g., inter-beam intra-mRU, inter-beam inter-mRU, inter-beam inter-mDU, and the like) that is related to a handover.

An existing message 2810 includes a configuration for the SRB1, PUSCH information, PUCCH information, PSDCH information, a CQI report, a sounding reference signal, an antenna configuration, and a scheduling request.

The additional information 2820 includes an elevation beam index i and an azimuth beam index j of a beam (i.e., a beam of the mRU 132) used by the mTE 140, a distance ratio calculation code value (e.g., 400 of FIG. 5) based on reception power of the mTE 140, a regulated movement speed of the mTE 140 (e.g., 2500 of FIG. 27), and an elevation and azimuth beam operation state (e.g., see FIG. 19) of the home mRU 132.

The RRC connection setup message of Type-2 may be used for beam switching (200, 210, and 220 of FIG. 2) after initial access.

At the initial access, the mTE 140 can receive abeam operation state (e.g., FIG. 19) of the mRU 132 through the RRC connection setup message shown in FIG. 29, and during the beam switching, the mTE 140 can receive a beam operation state (e.g., FIG. 19) of the mRU 132 through the RRC connection setup message shown in FIG. 30.

Figure 31:
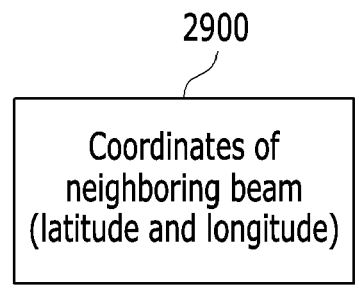
FIG. 31 shows coordinate information of a location of a neighboring beam required by the mTE at beam switching according to the exemplary embodiment of the present invention.

FIG. 31 shows coordinate information of a location of a neighboring beam required by the mTE at beam switching according to the exemplary embodiment of the present invention.

As shown in FIG. 31, regarding the beam search, the base station provides a neighboring beam location coordinate information 2900 required by the mTE 140 to the mTE 140 during the beam switching.

The neighboring beam location coordinate information 2900 includes coordinates (e.g., a latitude and a longitude) of a beam that neighbors a beam that the mTE 140 currently accesses.

Figure 32:
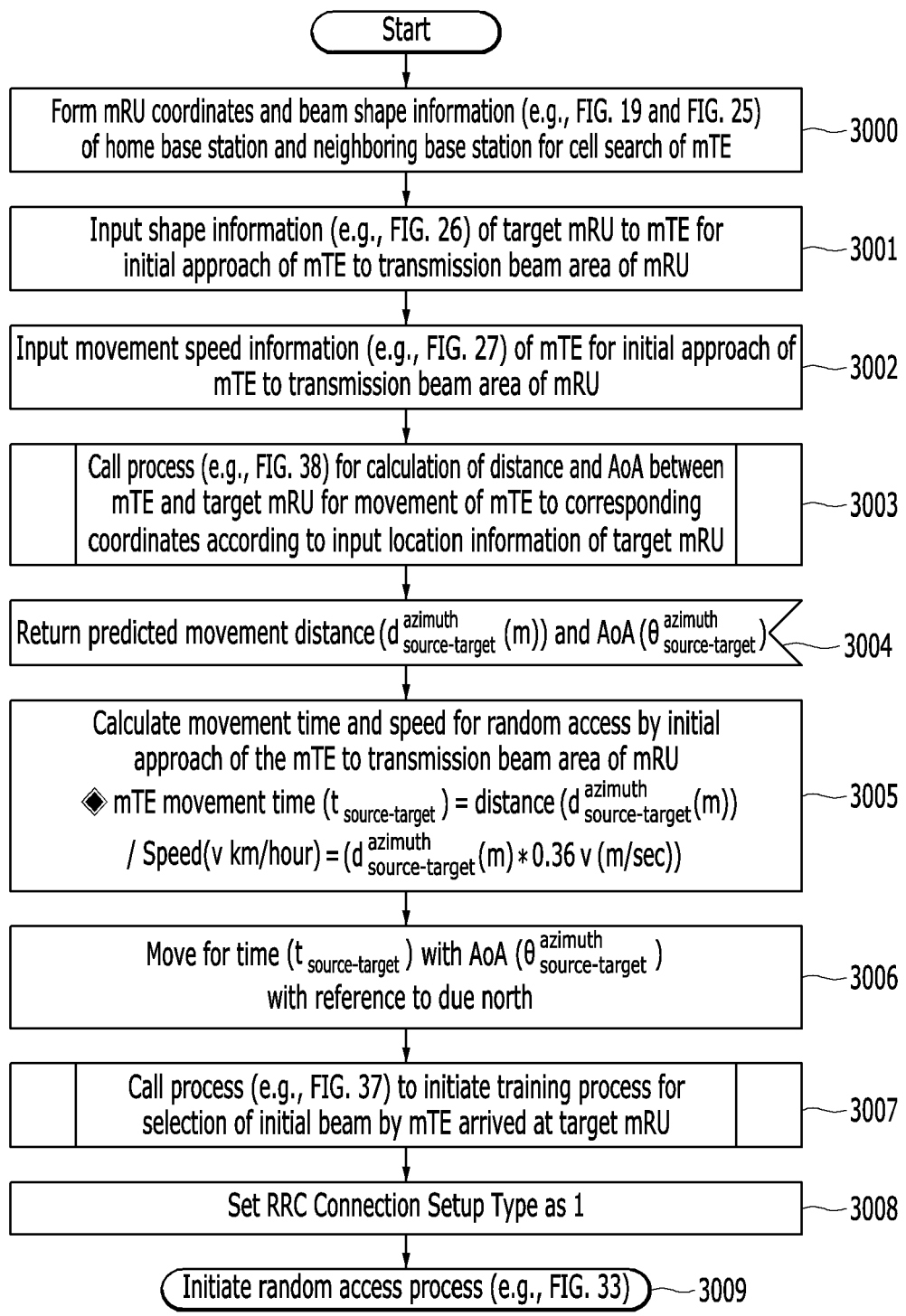
FIG. 32 shows an initial access process according to the exemplary embodiment of the present invention.

FIG. 32 shows an initial access process according to the exemplary embodiment of the present invention.

An initial access and random access process between the base station and the mTE 140 will now be described.

As shown in FIG. 32, regarding the initial access process between the base station and the mTE 140, the base station and the mTE 140 continuously attempt a handover to a new base station in a stop state or while moving so as to maintain radio link quality due to the mmWave-based mobile communication characteristic. In this case, the base station and the mTE 140 continuously perform cell search for the handover. The cell search is performed by using a synchronization channel, and the synchronization channel is transmitted through a downlink.

First, the mRU 132 of the home base station configures (or, sets or generates) mRU coordinates and beam shape information (e.g., 2300 of FIG. 25, and FIG. 19) of the home base station and neighboring base stations for the cell search of the mTE 140 (refer to reference numeral 3000).

For an initial approach of the mTE 140 to a transmission beam area of a mRU 132, shape information (e.g., 2400 of FIG. 26) of a target mRU 132 is input (e.g., input by a user) to the mTE 140 (refer to reference numeral 3001). Here, the target mRU 132 implies an mRU 132 where the mTE 140 desires to access. Specifically, the mTE 140 may receive a target location for access to the target mRU 132 by the user. The target location for access to the target mRU 132 may be input to the mTE 140 may receive by the user.

For the initial approach of the mTE 140 to the transmission beam area of the mRU 132, movement speed information (e.g., 2500 of FIG. 27) of the mTE 140 is input (e.g., input by the user) to the mTE 140 (refer to reference numeral 3002).

Then, the mTE 140 calls (i.e., performs) a first process (e.g., FIG. 38) for calculation of a distance and an AoA between the mTE 140 and the target mRU 132 so as to move to the corresponding location coordinates based on the location information (refer to reference numeral 3003).

The mTE 140 receives a predicted movement distance $d_{source-target}^{azimuth}$ and an AoA $\theta_{source-target}^{azimuth}$ back from the first process (e.g., FIG. 38) (refer to reference numeral 3004).

The mTE 140 calculates a movement time $t_{source-target}$ (sec) and a speed v m/s for performing random access by approaching the transmission beam area (refer to reference numeral 3005).

Specifically, regarding the movement time of the mTE 140, the movement time $t_{source-target}$(sec) is calculate by dividing a distance by a speed, i.e., $d_{source-target}^{azimuth}$(m)/v (km/hour), and then the speed is converted to m/s from km/h and accordingly the movement time $t_{source-target}$(sec) becomes $d_{source-target}^{azimuth}$(m)*0.36 v(m/sec).

The mTE 140 sets an AoA $\theta_{source-target}^{azimuth}$ with reference to due north, and moves during a time period $t_{source-target}$(sec) (refer to reference numeral 3006).

When arrived at an area of the target mRU 132, the mTE 140 calls (i.e., performs) a second process (e.g., FIG. 37) that initiates training for selection of an initial beam (refer to reference numeral 3007).

The mTE 140 sets a type of the RRC connection setup as Type-1 (refer to reference numeral 3008), and then performs (initiates) a third process (e.g., FIG. 33) for random access (refer to reference numeral 3009).

Figure 33:
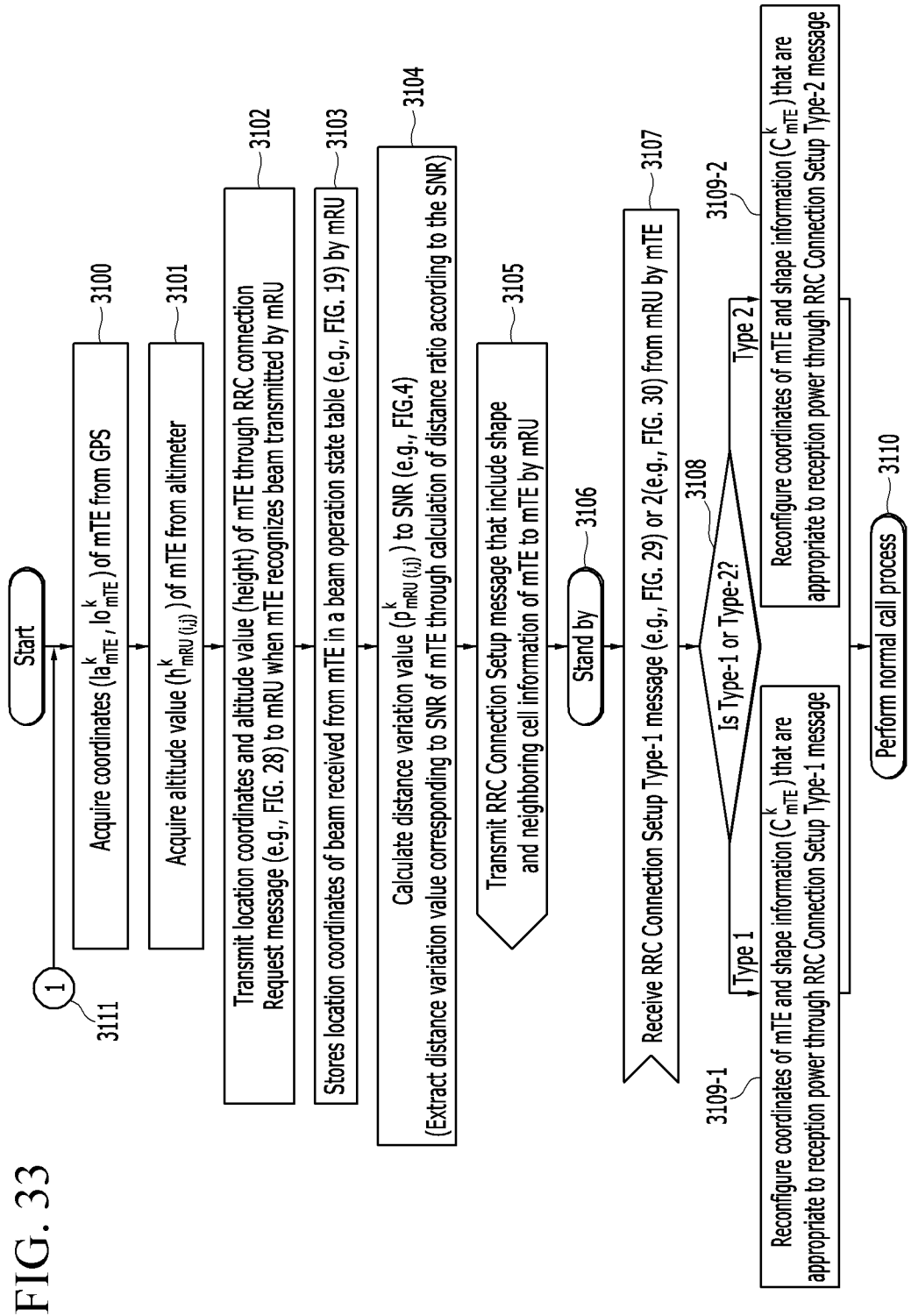
FIG. 33 shows a random access process according to the exemplary embodiment of the present invention.

FIG. 33 shows a random access process according to the exemplary embodiment of the present invention.

As shown in FIG. 33, the base station and the mTE 140 perform the third process for the random access.

First, the mTE 140 acquires location coordinates ($la_{mTE}^{k}$, $lo_{mTE}^{k}$) of the mTE 140 from a GPS (refer to reference numeral 3100).

The mTE 140 acquires an altitude value $h_{mRU(i,j)}^{k}$ of the mTE 140 from the altimeter (refer to reference numeral 3101).

When recognizing a beam transmitted by the mRU 132, the mTK 140 transmits an RRC connection request message (refer to 2600 of FIG. 28) by including the location coordinates and the altitude value (e.g., a height) of the mTE 140 to the message (refer to reference numeral 3102). Specifically, the RRC connection request message may include location coordinates (e.g., a latitude and a longitude) of an mTE 140 that recognize (e.g., uses) a beam of the mRU 132.

The mRU 132 stores the location information (e.g., the location coordinates of the mTE 140 that has recognized the beam of the mRU 132) included in the RRC connection request message received from the mTE 140 in a beam operation state table (e.g., a beam operation state table of FIG. 19) (refer to reference numeral 3103). Accordingly, the beam operation state table of the mRU 132 may be changed.

The mRU 132 appropriately extracts a distance variation value (e.g., $p_{mRU(i,j)}^{k}$ of FIG. 4) to the reception power strength (e.g., the SNR) of the mTE 140 through calculation of a distance ratio according to the reception power strength (refer to reference numeral 3104).

The mRU 132 transmits an RRC connection setup message that includes shape and neighboring cell information of the mTE 140 (refer to reference numeral 3105) and then stands by (refer to reference numeral 3106). Specifically, the mRU 132 may receive the RRC connection setup message of Type-1 shown in FIG. 29 or the RRC connection setup message of Type-2 shown in FIG. 30.

When receiving the RRC connection setup message (e.g., the message of Type-1 shown in FIG. 29 or the message of Type-2 shown in FIG. 30) from the mRU 132 (refer to reference numeral 3107), the mTE 140 determines a type of the received RRC connection setup message (refer to reference numeral 3108).

When the type of the received RRC connection setup message is Type-1, the mTE 140 reconfigures coordinates and shape information $C_{mTE}^{k}$ (e.g., 2720 of FIG. 29) of the mTE 140 that is appropriate to reception power using the RRC connection setup message of Type-1 (refer to reference numeral 3109-1), and performs a normal call process (refer to reference numeral 3110).

When the type of the received RRC connection setup message is Type-2, the mTE 140 reconfigures the coordinates and shape information $C_{mTE}^{k}$ that are appropriate for the reception power using the RRC connection setup message of Type-2 (refer to reference numeral 3109-2), and performs a normal call process (refer to reference numeral 3110).

Meanwhile, even while a handover process is performed, the above-stated third process (refer to FIG. 33) for the random access is performed.

Figure 34:
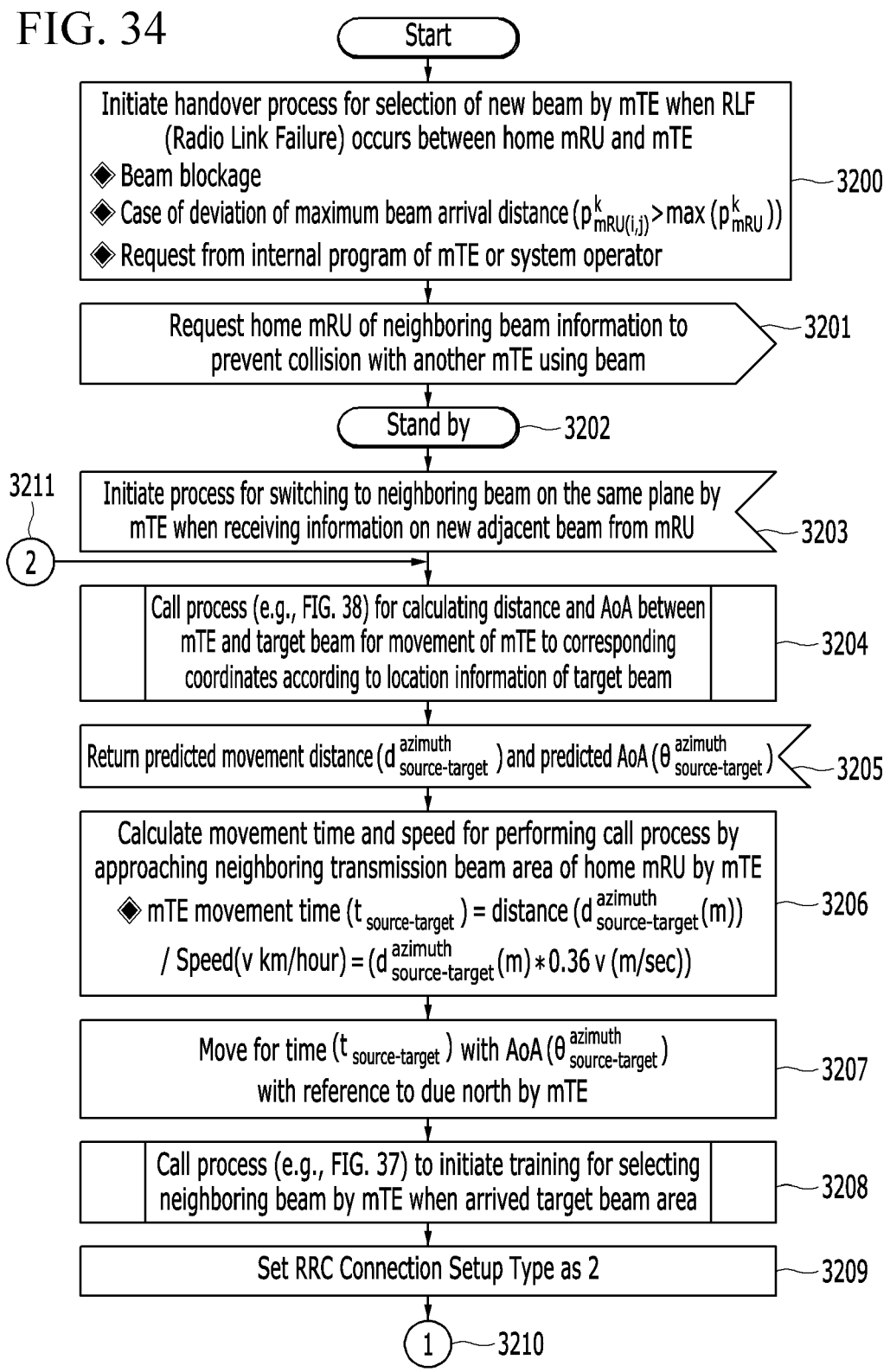
FIG. 34 shows an inter-beam intra-mRU switching process, which is a handover process, according to the exemplary embodiment of the present invention.

FIG. 34 shows an inter-beam intra-mRU switching process, which is a handover process, according to the exemplary embodiment of the present invention.

Specifically, FIG. 34 illustrates a switching process between beams included in one mRU 132 during the handover process between the base station and the mTE 140. The inter-beam intra-mRU switching corresponds to reference numeral 200 of FIG. 2.

The mTE 140 monitors whether conditions for beam switching are satisfied, and initiates a handover process for new beam selection if the conditions for the beam switching are satisfied (refer to reference numeral 3200). Specifically, the conditions for the beam switching may include a case that a beam received by the mTE 140 is blocked, a case that reception strength (e.g., SNR measured through channel estimation) of the beam received by the mTE 140 is weaker than SNR that corresponds to a beam maximum arrival distance (e.g., $p_{mRU(i,j)}^{k}$>max($p_{mRU}^{k}$)), a case that an RLF is generated between the home mRU 132 and the mTE 140, a case that a request is input from; an internal program of the mTE 140 (e.g., a ease that the mTE 140 determines that it needs to move), or a case that a request is input by a system operator.

First, the mTE 140 requests the home mRU 132 of neighboring beam information (refer to reference numeral 3201) to prevent collision with another mTE that is in use of a beam, and then stands by (refer to reference numeral 3202).

When receiving information on a new neighboring beam (e.g., the beam operation state table information of FIG. 19) for switching from the home mRU 132, the mTE 140 initiates a process for switching to a neighboring beam that exists on the same plane (refer to reference numeral 3203). Specifically, the mTE 140 may determine a target beam (i.e., a beam not in use by another mTE 140) by using the beam information (e.g., information for the beam operation state table of FIG. 19) received from the home mRU 132. If the mTE 140 does not receive the beam information (e.g., information for the beam operation state table of FIG. 19) from the home mRU 132 (e.g., when the mTE 140 and the home mRU 132 cannot communicate with each other), the mTE 140 may determine the target beam (e.g., a beam that is not used by another mTE 140) by using beam information (e.g., the beam operation state table of FIG. 19) that the mTE 140 itself possesses.

The mTE 140 calls (performs) the first process (e.g., FIG. 38) that calculates a distance and an AoA between the mTE 140 and the target beam so as to move to the corresponding location coordinates according to location information of the target beam (refer to reference numeral 3204).

The mTE 140 receives a predicted movement distance $d_{source-target}^{azimuth}$(m) and a predicted AoA $\theta_{source-target}^{azimuth}$ back from the first process (e.g., FIG. 38) (refer to reference numeral 3205).

The mTE 140 calculates a movement time $t_{source-target}$ (sec) and a speed v m/s so as perform a call process by approaching a neighboring transmission beam area of the home mRU 132 (refer to reference numeral 3206).

The mTE 140 sets an AoA $\theta_{source-target}^{azimuth}$ reference to due north, and moves during the calculated time $t_{source-target}$ (sec) (refer to reference numeral 3207). The movement time of the mTE 140 may be the same as the movement time described with reference to FIG. 32.

When arrived in the beam area, the mTE 140 calls (performs) the second process (e.g., FIG. 37) to initial training for neighboring beam selection (refer to reference numeral 3208).

The mTE 140 sets a type of the RRC connection setup message as Type-2 (refer to reference numeral 3209), and then performs the third process (e.g., FIG. 33) for random access (refer to reference numbers 3210 of FIG. 34 and 3111 of FIG. 33).

Due to the movement of the mTE 140, a serving beam for the mTE 140 is changed to a second beam from a first beam among a plurality of beams included in the home mRU 132, and when the mTE 140 does not receive new beam information (e.g., the beam operation state table of FIG. 19) of the home mRU 132 from the home mRU 132, the mTE 140 may not update the beam information (e.g., the beam operation state table of FIG. 19) of the home mRU 132.

Figure 35:
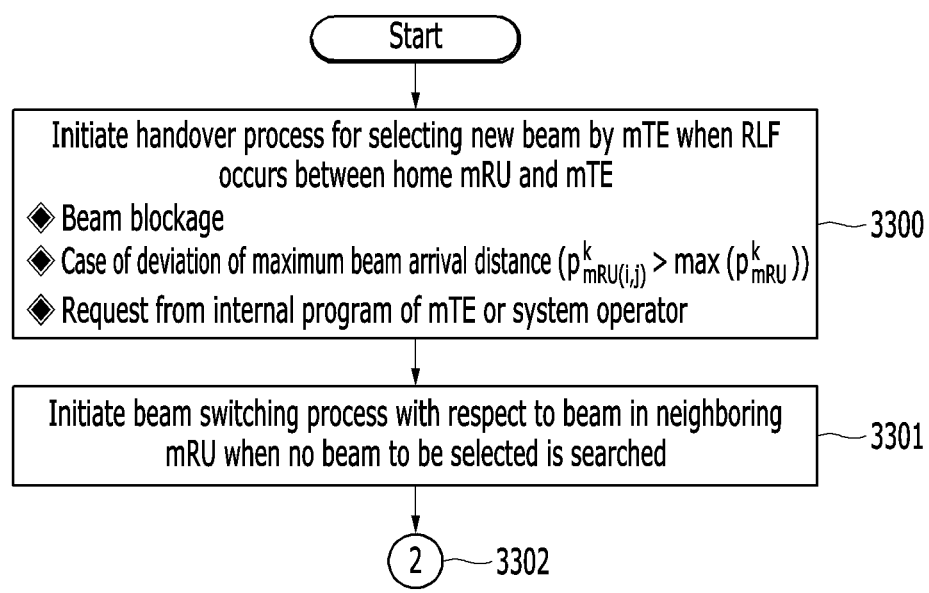
FIG. 35 shows an inter-beam inter-mRU switching process as a handover process according to the exemplary embodiment of the present invention.

FIG. 35 shows an inter-beam inter-mRU switching process as a handover process according to the exemplary embodiment of the present invention.

Specifically, FIG. 35 illustrates an inter-beam inter-mRU switching process between mRUs 132 in the handover process between the base station and the mTE 140. The inter-beam inter-mRU switching corresponds to reference numeral 210 of FIG. 2.

The mTE 140 monitors whether conditions for the beam switching are satisfied, and initiates a handover process for new beam selection if the conditions for the beam switching are satisfied (refer to reference numeral 3300). Specifically, the conditions for the beam switching include a case that a beam that the mTE 140 receives is blocked, a case that reception strength (e.g., SNR measured through channel estimation) of the beam received by the mTE 140 is weaker than SNR that corresponds to a beam maximum arrival distance (e.g., $p_{mRU(i,j)}^{k}$>max($p_{mRU}^{k}$)), a case that the home mRU 132 abnormally operates, a ease that an RLF is generated between the home mRU 132 and the mTE 140, a case that a request is input from an internal program of the mTE 140 (e.g., a ease that the mTE 140 determines that it needs to move), or a case that a request input by a system operator.

When no beam for beam selection is searched, the mTE 140 starts a beam switching process with respect to beams included in a neighboring mRU 132 (refer to reference numeral 3301). Specifically, the mTE 140 may request the neighboring mRU 132 of beam information 132 to prevent collision with other mTE 140 in use of a beam. For this, the mTE 140 may determine a target mRU 132 by using information (e.g., information on the neighboring mRU) included in the RRC connection setup message of Type-1. When the mTE 140 receives beam information (e.g., the beam operation state table) of the target mRU 132 from the target mRU 132, the mTE 140 may determine a target beam using the beam information received from the target mRU 132 and initiate a process for switching to the target beam.

The mTE 140 performs a process (i.e., a part of the process shown in FIG. 34) for aerial movement and beam selection 3302 (refer to reference numeral 3211 of FIG. 34).

If the mRU 132 that the mTE 140 accesses is changed to the target mRU 132 from the home mRU 132, the mTE 140 may have beam information (e.g., the beam operation state table of FIG. 19) of the target mRU 132. That is, when a location where the mTE 140 moved corresponds to a target mRU 132 that is different from the home mRU 132, the beam operation state table of the mTE 140 is updated. For example, when a serving beam for the mTE 140 is changed to a beam in the target mRU 132 from a beam in the home mRU 132 due to the movement of the mTE 140, the mTE 140 receives information for the beam operation state table of FIG. 19 through the serving beam in the target mRU 132 and update s the beam operation state table of the mTE 140 based on the received information.

Figure 36:
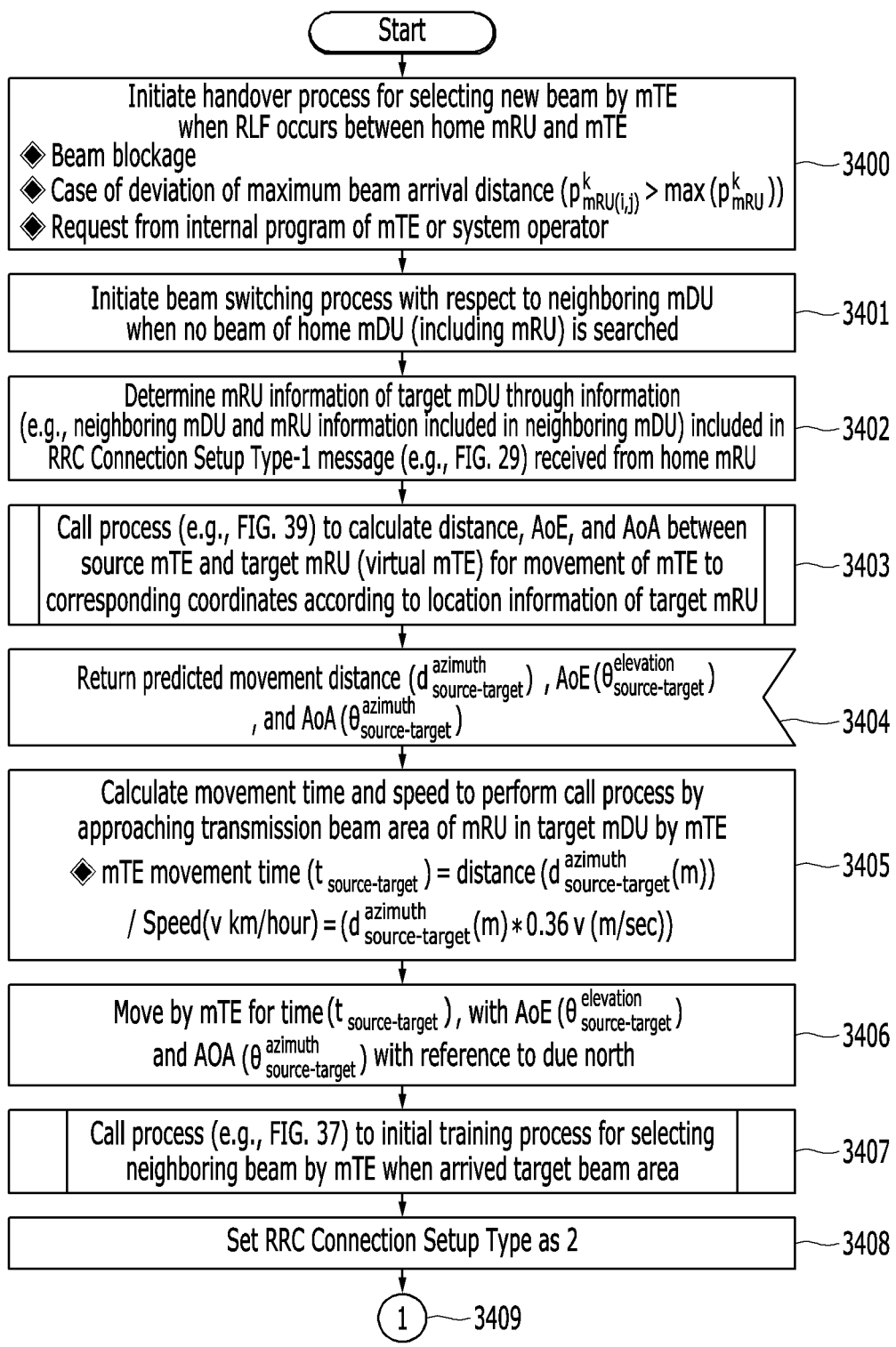
FIG. 36 shows an inter-beam inter-mDU switching process as a handover process according to the exemplary embodiment of the present invention.

FIG. 36 shows an inter-beam inter-mDU switching process as a handover process according to the exemplary embodiment of the present invention.

Specifically, FIG. 36 illustrates an inter-beam inter-mDU switching process in the handover process between the base station and the mTE 140. The inter-beam inter-mDU switching corresponds to reference numeral 220 of FIG. 2.

The mTE 140 monitors whether conditions for beam switching are satisfied, and initiates a handover process for new beam selection if the conditions for the beam switching are satisfied (refer to reference numeral 3400). Specifically, the conditions for the beam switching include a case that a beam received by the mTE 140 is blocked, a ease that reception strength (e.g., an SNR measured through channel estimation) of the beam received by the mTE 140 is weaker than reception strength that corresponds to a beam maximum arrival distance (e.g., $p_{mRU(i,j)}^k > \max(p_{mRU}^k)$), a case that the home mDU 131 and all mRUs 132 included in the home mDU 131 abnormally operate, a case that an RLF is generated between the home mRU 132 and the mTE 140, a case that a request is input from an internal program of the mTE 140 (e.g., a case that the mTE 140 determines that it needs to move), or a case that a request input by a system operator.

When no beam to select is searched among beams included in the home mDU 131 (including the mRU 132), the mTE 140 initiates a process for beam switching to an mDU 132 that is adjacent to the home mDU 131 (refer to reference numeral 3401). The home mDU 131 implies an mDU 131 that the mTE 140 currently accesses, and the neighboring mDU 131 implies a neighboring mDU 131 that neighbors the home mDU 131.

The mTE 140 determines mRU information of the target mDU 131 by using information (e.g., information on a neighboring mDU and mRUs included in the neighboring mDU) included in an RRC connection setup message (e.g., the RRC connection setup message shown in FIG. 29) received, from the home mRU 132 (refer to reference numeral 3402). The target mDU 131 implies a neighboring mDU that the mTE 140 wants to access. Specifically, the mTE 140 may determine a target mDU 131 and determine a target mRU 132 among mRUs 132 included in the target mDU 131 by using the information (e.g., information on the neighboring mDU and mRUs included in the neighboring mDU) included in the RRC connection setup message.

The mTE 140 calls (performs) a fourth process (e.g., FIG. 39) that calculates a distance, an AoE, and an AOA between the source mTE 140 and the target mRU 132 (i.e., a virtual mTE) so as to move to corresponding location coordinates according to the location information of the target mRU 132 included in the target mDU 131 (refer to reference numeral 3403).

The mTE 140 receives a predicted movement distance $d_{source\text{-}target}^{azimuth}$(m), an AoE $\theta_{source\text{-}target}^{elevation}$, and an AOA $\theta_{source\text{-}target}^{azimuth}$ back from the fourth process (e.g., FIG. 29) (refer to reference numeral 3404).

The mTE 140 calculates a movement time $t_{source\text{-}target}$ (sec) and speed v (m/s)) to perform a call process by approaching a transmission beam area of the target mRU 132 in the target mDU 131 (refer to reference numeral 3405).

The mTE 140 sets an AoE $\theta_{source\text{-}target}^{elevation}$ and an AOA $\theta_{source\text{-}target}^{azimuth}$ with reference to due north, and moves during the time $t_{source\text{-}target}$(sec) (refer to reference numeral 3406). The movement time of the mTE 140 may be the same as the movement time described with reference to FIG. 32.

When arrived an area of a target beam included in the target mRU 132, the mTE 140 calls (performs) the second process (e.g., FIG. 37) that initiates training for selection of a neighboring beam (refer to reference numeral 3407).

The mTE 140 performs the third process (e.g., FIG. 33) for random access after setting a type of the RRC connection setup message as Type-2 (3408) (refer to reference numerals 3409, and 3111 of FIG. 33).

When an mRU 132 that the mTE 140 accesses is changed to a target mRU 132 in the target mDU 131 from the home mRU 132 in the home mDU 131, the mTE 140 may have beam information (e.g., the beam operation state table of FIG. 19) of the target mRU 132. That is, when a location where the mTE 140 is moved corresponds to a target mRU 132 that is different from the home mRU 132, the beam operation state table of the mTE 140 is updated. For example, when a serving beam for the mTE 140 is changed to a beam of the target mRU 132 in the target mDU 131 from a beam in the home mRU 132 of the home mDU 131 due to movement of the mTE 140, the mTE 140 receives information (e.g., a use state of each beam in the target mRU 132) and updates the beam operation state table based on the received information.

Figure 37:
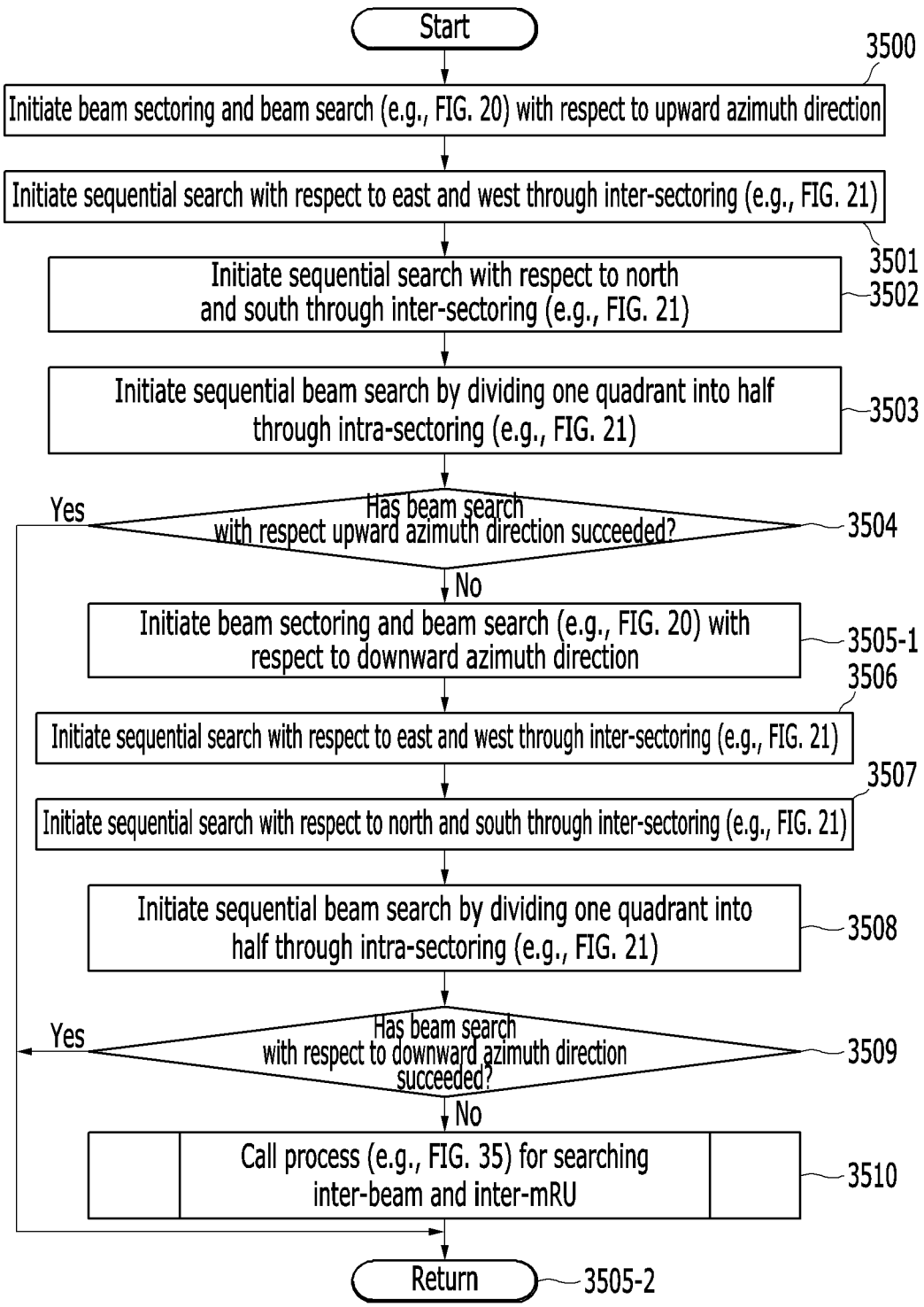
FIG. 37 shows a process (i.e., the second process) for the mTE that approaches a target mRU area to initiate training to select an initial beam according to the exemplary embodiment of the present invention.

FIG. 37 shows a process (i.e., the second process) for the mTE that approaches a target mRU area to initiate training to select an initial beam according to the exemplary embodiment of the present invention.

A beam selection process of the mTE 140 will now be described.

As shown in FIG. 37, when approaching the area of the target mRU 132, the mTE 140 performs a process for initiating training for selecting an initial beam.

Specifically, the training for the initial beam selection is classified into beam search with respect to an elevation direction and beam search with respect to a horizontal direction. The beam search for the elevation direction is performed by upward beam search and downward beam search. The beam search with respect to the horizontal direction (or the azimuth direction) is performed by beam search with respect to east, west, south, and north sectors and beam search in a sector.

First, the mTE 140 initiates the beam sectoring and the beam search shown in FIG. 20 in step 3500. Specifically, the mTE 140 initiates the beam sectoring and the beam search with respect to an upward azimuth direction (e.g., an upward beam sector ($S_{1,1}$)) in the step 3500.

The mTE 140 initiates sequential beam search with respect to the east and the west through the inter-sectoring shown in FIG. 21 in step 3501.

The mTE 140 initiates sequential beam search with respect to the north and the south through the inter-sectoring shown in FIG. 21 in step 3502. Specifically, when the beam search has succeeded through the step 3501, the mTE 140 divides an area where the beam search has succeeded among an east area (east beam sector) and a west area (west beam sector) into a north area (north beam sector) and a south area (south beam sector), and sequentially performs beam search with respect to the north area and beam search with respect to the south area.

The mTE 140 divides one quadrant into half through the inter-sectoring shown in FIG. 21 and initiates sequential beam search with respect to the divided areas in step 3503. Specifically, when the beam search has succeeded through the step 3502, the mTE 140 divides an area where the beam search has succeeded among the north area (north beam sector) and the south area (south beam sector) into a first area and a second area, and then sequentially performs beam search with respect to the first area and beam search with respect to the second area.

When no beam is searched (3504) through the beam searches with respect to the elevation azimuth direction (i.e., in the steps 3500 to 3503), the mTE 140 initiates the beam-sectoring and the beam search shown in FIG. 20 in step 3505-1. Specifically, the mTE 140 initiates beam-sectoring and beam search with respect to a downward azimuth direction (e.g., a downward beam sector $(S_{1,2})$) in the step 3505-1.

The mTE 140 initiates sequential beam search with respect to the east and the west through the inter-sectoring shown in FIG. 21 in step 3506.

The mTE 140 initiates sequential beam search with respect to the north and the south through the inter-sectoring shown in FIG. 21 in step 3507. Specifically, when the beam search is succeeded in the step 3506, the mTE 140 divides an area where the beam search has succeeded among the east area (east beam sector) and the west area (west beam sector) into the north area (north beam sector) and the south area (south beam sector), and then sequentially performs beam search with respect to the north area and beam search with respect to the south area.

The mTE 140 divides one quadrant into half through the intra-sectoring shown in FIG. 21 and initiates sequential beam search with respect to the divided areas in step 3508. Specifically, when the beam search has succeeded through step 3507, the mTE 140 divides an area where the beam search has succeeded among the north area (north beam sector) and the south area (south beam sector) into a first area and a second area, and then sequentially performs beam search with respect to the first area and beam search with respect to the second area.

When no beam is searched through the beam search (i.e., steps 3505-1 to 3508) with respect to the downward azimuth direction in step 3509, the mTE 140 calls the process (e.g., FIG. 35) for searching a beam belonging to another mRU 132 (e.g., inter-beam inter-mRU) in step 3510, and returns from the second process in 3502.

When the beam search with respect to the upward azimuth direction or the beam search with respect to the downward, azimuth direction has succeeded, the mTE 140 returns from the second process in step 3505-2.

Figure 38:
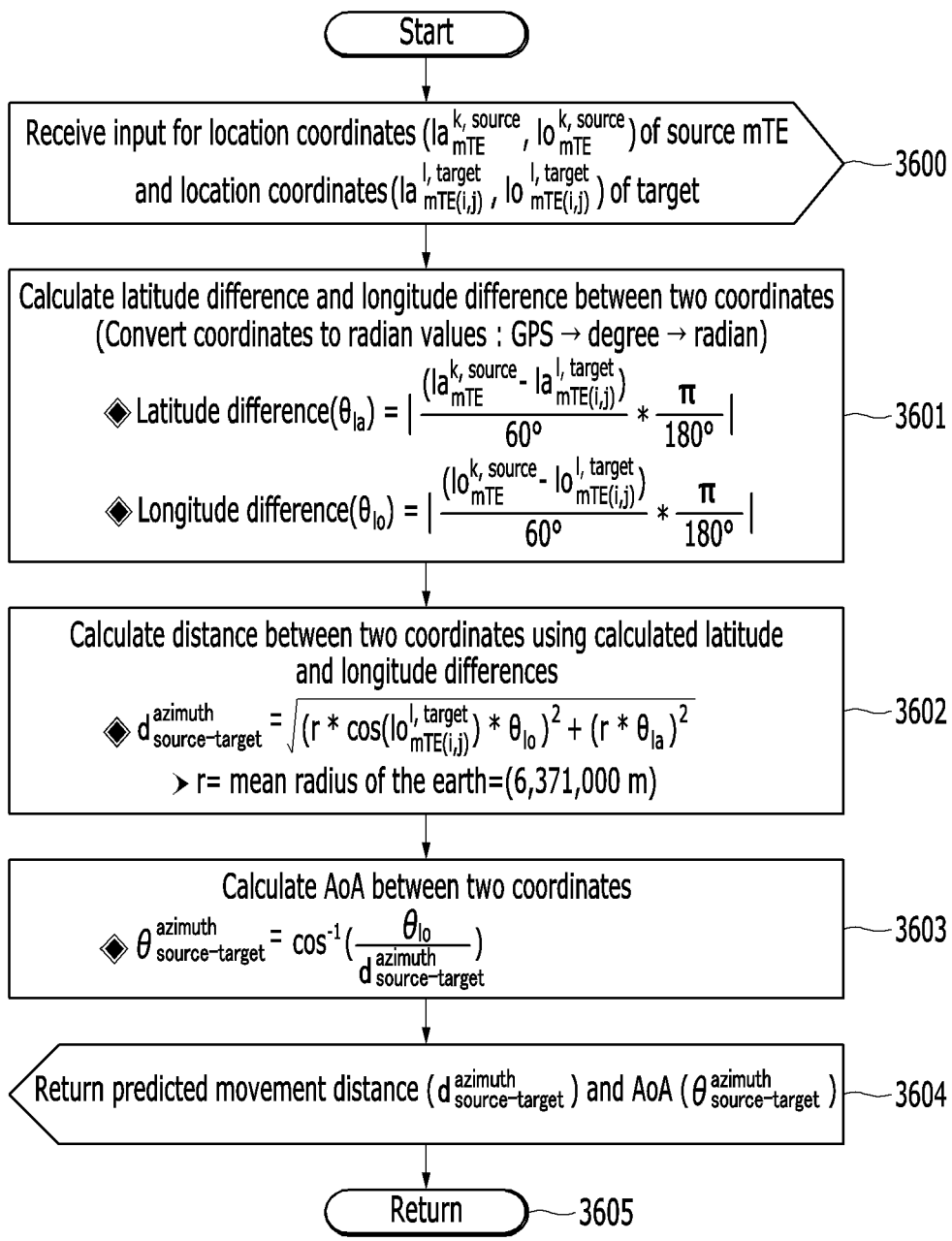
FIG. 38 shows a process (first process) that calculates a distance and an AoA between a source and a target in a space according to the exemplary embodiment of the present invention.

FIG. 38 shows a process (first process) that calculates a distance and an AoA between a source and a target in a space according to the exemplary embodiment of the present invention.

A process for a source mTE 140 to move to a target beam (or, a target mTE 140 or a target mRU 132) among handover processes between a base station and an mTE 140 will be described. In FIG. 38, a target beam, a target mTE 140, or a target mRU 132 will be referred to as a target point.

As shown in FIG. 38, the source mTE 140 performs a process (the first process) for calculating a distance and an AoA between the source mTE 140 and a target point in a space (e.g., FIG. 24).

Specifically, the source mTE 140 determines location coordinates (e.g., a latitude and a longitude) ($la_{mTE}^{k,source}$, $lo_{mTE}^{k,source}$) of the source mTE 140 and location coordinates ($la_{mTE(i,j)}^{l,target}$, $lo_{mTE(i,j)}^{l,target}$) of the target point in step 3600. The two location coordinates ($la_{mTE}^{k,source}$, $lo_{mTE}^{k,source}$) and ($la_{mTE(i,j)}^{l,target}$, $lo_{mTE(i,j)}^{l,target}$) are input as an input parameter for the first process.

The source mTE 140 calculates a latitude difference ($\theta_{la}$) and a longitude difference ($\theta_{lo}$) between the two location coordinates by using the two location coordinates ($la_{mTE}^{k,source}$, $lo_{mTE}^{k,source}$) and ($la_{mTE(i,j)}^{l,target}$, $lo_{mTE(i,j)}^{l,target}$) in step 3601. Specifically, the source mTE 140 converts the location coordinates into a radian value (e.g., GPS→degree→radian). The latitude difference ($\theta_{la}$) is $$\theta_{la} = \left| \frac{(la_{mTE}^{k,source} - la_{mTE(i,j)}^{l,target})}{60°} * \frac{\pi}{180°} \right|,$$

and the longitude difference ($\theta_{lo}$) is $$\theta_{lo} = \left| \frac{(lo_{mTE}^{k,source} - lo_{mTE(i,j)}^{l,target})}{60°} * \frac{\pi}{180°} \right|.$$

The source mTE 140 calculates a distance $d_{source-target}^{azimuth}$ between the two location coordinates by using the calculated latitude difference ($\theta_{la}$) and the calculated longitude difference ($\theta_{lo}$) as shown in FIG. 23, in step 3602. That is, $d_{source-target}^{azimuth} = \sqrt{(r*\cos(lo_{mTE(i,j)}^{l,target})*\theta_{lo})^2 + (r*\theta_{la})^2}$ (here, r=mean radius of the earth=6,371,000 m).

The source mTE 140 calculates an AoA $\theta_{source-target}^{azimuth}$ between the two location coordinates as shown in FIG. 23, in step 3603. That is, $$\theta_{source-target}^{azimuth} = \cos^{-1}\left( \frac{\theta_{lo}}{d_{source-target}^{azimuth}} \right).$$

The source mTE 140 receives a predicted movement distance ($d_{source-target}^{azimuth}$(m)) and a value of the AoA ($\theta_{source-target}^{azimuth}$) back from the first process, and returns (3604) from the first process in step 3605.

Figure 39:
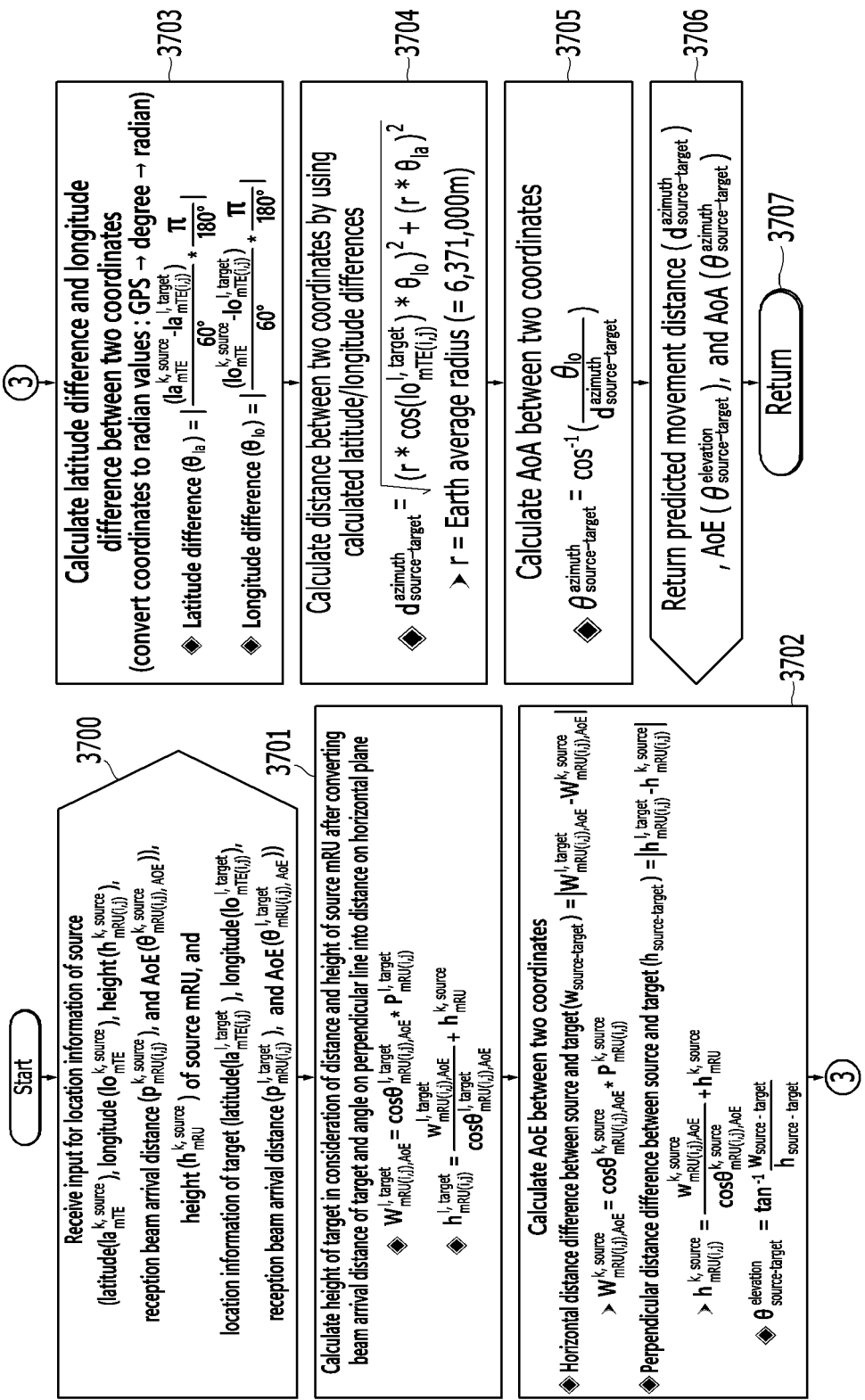
FIG. 39 shows a process (fourth process) for calculating a distance between a source mTE and a target mRU (e.g., a virtual mTE), an AoE, and an AoA in a space according to the exemplary embodiment of the present invention.

FIG. 39 shows a process (fourth process) for calculating a distance between a source mTE and a target mRU (e.g., a virtual mTE), an AoE, and an AoA in a space according to the exemplary embodiment of the present invention.

A process for a source mTE 140 to move to a target beam (or, a target mTE 140 or a target mRU 132) during a handover process between a base station and an mTE 140 will be described. In FIG. 39, a target beam, a target mTE 140, or a target mRU 132 (e.g., a virtual mTE), will be referred to as a target point.

As shown in FIG. 39, the source mTE 140 performs the fourth process to calculate a distance and an AoA (e.g., FIG. 22) between the source mTE 140 and the target point and an AoE (e.g., FIG. 23) between the source mTE 140 and the target point in the space.

The source mTE 140 determines location information of a source mTE 140 included in a k-th mRU 132, location information of a target point included in an l-th mRU 132, and a height $h_{mRU}^{k,source}$ of the source mRU 132 in step 3700. The location information of the source mTE 140 and the location information of the target point are input as an input parameter for the fourth process. The location information of the source mTE 140 includes a latitude $la_{mTE}^{k,source}$, a longitude $lo_{mTE}^{k,source}$, a height $h_{mRU(i,j)}^{k,source}$, a reception beam arrival distance $p_{mRU(i,j)}^{k,source}$, and an AoE $\theta_{mRU(i,j),AOE}^{k,source}$. The location information of the target point includes a latitude $la_{mTE(i,j)}^{l,target}$, a longitude $lo_{mTE(i,j)}^{l,target}$, a reception beam arrival distance $p_{mRU(i,j)}^{l,target}$, and an AoE $\theta_{mRU(i,j),AOE}^{l,target}$. The source mRU 132 implies a home mRU 132 where the source mTE 140 is included.

The source mTE 140 calculates a height of the target point and an AoE between two location coordinates as shown in FIG. 22 by using the location information of the source mTE 140 and the location information of the target point in steps 3701 and 3702.

Specifically, the source mTE 140 converts reception beam arrival distances ($p_{mRU(i,j)}^{l,target}$ and $p_{mRU(i,j)}^{k,source}$) of the source mTE 140 and the target point and angles ($\theta_{mRU(i,j),AOE}^{l,target}$ and $\theta_{mRU(i,j),AOE}^{k,source}$) on the perpendicular line to distances ($w_{mRU(i,j),AOE}^{l,target}$ and $w_{mRU(i,j),AOE}^{k,source}$) on the horizontal plane. That is, $w_{mRU(i,j),AOE}^{l,target} = \cos\theta_{mRU(i,j),AOE}^{l,target} \times p_{mRU(i,j)}^{l,target}$ and $w_{mRU(i,j),AOE}^{k,source} = \cos\theta_{mRU(i,j),AOE}^{k,source} \times p_{mRU(i,j)}^{k,source}$.

The source mTE 140 calculates a height $h_{mRU(i,j)}^{l,target}$ of the target point in consideration with the distance $w_{mRU(i,j),AOE}^{l,target}$ on the horizontal plane and the height $h_{mRU}^{k,source}$ of the source mRU 132 in step 3701. That is, $$h_{mRU(i,j)}^{l,target} = \frac{w_{mRU(i,j),AOE}^{l,target}}{\cos\theta_{mRU(i,j),AOE}^{l,target}} + h_{mRU}^{k,source}.$$

The source mTE 140 calculates an AoE $\theta_{source-target}^{elevation}$ between the two location coordinates in consideration of the distances $w_{mRU(i,j),AOE}^{l,target}$, $w_{mRU(i,j),AOE}^{k,source}$ on the horizontal plane and the heights of the source mRU 132 and the target point $h_{mRU(i,j)}^{k,source}$, $h_{mRU(i,j)}^{l,target}$ in step 3702. That is, $$h_{mRU(i,j)}^{k,source} = \frac{w_{mRU(i,j),AOE}^{k,source}}{\cos\theta_{mRU(i,j),AOE}^{k,source}} + h_{mRU}^{k,source},$$

and $$\theta_{source-target}^{elevation} = \tan^{-1}\frac{w_{source-target}}{h_{source-target}}.$$

In addition, a horizontal distance difference between the source mTE 140 and the target point (i.e., between two mTEs) is $w_{source-target} = |w_{mRU(i,j),AOE}^{l,target} - w_{mRU(i,j),AOE}^{k,source}|$, and a perpendicular distance difference between the source mTE 140 and the target point (i.e., between two mTEs) is $h_{source-target} = |h_{mRU(i,j)}^{l,target} - h_{mRU(i,j)}^{k,source}|$.

The source mTE 140 calculates a latitude difference ($\theta_{la}$) and a longitude difference ($\theta_{lo}$) between the two location coordinates in step S3703. Specifically, the source mTE 140 converts the location coordinates into radian values (e.g., GPS→degree-<radian). The latitude difference ($\theta_{la}$) is $$\theta_{la} = \left|\frac{(la_{mTE}^{k,source} - la_{mTE(i,j)}^{l,target})}{60°} * \frac{\pi}{180°}\right|$$

and, and the longitude difference ($\theta_{lo}$) is $$\theta_{lo} = \left|\frac{(lo_{mTE}^{k,source} - lo_{mTE(i,j)}^{l,target})}{60°} * \frac{\pi}{180°}\right|.$$

The source mTE 140 calculates a distance $d_{source-target}^{azimuth}$ between the two location coordinates by using the latitude difference ($\theta_{la}$) and the longitude difference ($\theta_{lo}$) as shown in FIG. 23, in step 3704. That is, $d_{source-target}^{azimuth} = \sqrt{(r*\cos(lo_{mTE(i,j)}^{l,target})*\theta_{lo})^2 + (r*\theta_{la})^2}$ (here, r=mean radius of the earth=6,371,000 m).

The source mTE 140 calculates an AoA $\theta_{source-target}^{azimuth}$ between the two location coordinates as shown in FIG. 23, in step 3705. That is, $$\theta_{source-target}^{azimuth} = \cos^{-1}\left(\frac{\theta_{lo}}{d_{source-target}^{azimuth}}\right).$$

The source mTE 140 receives a predicted movement distance ($d_{source-target}^{azimuth}$, an AoE ($\theta_{source-target}^{elevation}$), and an AoA ($\theta_{source-target}^{azimuth}$) back from the fourth process in step 3706, and returns from the fourth process in step 3707.

Mean while, LTE, Bluetooth, or a WiFi-based radio link may be temporarily used instead of a mmWave link against a disconnection of the mmWave link while the beam switching is performed.

Figure 40:
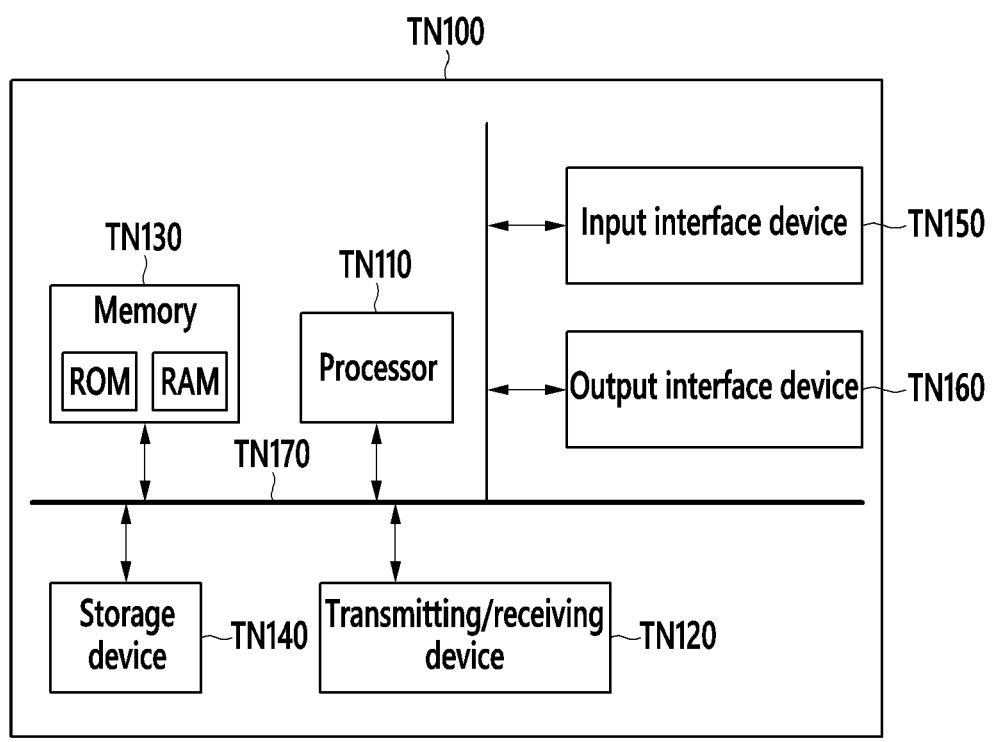
FIG. 40 shows a radio device (or a communication node) according to an exemplary embodiment of the present invention.

FIG. 40 shows a radio device (or, a communication node) according to an exemplary embodiment of the present invention. A radio device TN100 of FIG. 40 may be a base station (e.g., an mDU of a base station or an mRU of the base station) or an unmanned aerial vehicle terminal (e.g., an mTE) which has been described in the present specification.

In the exemplary embodiment of FIG. 40, the radio device TN100 may include at least one processor TN110, a transmitting/receiving device TN120 that performs communication by being connected with a network, and a memory TN130. In addition, the radio device TN100 may further include a storage device TN140, an input interface device TN150, and an output interface device TN160. The constituent elements included in the radio device TN100 may communicate with each other by being connected with a bus TN170.

The processor TN110 may execute a program command stored in at least one of the memory TN130 and the storage device TN140. The processor TN110 may imply a central processing unit (CPU), a graphics processing unit (GPU), or an exclusive processor that performs the methods according to the exemplary embodiment of the present invention. The processor TN110 may be configured to implement the procedures, functions, and methods described in relation to a base station in this specification. The processor TN110 may control the respective constituent elements of the radio device TN100.

The memory TN130 and the storage device TN140 may respectively store various types of information related to operation of the processor TN110. The memory TN130 and the storage device TN140 may include a variety of types of volatile or nonvolatile storage media. For example, the memory TN130 may be formed of at least one of a read only memory (ROM) and a random access memory (RAM).

The transmitting/receiving device TN120 may transmit or receive wired signals or wireless signals.

According to the exemplary embodiments of the present invention, a plurality of unmanned aerial vehicles (e.g., drones) upload videos of giga-sized capacity by using a super-high frequency band so that a problem in a limitation in QoS, security, and clustering and transmission capacity can be solved and an economical problem also can be solved.

Meanwhile, since a movement speed of the unmanned aerial vehicle terminal (e.g., drone) is very fast compared to a movement speed (e.g., a movement speed of a user of an LTE ground terminal) of an LTE ground terminal (e.g., a mobile phone), the unmanned aerial vehicle terminal has information on the periphery of the terminal (e.g., beam table information) in advances and promptly determines movement to a nest location of the terminal if an event situation occurs. Here, the event situation includes a radio link failure (RLF) state due to blocking of beams, an internal program of the unmanned aerial vehicle termina, or a request from a system operator. According to the exemplary embodiment of the present invention, when a super-high frequency band is applied between a mobile communication system and the unmanned aerial vehicle terminal (e.g., drone), the unmanned aerial vehicle terminal moves to the next location by promptly determining the next location of the terminal of the event situation occurs.

Further, a wireless network that can enable beam search for initial access and random access, beam switching, and movement to a target beam and a base station area can be formed so that efficiency and performance of the entire system can be maximized and an interference between the unmanned aerial vehicle terminals can be minimized.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An operation method of an unmanned aerial vehicle terminal, the operation method comprising:
   generating a beam table by using first information on a plurality of beams transmitted by a first transmission point;
   monitoring whether conditions for beam switching are satisfied;
   determining a target location based on the beam table when the conditions for the beam switching are satisfied;
   moving to the target location; and
   updating the beam table depending on whether beam table update conditions are satisfied,
   wherein the determining of the target location comprises:
   determining a target beam that is not in use by another terminal among the plurality of beams transmitted by the first transmission point based on the beam table; and
   calculating a movement time and a first movement angle for movement to the target location based on a latitude difference and a longitude difference between the target location for the target beam and a current location of the unmanned aerial vehicle terminal.

2. The operation method of claim 1, wherein the calculating of the movement time and the first movement angle comprises:
   calculating a movement distance between the target location and the current location by using the latitude difference and the longitude difference; and
   calculating the first movement angle by using the movement distance and the longitude difference.

3. The operation method of claim 1, wherein a movement speed of the unmanned aerial vehicle terminal is set for the first transmission point and a second transmission point that is different from the first transmission point, respectively, or is set as the same value for the first transmission point and the second transmission point.

4. The operation method of claim 1, wherein the conditions for the beam switching comprise at least one of a case that a serving beam for the unmanned aerial vehicle terminal is blocked, a case that reception strength for the unmanned aerial vehicle terminal to receive the serving beam is weaker than reception strength that corresponds to a maximum arrival distance of the serving beam, a case that the first transmission point abnormally operates, a case that the unmanned aerial vehicle determines that it needs to move, and a case that a movement request is input by a system operator.

5. An operation method of an unmanned aerial vehicle terminal, the operation method comprising:
   generating a beam table by using first information on a plurality of beams transmitted by a first transmission point;
   monitoring whether conditions for beam switching are satisfied;
   determining a target location based on the beam table when the conditions for the beam switching are satisfied;
   moving to the target location; and
   updating the beam table depending on whether beam table update conditions are satisfied,
   wherein the moving to the target location comprises:
   dividing an area for beam search into an upward area and a downward area with reference to a horizontal line when arriving at the target location;
   performing beam search with respect to the upward area; and
   performing beam search with respect to the downward area when the beam search with respect to the upward area has failed.

6. The operation method of claim 5, wherein the performing of the beam search with respect to the upward area comprises:
   dividing the upward area into an east area and a west area with reference to due north and then sequentially performing beam search with respect to the east area and beam search with respect to the west area; and
   when the beam search with respect to one of the east area and the west area has succeeded, dividing the area where the beam search has succeeded into a north area and a south area and then sequentially performing beam search with respect to the north area and beam search with respect to the south area.

7. The operation method of claim 1, wherein:
   the moving to the target location comprises transmitting location information of the unmanned aerial vehicle terminal that is in use of a second beam to the first transmission point when a serving beam for the unmanned aerial vehicle terminal is changed from the first beam to the second beam among the plurality of beams transmitted by the first transmission point due to movement to the target location, and the first information is changed by the first transmission point according to the location information.

* * * * *